(12) United States Patent
Vorbach et al.

(10) Patent No.: US 8,145,881 B2
(45) Date of Patent: Mar. 27, 2012

(54) DATA PROCESSING DEVICE AND METHOD

(76) Inventors: Martin Vorbach, Lingenfeld (DE); Alexander Thomas, Karlsruhe (DE)

( * ) Notice: Subject to any disclaimer, the term of this patent is extended or adjusted under 35 U.S.C. 154(b) by 470 days.

(21) Appl. No.: 12/258,100

(22) Filed: Oct. 24, 2008

(65) Prior Publication Data

US 2009/0144522 A1 Jun. 4, 2009

Related U.S. Application Data

(63) Continuation of application No. 10/570,173, filed as application No. PCT/EP2004/09640 on Aug. 30, 2004, now Pat. No. 7,844,796, application No. 12/258,100, which is a continuation-in-part of application No. 10/469,909, filed as application No. PCT/EP2002/02402 on Mar. 5, 2002, now Pat. No. 7,444,531.

(30) Foreign Application Priority Data

| Mar. 5, 2001 | (DE) | 101 10 530 |
|---|---|---|
| Aug. 28, 2003 | (DE) | 030 19 428 |
| Aug. 28, 2003 | (EP) | 03019428 |
| Nov. 5, 2003 | (EP) | 03025911 |
| Dec. 5, 2003 | (DE) | 103 57 284 |
| Dec. 17, 2003 | (EP) | 03028953 |
| Dec. 17, 2003 | (EP) | 03079015 |
| Feb. 5, 2004 | (EP) | 04002604 |
| Feb. 6, 2004 | (EP) | 04002719 |
| Feb. 13, 2004 | (EP) | 04003258 |
| Mar. 2, 2004 | (EP) | 04004885 |
| Mar. 2, 2004 | (EP) | 04075654 |
| Mar. 8, 2004 | (EP) | 04005403 |
| Jun. 9, 2004 | (EP) | 04013557 |
| Aug. 2, 2004 | (EP) | 04018267 |
| Aug. 2, 2004 | (EP) | 04077206 |

(51) Int. Cl. *G06F 15/82* (2006.01)
(52) U.S. Cl. .............. 712/18; 712/201
(58) Field of Classification Search ............ 712/18, 712/201

See application file for complete search history.

(56) References Cited

U.S. PATENT DOCUMENTS

| 2,067,477 A | 1/1937 | Cooper |
|---|---|---|
| 3,242,998 A | 3/1966 | Gubbins |
| 3,564,506 A | 2/1971 | Bee et al. |
| 3,681,578 A | 8/1972 | Stevens |
| 3,753,008 A | 8/1973 | Guarnaschelli |
| 3,757,608 A | 9/1973 | Willner |

(Continued)

FOREIGN PATENT DOCUMENTS

DE 42 21 278 1/1994

(Continued)

OTHER PUBLICATIONS

Atmel, 5-K-50K Gates Coprocessor FPGA with Free Ram, Data Sheet, Jul. 2006, 55 pages.

(Continued)

*Primary Examiner* — William M Treat

(74) *Attorney, Agent, or Firm* — Kenyon & Kenyon LLP

(57) ABSTRACT

A data processing device comprising a multidimensional array of coarse grained logic elements processing data and operating at a first clock rate and communicating with one another and/or other elements via busses and/or communication lines operated at a second clock rate is disclosed, wherein the first clock rate is higher than the second and wherein the coarse grained logic elements comprise storage means for storing data needed to be processed.

1 Claim, 34 Drawing Sheets

Bus = 6
FREG, BREG = 2

U.S. PATENT DOCUMENTS

| | | |
|---|---|---|
| 3,855,577 A | 12/1974 | Vandierendonck |
| 4,151,611 A | 4/1979 | Sugawara et al. |
| 4,233,667 A | 11/1980 | Devine et al. |
| 4,414,547 A | 11/1983 | Knapp et al. |
| 4,498,134 A | 2/1985 | Hansen et al. |
| 4,498,172 A | 2/1985 | Bhavsar |
| 4,566,102 A | 1/1986 | Hefner |
| 4,571,736 A | 2/1986 | Agrawal et al. |
| 4,590,583 A | 5/1986 | Miller |
| 4,591,979 A | 5/1986 | Iwashita |
| 4,594,682 A | 6/1986 | Drimak |
| 4,663,706 A | 5/1987 | Allen et al. |
| 4,667,190 A | 5/1987 | Fant et al. |
| 4,682,284 A | 7/1987 | Schrofer |
| 4,686,386 A | 8/1987 | Tadao |
| 4,706,216 A | 11/1987 | Carter |
| 4,720,778 A | 1/1988 | Hansen et al. |
| 4,720,780 A | 1/1988 | Dolecek |
| 4,739,474 A | 4/1988 | Holsztynski |
| 4,761,755 A | 8/1988 | Ardini et al. |
| 4,791,603 A | 12/1988 | Henry |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,873,666 A | 10/1989 | Lefebvre et al. |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,939,641 A | 7/1990 | Schwartz et al. |
| 4,959,781 A | 9/1990 | Rubenstein et al. |
| 4,967,340 A | 10/1990 | Dawes |
| 4,972,314 A | 11/1990 | Getzinger et al. |
| 4,992,933 A | 2/1991 | Taylor |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,034,914 A | 7/1991 | Osterlund |
| 5,036,473 A | 7/1991 | Butts et al. |
| 5,036,493 A | 7/1991 | Nielsen |
| 5,041,924 A | 8/1991 | Blackborow et al. |
| 5,043,978 A | 8/1991 | Nagler et al. |
| 5,047,924 A | 9/1991 | Matsubara et al. |
| 5,055,997 A | 10/1991 | Sluijter et al. |
| 5,065,308 A | 11/1991 | Evans |
| 5,072,178 A | 12/1991 | Matsumoto |
| 5,081,375 A | 1/1992 | Pickett et al. |
| 5,099,447 A | 3/1992 | Myszewski |
| 5,103,311 A | 4/1992 | Sluijter et al. |
| 5,109,503 A | 4/1992 | Cruickshank et al. |
| 5,113,498 A | 5/1992 | Evan et al. |
| 5,115,510 A | 5/1992 | Okamoto et al. |
| 5,119,290 A | 6/1992 | Loo et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Jackson et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,212,777 A | 5/1993 | Gove et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,243,238 A | 9/1993 | Kean |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,511 A | 2/1994 | Robinson et al. |
| 5,287,532 A | 2/1994 | Hunt |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,355,508 A | 10/1994 | Kan |
| 5,361,373 A | 11/1994 | Gilson |
| 5,365,125 A | 11/1994 | Goetting et al. |
| 5,379,444 A | 1/1995 | Mumme |
| 5,386,154 A | 1/1995 | Goetting et al. |
| 5,386,518 A | 1/1995 | Reagle et al. |
| 5,392,437 A | 2/1995 | Matter et al. |
| 5,408,643 A | 4/1995 | Katayose |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,435,000 A | 7/1995 | Boothroyd et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,450,022 A | 9/1995 | New |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,477,525 A | 12/1995 | Okabe |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,493,663 A | 2/1996 | Parikh |
| 5,497,498 A | 3/1996 | Taylor |
| 5,504,439 A | 4/1996 | Tavana |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,580 A | 7/1996 | Giomi et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,550,782 A | 8/1996 | Cliff et al. |

| Patent | Date | Inventor |
|---|---|---|
| 5,555,434 A | 9/1996 | Carlstedt |
| 5,559,450 A | 9/1996 | Ngai et al. |
| 5,561,738 A | 10/1996 | Kinerk et al. |
| 5,568,624 A | 10/1996 | Sites et al. |
| 5,570,040 A | 10/1996 | Lytle et al. |
| 5,572,710 A | 11/1996 | Asano et al. |
| 5,574,927 A | 11/1996 | Scantlin |
| 5,574,930 A | 11/1996 | Halverson, Jr. et al. |
| 5,581,731 A | 12/1996 | King et al. |
| 5,581,734 A | 12/1996 | DiBrino et al. |
| 5,583,450 A | 12/1996 | Trimberger et al. |
| 5,584,013 A | 12/1996 | Cheong et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal et al. |
| 5,600,597 A | 2/1997 | Kean et al. |
| 5,600,845 A | 2/1997 | Gilson |
| 5,602,999 A | 2/1997 | Hyatt |
| 5,606,698 A | 2/1997 | Powell |
| 5,608,342 A | 3/1997 | Trimberger |
| 5,611,049 A | 3/1997 | Pitts |
| 5,617,547 A | 4/1997 | Feeney et al. |
| 5,617,577 A | 4/1997 | Barker et al. |
| 5,619,720 A | 4/1997 | Garde et al. |
| 5,625,806 A | 4/1997 | Kromer |
| 5,625,836 A | 4/1997 | Barker et al. |
| 5,627,992 A | 5/1997 | Baror |
| 5,634,131 A | 5/1997 | Matter et al. |
| 5,635,851 A | 6/1997 | Tavana |
| 5,642,058 A | 6/1997 | Trimberger et al. |
| 5,646,544 A | 7/1997 | Iadanza |
| 5,646,545 A | 7/1997 | Trimberger et al. |
| 5,649,176 A | 7/1997 | Selvidge et al. |
| 5,649,179 A | 7/1997 | Steenstra et al. |
| 5,652,529 A | 7/1997 | Gould et al. |
| 5,652,894 A | 7/1997 | Hu et al. |
| 5,655,069 A | 8/1997 | Ogawara et al. |
| 5,655,124 A | 8/1997 | Lin |
| 5,656,950 A | 8/1997 | Duong et al. |
| 5,657,330 A | 8/1997 | Matsumoto |
| 5,659,785 A | 8/1997 | Pechanek et al. |
| 5,659,797 A | 8/1997 | Zandveld et al. |
| 5,675,262 A | 10/1997 | Doung et al. |
| 5,675,743 A | 10/1997 | Mavity |
| 5,675,757 A | 10/1997 | Davidson et al. |
| 5,675,777 A | 10/1997 | Glickman |
| 5,680,583 A | 10/1997 | Kuijsten |
| 5,682,491 A | 10/1997 | Pechanek et al. |
| 5,682,544 A | 10/1997 | Pechanek et al. |
| 5,687,325 A | 11/1997 | Chang |
| 5,694,602 A | 12/1997 | Smith |
| 5,696,791 A | 12/1997 | Yeung |
| 5,696,976 A | 12/1997 | Nizar et al. |
| 5,701,091 A | 12/1997 | Kean |
| 5,705,938 A | 1/1998 | Kean |
| 5,706,482 A | 1/1998 | Matsushima et al. |
| 5,713,037 A | 1/1998 | Wilkinson et al. |
| 5,717,890 A | 2/1998 | Ichida et al. |
| 5,717,943 A | 2/1998 | Barker et al. |
| 5,727,229 A | 3/1998 | Kan et al. |
| 5,732,209 A | 3/1998 | Vigil et al. |
| 5,734,869 A | 3/1998 | Chen |
| 5,734,921 A | 3/1998 | Dapp et al. |
| 5,737,516 A | 4/1998 | Circello et al. |
| 5,737,565 A | 4/1998 | Mayfield |
| 5,742,180 A | 4/1998 | Detton et al. |
| 5,745,734 A | 4/1998 | Craft et al. |
| 5,748,872 A | 5/1998 | Norman |
| 5,748,979 A | 5/1998 | Trimberger |
| 5,752,035 A | 5/1998 | Trimberger |
| 5,754,459 A | 5/1998 | Telikepalli |
| 5,754,820 A | 5/1998 | Yamagami |
| 5,754,827 A | 5/1998 | Barbier et al. |
| 5,754,871 A | 5/1998 | Wilkinson et al. |
| 5,754,876 A | 5/1998 | Tamaki et al. |
| 5,760,602 A | 6/1998 | Tan |
| 5,761,484 A | 6/1998 | Agarwal et al. |
| 5,768,629 A | 6/1998 | Wise et al. |
| 5,773,994 A | 6/1998 | Jones |
| 5,778,439 A | 7/1998 | Timberger et al. |
| 5,781,756 A | 7/1998 | Hung |
| 5,784,313 A | 7/1998 | Trimberger et al. |
| 5,784,630 A | 7/1998 | Saito et al. |
| 5,784,636 A | 7/1998 | Rupp |
| 5,794,059 A | 8/1998 | Barker et al. |
| 5,794,062 A | 8/1998 | Baxter |
| 5,801,547 A | 9/1998 | Kean |
| 5,801,715 A | 9/1998 | Norman |
| 5,801,958 A | 9/1998 | Dangelo et al. |
| 5,802,290 A | 9/1998 | Casselman |
| 5,804,986 A | 9/1998 | Jones |
| 5,815,004 A | 9/1998 | Trimberger et al. |
| 5,815,715 A | 9/1998 | Kayhan |
| 5,815,726 A | 9/1998 | Cliff |
| 5,821,774 A | 10/1998 | Veytsman et al. |
| 5,828,229 A | 10/1998 | Cliff et al. |
| 5,828,858 A | 10/1998 | Athanas et al. |
| 5,831,448 A | 11/1998 | Kean |
| 5,832,288 A | 11/1998 | Wong |
| 5,838,165 A | 11/1998 | Chatter |
| 5,838,988 A | 11/1998 | Panwar et al. |
| 5,841,973 A | 11/1998 | Cooke et al. |
| 5,844,422 A | 12/1998 | Trimberger et al. |
| 5,844,888 A | 12/1998 | Narjyka |
| 5,848,238 A | 12/1998 | Shimomura et al. |
| 5,854,918 A | 12/1998 | Baxter |
| 5,857,097 A | 1/1999 | Henzinger et al. |
| 5,857,109 A | 1/1999 | Taylor |
| 5,859,544 A | 1/1999 | Norman |
| 5,860,119 A | 1/1999 | Dockser |
| 5,862,403 A | 1/1999 | Kanai et al. |
| 5,865,239 A | 2/1999 | Carr |
| 5,867,691 A | 2/1999 | Shiraishi |
| 5,867,723 A | 2/1999 | Peters et al. |
| 5,870,620 A | 2/1999 | Kadosumi et al. |
| 5,884,075 A | 3/1999 | Hester et al. |
| 5,887,162 A | 3/1999 | Williams et al. |
| 5,887,165 A | 3/1999 | Martel et al. |
| 5,889,533 A | 3/1999 | Lee |
| 5,889,982 A | 3/1999 | Rodgers et al. |
| 5,892,370 A | 4/1999 | Eaton et al. |
| 5,892,961 A | 4/1999 | Trimberger |
| 5,892,962 A | 4/1999 | Cloutier |
| 5,894,565 A | 4/1999 | Furtek et al. |
| 5,895,487 A | 4/1999 | Boyd et al. |
| 5,898,602 A | 4/1999 | Rothman et al. |
| 5,901,279 A | 5/1999 | Davis, III |
| 5,915,099 A | 6/1999 | Takata et al. |
| 5,915,123 A | 6/1999 | Mirsky et al. |
| 5,924,119 A | 7/1999 | Sindhu et al. |
| 5,926,638 A | 7/1999 | Inoue |
| 5,927,423 A | 7/1999 | Wada et al. |
| 5,933,023 A | 8/1999 | Young |
| 5,933,642 A | 8/1999 | Baxter et al. |
| 5,936,424 A | 8/1999 | Young et al. |
| 5,943,242 A | 8/1999 | Vorbach et al. |
| 5,956,518 A | 9/1999 | DeHon et al. |
| 5,960,193 A | 9/1999 | Guttag et al. |
| 5,960,200 A | 9/1999 | Eager et al. |
| 5,966,143 A | 10/1999 | Breternitz, Jr. |
| 5,966,534 A | 10/1999 | Cooke et al. |
| 5,970,254 A | 10/1999 | Cooke et al. |
| 5,978,260 A | 11/1999 | Trimberger et al. |
| 5,978,583 A | 11/1999 | Ekanadham et al. |
| 5,996,048 A | 11/1999 | Cherabuddi et al. |
| 5,996,083 A | 11/1999 | Gupta et al. |
| 5,999,990 A | 12/1999 | Sharrit et al. |
| 6,003,143 A | 12/1999 | Kim et al. |
| 6,011,407 A | 1/2000 | New |
| 6,014,509 A | 1/2000 | Furtek et al. |
| 6,020,758 A | 2/2000 | Patel et al. |
| 6,020,760 A | 2/2000 | Sample et al. |
| 6,021,490 A | 2/2000 | Vorbach et al. |
| 6,023,564 A | 2/2000 | Trimberger |

| | | | |
|---|---|---|---|
| 6,023,742 A | 2/2000 | Ebeling et al. | |
| 6,026,478 A | 2/2000 | Dowling | |
| 6,026,481 A | 2/2000 | New et al. | |
| 6,034,538 A | 3/2000 | Abramovici | |
| 6,035,371 A | 3/2000 | Magloire | |
| 6,038,650 A | 3/2000 | Vorbach et al. | |
| 6,038,656 A | 3/2000 | Cummings et al. | |
| 6,044,030 A | 3/2000 | Zheng et al. | |
| 6,047,115 A | 4/2000 | Mohan et al. | |
| 6,049,222 A | 4/2000 | Lawman | |
| 6,049,866 A | 4/2000 | Earl | |
| 6,052,773 A | 4/2000 | DeHon et al. | |
| 6,054,873 A | 4/2000 | Laramie | |
| 6,055,619 A | 4/2000 | North et al. | |
| 6,058,469 A | 5/2000 | Baxter | |
| 6,076,157 A | 6/2000 | Borkenhagen et al. | |
| 6,077,315 A | 6/2000 | Greenbaum et al. | |
| 6,078,736 A | 6/2000 | Guccione | |
| 6,081,903 A | 6/2000 | Vorbach et al. | |
| 6,084,429 A | 7/2000 | Trimberger | |
| 6,085,317 A | 7/2000 | Smith | |
| 6,086,628 A | 7/2000 | Dave et al. | |
| 6,088,795 A | 7/2000 | Vorbach et al. | |
| 6,092,174 A | 7/2000 | Roussakov | |
| 6,096,091 A | 8/2000 | Hartmann | |
| 6,105,105 A | 8/2000 | Trimberger et al. | |
| 6,105,106 A | 8/2000 | Manning | |
| 6,108,760 A | 8/2000 | Mirsky et al. | |
| 6,118,724 A | 9/2000 | Higginbottom | |
| 6,119,181 A | 9/2000 | Vorbach et al. | |
| 6,122,719 A | 9/2000 | Mirsky et al. | |
| 6,125,072 A | 9/2000 | Wu | |
| 6,125,408 A | 9/2000 | McGee et al. | |
| 6,127,908 A | 10/2000 | Bozler et al. | |
| 6,128,720 A | 10/2000 | Pechanek et al. | |
| 6,134,166 A | 10/2000 | Lytle et al. | |
| 6,137,307 A | 10/2000 | Iwanczuk et al. | |
| 6,145,072 A | 11/2000 | Shams et al. | |
| 6,150,837 A | 11/2000 | Beal et al. | |
| 6,150,839 A | 11/2000 | New et al. | |
| 6,154,048 A | 11/2000 | Iwanczuk et al. | |
| 6,154,049 A | 11/2000 | New | |
| 6,154,826 A | 11/2000 | Wulf et al. | |
| 6,157,214 A | 12/2000 | Marshall | |
| 6,170,051 B1 | 1/2001 | Dowling | |
| 6,172,520 B1 | 1/2001 | Lawman et al. | |
| 6,173,419 B1 | 1/2001 | Barnett | |
| 6,173,434 B1 | 1/2001 | Wirthlin et al. | |
| 6,178,494 B1 | 1/2001 | Casselman | |
| 6,185,256 B1 | 2/2001 | Saito et al. | |
| 6,185,731 B1 | 2/2001 | Maeda et al. | |
| 6,188,240 B1 | 2/2001 | Nakaya | |
| 6,188,650 B1 | 2/2001 | Hamada et al. | |
| 6,198,304 B1 | 3/2001 | Sasaki | |
| 6,201,406 B1 | 3/2001 | Iwanczuk et al. | |
| 6,202,182 B1 | 3/2001 | Abramovici et al. | |
| 6,204,687 B1 | 3/2001 | Schultz et al. | |
| 6,211,697 B1 | 4/2001 | Lien et al. | |
| 6,212,544 B1 | 4/2001 | Borkenhagen et al. | |
| 6,212,650 B1 | 4/2001 | Guccione | |
| 6,215,326 B1 | 4/2001 | Jefferson et al. | |
| 6,216,223 B1 | 4/2001 | Revilla et al. | |
| 6,219,833 B1 | 4/2001 | Solomon et al. | |
| RE37,195 E | 5/2001 | Kean | |
| 6,230,307 B1 | 5/2001 | Davis et al. | |
| 6,240,502 B1 | 5/2001 | Panwar et al. | |
| 6,243,808 B1 | 6/2001 | Wang | |
| 6,247,147 B1 | 6/2001 | Beenstra et al. | |
| 6,252,792 B1 | 6/2001 | Marshall et al. | |
| 6,256,724 B1 | 7/2001 | Hocevar et al. | |
| 6,260,114 B1 | 7/2001 | Schug | |
| 6,260,179 B1 | 7/2001 | Ohsawa et al. | |
| 6,262,908 B1 | 7/2001 | Marshall et al. | |
| 6,263,430 B1 | 7/2001 | Trimberger et al. | |
| 6,266,760 B1 | 7/2001 | DeHon et al. | |
| 6,279,077 B1 | 8/2001 | Nasserbakht et al. | |
| 6,282,627 B1 | 8/2001 | Wong et al. | |
| 6,282,701 B1 | 8/2001 | Wygodny et al. | |
| 6,285,624 B1 | 9/2001 | Chen | |
| 6,286,134 B1 | 9/2001 | Click, Jr. et al. | |
| 6,288,566 B1 | 9/2001 | Hanrahan et al. | |
| 6,289,440 B1 | 9/2001 | Casselman | |
| 6,298,043 B1 | 10/2001 | Mauger et al. | |
| 6,298,396 B1 | 10/2001 | Loyer et al. | |
| 6,298,472 B1 | 10/2001 | Phillips et al. | |
| 6,301,706 B1 | 10/2001 | Maslennikov et al. | |
| 6,311,200 B1 | 10/2001 | Hanrahan et al. | |
| 6,311,265 B1 | 10/2001 | Beckerle et al. | |
| 6,321,298 B1 | 11/2001 | Hubis | |
| 6,321,366 B1 | 11/2001 | Tseng et al. | |
| 6,321,373 B1 | 11/2001 | Ekanadham et al. | |
| 6,338,106 B1 | 1/2002 | Vorbach et al. | |
| 6,339,840 B1 | 1/2002 | Kothari et al. | |
| 6,341,318 B1 | 1/2002 | Dakhil | |
| 6,347,346 B1 | 2/2002 | Taylor | |
| 6,349,346 B1 | 2/2002 | Hanrahan et al. | |
| 6,353,841 B1 | 3/2002 | Marshall et al. | |
| 6,362,650 B1 | 3/2002 | New et al. | |
| 6,370,596 B1 | 4/2002 | Dakhil | |
| 6,373,779 B1 | 4/2002 | Pang et al. | |
| 6,374,286 B1 | 4/2002 | Gee | |
| 6,378,068 B1 | 4/2002 | Foster et al. | |
| 6,381,624 B1 | 4/2002 | Colon-Bonet et al. | |
| 6,389,379 B1 | 5/2002 | Lin et al. | |
| 6,389,579 B1 | 5/2002 | Phillips et al. | |
| 6,392,912 B1 | 5/2002 | Hanrahan et al. | |
| 6,398,383 B1 | 6/2002 | Huang | |
| 6,400,601 B1 | 6/2002 | Sudo et al. | |
| 6,404,224 B1 | 6/2002 | Azegami et al. | |
| 6,405,185 B1 | 6/2002 | Pechanek et al. | |
| 6,405,299 B1 | 6/2002 | Vorbach et al. | |
| 6,421,808 B1 | 7/2002 | McGeer | |
| 6,421,809 B1 | 7/2002 | Wuytack et al. | |
| 6,421,817 B1 | 7/2002 | Mohan et al. | |
| 6,425,054 B1 | 7/2002 | Nguyen | |
| 6,425,068 B1 | 7/2002 | Vorbach | |
| 6,426,649 B1 | 7/2002 | Fu et al. | |
| 6,427,156 B1 | 7/2002 | Chapman et al. | |
| 6,430,309 B1 | 8/2002 | Pressman et al. | |
| 6,434,642 B1 | 8/2002 | Camilleri et al. | |
| 6,434,672 B1 | 8/2002 | Gaither | |
| 6,434,695 B1 | 8/2002 | Esfahani et al. | |
| 6,434,699 B1 | 8/2002 | Jones et al. | |
| 6,437,441 B1 | 8/2002 | Yamamoto | |
| 6,438,747 B1 | 8/2002 | Schreiber et al. | |
| 6,449,283 B1 | 9/2002 | Chao et al. | |
| 6,456,628 B1 | 9/2002 | Greim et al. | |
| 6,457,116 B1 | 9/2002 | Mirsky et al. | |
| 6,476,634 B1 | 11/2002 | Bilski | |
| 6,477,643 B1 | 11/2002 | Vorbach et al. | |
| 6,480,937 B1 | 11/2002 | Vorbach et al. | |
| 6,480,954 B2 | 11/2002 | Trimberger et al. | |
| 6,483,343 B1 | 11/2002 | Faith et al. | |
| 6,487,709 B1 | 11/2002 | Keller et al. | |
| 6,490,695 B1 | 12/2002 | Zagorski et al. | |
| 6,496,740 B1 | 12/2002 | Robertson et al. | |
| 6,496,902 B1 | 12/2002 | Faanes et al. | |
| 6,496,971 B1 | 12/2002 | Lesea et al. | |
| 6,504,398 B1 | 1/2003 | Lien et al. | |
| 6,507,898 B1 | 1/2003 | Gibson et al. | |
| 6,507,947 B1 | 1/2003 | Schreiber et al. | |
| 6,512,804 B1 | 1/2003 | Johnson et al. | |
| 6,513,077 B2 | 1/2003 | Vorbach et al. | |
| 6,516,382 B2 | 2/2003 | Manning | |
| 6,518,787 B1 | 2/2003 | Allegrucci et al. | |
| 6,519,674 B1 | 2/2003 | Lam et al. | |
| 6,523,107 B1 | 2/2003 | Stansfield et al. | |
| 6,525,678 B1 | 2/2003 | Veenstra et al. | |
| 6,526,520 B1 | 2/2003 | Vorbach et al. | |
| 6,538,468 B1 | 3/2003 | Moore | |
| 6,538,470 B1 | 3/2003 | Langhammer et al. | |
| 6,539,415 B1 | 3/2003 | Mercs | |
| 6,539,438 B1 | 3/2003 | Ledzius et al. | |
| 6,539,477 B1 | 3/2003 | Seawright | |
| 6,542,394 B2 | 4/2003 | Marshall et al. | |
| 6,542,844 B1 | 4/2003 | Hanna | |
| 6,542,998 B1 | 4/2003 | Vorbach | |
| 6,553,395 B2 | 4/2003 | Marshall et al. | |

| | | | |
|---|---|---|---|
| 6,553,479 B2 | 4/2003 | Mirsky et al. | |
| 6,567,834 B1 | 5/2003 | Marshall et al. | |
| 6,571,381 B1 | 5/2003 | Vorbach et al. | |
| 6,587,939 B1 | 7/2003 | Takano | |
| 6,598,128 B1 | 7/2003 | Yoshioka et al. | |
| 6,606,704 B1 | 8/2003 | Adiletta et al. | |
| 6,624,819 B1 | 9/2003 | Lewis | |
| 6,625,631 B2 | 9/2003 | Ruehle | |
| 6,631,487 B1 | 10/2003 | Abramovici et al. | |
| 6,633,181 B1 | 10/2003 | Rupp | |
| 6,657,457 B1 | 12/2003 | Hanrahan et al. | |
| 6,658,564 B1 | 12/2003 | Smith et al. | |
| 6,665,758 B1 | 12/2003 | Frazier et al. | |
| 6,668,237 B1 | 12/2003 | Guccione et al. | |
| 6,681,388 B1 | 1/2004 | Sato et al. | |
| 6,687,788 B2 | 2/2004 | Vorbach et al. | |
| 6,697,979 B1 | 2/2004 | Vorbach et al. | |
| 6,704,816 B1 | 3/2004 | Burke | |
| 6,708,325 B2 | 3/2004 | Cooke et al. | |
| 6,717,436 B2 | 4/2004 | Kress et al. | |
| 6,721,830 B2 | 4/2004 | Vorbach et al. | |
| 6,725,334 B2 | 4/2004 | Barroso et al. | |
| 6,728,871 B1 | 4/2004 | Vorbach et al. | |
| 6,745,317 B1 | 6/2004 | Mirsky et al. | |
| 6,748,440 B1 | 6/2004 | Lisitsa et al. | |
| 6,751,722 B2 | 6/2004 | Mirsky et al. | |
| 6,754,805 B1 | 6/2004 | Yujen | |
| 6,757,847 B1 | 6/2004 | Farkash et al. | |
| 6,757,892 B1 | 6/2004 | Gokhale et al. | |
| 6,782,445 B1 | 8/2004 | Olgiati et al. | |
| 6,785,826 B1 | 8/2004 | Durham et al. | |
| 6,802,206 B2 | 10/2004 | Patterson et al. | |
| 6,803,787 B1 | 10/2004 | Wicker, Jr. | |
| 6,820,188 B2 | 11/2004 | Stansfield et al. | |
| 6,829,697 B1 | 12/2004 | Davis et al. | |
| 6,836,842 B1 | 12/2004 | Guccione et al. | |
| 6,847,370 B2 | 1/2005 | Baldwin et al. | |
| 6,859,869 B1 | 2/2005 | Vorbach | |
| 6,868,476 B2 | 3/2005 | Rosenbluth et al. | |
| 6,871,341 B1 | 3/2005 | Shyr | |
| 6,874,108 B1 | 3/2005 | Abramovici et al. | |
| 6,886,092 B1 | 4/2005 | Douglass et al. | |
| 6,901,502 B2 | 5/2005 | Yano et al. | |
| 6,928,523 B2 | 8/2005 | Yamada | |
| 6,957,306 B2 | 10/2005 | So et al. | |
| 6,961,924 B2 | 11/2005 | Bates et al. | |
| 6,975,138 B2 | 12/2005 | Pani et al. | |
| 6,977,649 B1 | 12/2005 | Baldwin et al. | |
| 7,000,161 B1 | 2/2006 | Allen et al. | |
| 7,007,096 B1 | 2/2006 | Lisitsa et al. | |
| 7,010,667 B2 | 3/2006 | Vorbach et al. | |
| 7,010,687 B2 | 3/2006 | Ichimura | |
| 7,028,107 B2 | 4/2006 | Vorbach et al. | |
| 7,036,114 B2 | 4/2006 | McWilliams et al. | |
| 7,038,952 B1 | 5/2006 | Zack et al. | |
| 7,043,416 B1 | 5/2006 | Lin | |
| 7,210,129 B2 | 4/2007 | May et al. | |
| 7,216,204 B2 | 5/2007 | Rosenbluth et al. | |
| 7,237,087 B2 | 6/2007 | Vorbach et al. | |
| 7,249,351 B1 | 7/2007 | Songer et al. | |
| 7,254,649 B2 | 8/2007 | Subramanian et al. | |
| 7,340,596 B1 | 3/2008 | Crosland et al. | |
| 7,346,644 B1 | 3/2008 | Langhammer et al. | |
| 7,350,178 B1 | 3/2008 | Crosland et al. | |
| 7,382,156 B2 | 6/2008 | Pani et al. | |
| 7,595,659 B2 | 9/2009 | Vorbach et al. | |
| 7,650,448 B2 | 1/2010 | Vorbach et al. | |
| 7,657,877 B2 | 2/2010 | Vorbach et al. | |
| 7,759,968 B1 | 7/2010 | Hussein et al. | |
| 7,873,811 B1 | 1/2011 | Wolinski et al. | |
| 2001/0001860 A1 | 5/2001 | Bieu | |
| 2001/0003834 A1 | 6/2001 | Shimonishi | |
| 2001/0010074 A1 | 7/2001 | Nishihara et al. | |
| 2001/0018733 A1 | 8/2001 | Fujii et al. | |
| 2001/0032305 A1 | 10/2001 | Barry | |
| 2002/0010853 A1 | 1/2002 | Trimberger et al. | |
| 2002/0013861 A1 | 1/2002 | Adiletta et al. | |
| 2002/0038414 A1 | 3/2002 | Taylor | |
| 2002/0045952 A1 | 4/2002 | Blemel | |
| 2002/0073282 A1 | 6/2002 | Chauvel et al. | |
| 2002/0083308 A1 | 6/2002 | Pereira et al. | |
| 2002/0099759 A1 | 7/2002 | Gootherts | |
| 2002/0103839 A1 | 8/2002 | Ozawa | |
| 2002/0124238 A1 | 9/2002 | Metzgen | |
| 2002/0138716 A1 | 9/2002 | Paul et al. | |
| 2002/0143505 A1 | 10/2002 | Drusinsky | |
| 2002/0144229 A1 | 10/2002 | Hanrahan | |
| 2002/0152060 A1 | 10/2002 | Tseng | |
| 2002/0156962 A1 | 10/2002 | Chopra et al. | |
| 2002/0165886 A1 | 11/2002 | Lam | |
| 2003/0001615 A1 | 1/2003 | Sueyoshi et al. | |
| 2003/0014743 A1 | 1/2003 | Cooke et al. | |
| 2003/0046607 A1 | 3/2003 | Vorbach | |
| 2003/0052711 A1 | 3/2003 | Taylor | |
| 2003/0055861 A1 | 3/2003 | Lai et al. | |
| 2003/0056062 A1 | 3/2003 | Prabhu | |
| 2003/0056085 A1 | 3/2003 | Vorbach | |
| 2003/0056091 A1 | 3/2003 | Greenberg | |
| 2003/0056202 A1 | 3/2003 | Vorbach | |
| 2003/0061542 A1 | 3/2003 | Bates et al. | |
| 2003/0062922 A1 | 4/2003 | Douglass et al. | |
| 2003/0070059 A1 | 4/2003 | Dally et al. | |
| 2003/0086300 A1 | 5/2003 | Noyes et al. | |
| 2003/0093662 A1 | 5/2003 | Vorbach et al. | |
| 2003/0097513 A1 | 5/2003 | Vorbach et al. | |
| 2003/0123579 A1 | 7/2003 | Safavi et al. | |
| 2003/0135686 A1 | 7/2003 | Vorbach et al. | |
| 2003/0154349 A1 | 8/2003 | Berg et al. | |
| 2003/0192032 A1 | 10/2003 | Andrade et al. | |
| 2004/0015899 A1 | 1/2004 | May et al. | |
| 2004/0025005 A1 | 2/2004 | Vorbach et al. | |
| 2004/0039880 A1 | 2/2004 | Pentkovski et al. | |
| 2004/0078548 A1 | 4/2004 | Claydon et al. | |
| 2004/0168099 A1 | 8/2004 | Vorbach et al. | |
| 2004/0199688 A1 | 10/2004 | Vorbach et al. | |
| 2005/0066213 A1 | 3/2005 | Vorbach et al. | |
| 2005/0091468 A1 | 4/2005 | Morita et al. | |
| 2005/0144210 A1 | 6/2005 | Simkins et al. | |
| 2005/0144212 A1 | 6/2005 | Simkins et al. | |
| 2005/0144215 A1 | 6/2005 | Simkins et al. | |
| 2006/0036988 A1 | 2/2006 | Allen et al. | |
| 2006/0230094 A1 | 10/2006 | Simkins et al. | |
| 2006/0230096 A1 | 10/2006 | Thendean et al. | |
| 2007/0083730 A1 | 4/2007 | Vorbach et al. | |
| 2008/0313383 A1 | 12/2008 | Morita et al. | |
| 2009/0085603 A1 | 4/2009 | Paul et al. | |
| 2009/0193384 A1 | 7/2009 | Sima et al. | |
| 2010/0306602 A1 | 12/2010 | Kamiya et al. | |

FOREIGN PATENT DOCUMENTS

| | | |
|---|---|---|
| DE | 44 16 881 | 11/1994 |
| DE | 38 55 673 | 11/1996 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 22 776 | 3/1999 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 1/1987 |
| EP | 0 221 360 | 5/1987 |
| EP | 0 398 552 | 11/1990 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 497 029 | 8/1992 |
| EP | 0 539 595 | 5/1993 |
| EP | 0 638 867 A2 | 8/1994 |
| EP | 0 628 917 | 12/1994 |

| | | |
|---|---|---|
| EP | 0 678 985 | 10/1995 |
| EP | 0 686 915 | 12/1995 |
| EP | 0 707 269 | 4/1996 |
| EP | 0 726 532 | 8/1996 |
| EP | 0 735 685 | 10/1996 |
| EP | 0 746 106 | 12/1996 |
| EP | 0 748 051 | 12/1996 |
| EP | 0 926 594 | 6/1999 |
| EP | 1 061 439 | 12/2000 |
| EP | 1 102 674 | 5/2001 |
| EP | 1 115 204 | 7/2001 |
| EP | 1 146 432 | 10/2001 |
| EP | 0 696 001 | 12/2001 |
| EP | 1 669 885 | 6/2006 |
| FR | 2 752 466 | 2/1998 |
| GB | 2 304 438 | 3/1997 |
| JP | 58-58672 | 4/1983 |
| JP | 10-44571 | 2/1989 |
| JP | 1-229378 | 9/1989 |
| JP | 2-130023 | 5/1990 |
| JP | 2-226423 | 9/1990 |
| JP | 5-265705 | 10/1993 |
| JP | 5-276007 | 10/1993 |
| JP | 6-266605 | 9/1994 |
| JP | 7-086921 | 3/1995 |
| JP | 7-154242 | 6/1995 |
| JP | 8-148989 | 6/1995 |
| JP | 7-182160 | 7/1995 |
| JP | 7-182167 | 7/1995 |
| JP | 8-44581 | 2/1996 |
| JP | 08069447 | 3/1996 |
| JP | 8-101761 | 4/1996 |
| JP | 8-102492 | 4/1996 |
| JP | 8-106443 | 4/1996 |
| JP | 8-221164 | 8/1996 |
| JP | 8-250685 | 9/1996 |
| JP | 9-27745 | 1/1997 |
| JP | 9-237284 | 9/1997 |
| JP | 9-294069 | 11/1997 |
| JP | 11-046187 | 2/1999 |
| JP | 11-184718 | 7/1999 |
| JP | 11-307725 | 11/1999 |
| JP | 2000-076066 | 3/2000 |
| JP | 2000-181566 | 6/2000 |
| JP | 2000-201066 | 7/2000 |
| JP | 2000-311156 | 11/2000 |
| JP | 2001-500682 | 1/2001 |
| JP | 2001-167066 | 6/2001 |
| JP | 2001-510650 | 7/2001 |
| JP | 2001-236221 | 8/2001 |
| JP | 2002-0033457 | 1/2002 |
| JP | 05-509184 | 12/2003 |
| JP | 3-961028 | 8/2007 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO 098/035294 | 8/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | 00/45282 | 8/2000 |
| WO | WO 00/49496 | 8/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO 02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO 03/091875 | 11/2003 |
| WO | WO 2004/053718 | 6/2004 |
| WO | WO2004/114128 | 12/2004 |
| WO | WO 2005/045692 | 5/2005 |
| WO | WO 2007/030395 | 3/2007 |

OTHER PUBLICATIONS

Atmel, FPGA-based FIR Filter Application Note, Sep. 1999, 10 pages.
Atmel, "An Introduction to DSP Applications using the AT40K FPGA," FPGA Application Engineering, San Jose, CA, Apr. 2004, 15 pages.
Atmel, Configurable Logic Design & Application Book, Atmel Corporation, 1995, pp. 2-19 through 2-25.
Atmel, Field Programmable Gate Array Configuration Guide, AT6000 Series Configuration Data Sheet, Sep. 1999, pp. 1-20.
Bacon, D. et al., "Compiler Transformations for High-Performance Computing," ACM Computing Surveys, 26(4):325-420 (1994).
Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).
Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).
Cardoso, J.M.P. et al., "Compilation and Temporal Partitioning for a Coarse-Grain Reconfigurable Architecture," Lysacht, P. & Rosentiel, W. eds., "New Algorithms, Architectures and Applications for Reconfigurable Computing," (2005) pp. 105-115.
Cardoso, J.M.P. et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on NAPA Valley, CA, USA, Apr. 21-23, 1999, IEEE Comput. Soc, US, (Apr. 21, 1999) pp. 2-11.
Clearspeed, CSX Processor Architecture, Whitepaper, PN-1110-0702, 2007, pp. 1-15, www.clearspeed.com.
Clearspeed, CSX Processor Architecture, Whitepaper, PN-1110-0306, 2006, pp. 1-14, www.clearspeed.com.
Cook, Jeffrey J., "The Amalgam Compiler Infrastructure," Thesis at the University of Illinois at Urbana-Champaign (2004) Chapter 7 & Appendix G.
Cronquist, D. et al., Architecture Design of Reconfigurable Pipelined Datapaths, Department of Computer Science and Engineering, University of Washington, Seattle, WA, Proceedings of the 20th Anniversary Conference on Advanced Research in VSLI, 1999, pp. 1-15.
DeHon, Andre, "Reconfigurable Architectures for General-Purpose Computing," Massachusetts Institute of Technology, Technical Report AITR-1586, Oct. 1996, XP002445054, Cambridge, MA, pp. 1-353.
Ebeling, C. et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.
Equator, Pixels to Packets, Enabling Multi-Format High Definition Video, Equator Technologies BSP-15 Product Brief, www.equator.com, 2001, 4 pages.

Fawcett, B.K., "Map, Place and Route: The Key to High-Density PLD Implementation," Wescon Conference, IEEE Center (Nov. 7, 1995) pp. 292-297.

Freescale Slide Presentation, An Introduction to Motorola's RCF (Reconfigurable Compute Fabric) Technology, Presented by Frank David, Launched by Freescale Semiconductor, Inc., 2004, 39 pages.

Genius, D. et al., "A Case for Array Merging in Memory Hierarchies," Proceedings of the 9th International Workshop on Compilers for Parallel Computers, CPC'01 (Jun. 2001), 10 pages.

Hartenstein, R. et al., "A new FPGA architecture for word-oriented datapaths," Proc. FPL'94, Springer LNCS, Sep. 1994, pp. 144-155.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Hwang, K., "Computer Architecture and Parallel Processing," Data Flow Computers and VLSI Computations, XP-002418655, 1985 McGraw-Hill, Chapter 10, pp. 732-807.

Inside DSP, "Ambric Discloses Massively Parallel Architecture," Aug. 23, 2006, HTTP://insidedsp.com/tabid/64/articleType/ArticleView/articleId/155/Defa..., 2 pages.

Intel, Intel MXP5800/MXP5400 Digital Media Processors, Architecture Overview, Jun. 2004, Revision 2.4, pp. 1-24.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the 6$^{th}$ International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001 pp. 509-523.

Koch, Andreas et al., "High-Level-Language Compilation for Reconfigurable Computers," Proceedings of European Workshop on Reconfigurable Communication-Centric SOCS (Jun. 2005) 8 pages.

Larsen, S. et al., "Increasing and Detecting Memory Address Congruence," Proceedings of the 2002 IEEE International Conference on Parallel Architectures and Compilation Techniques (PACT'02), pp. 1-12 (Sep. 2002).

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01⁻design.pdf.

Miyamori, T. et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Moraes, F., et al., "A Physical Synthesis Design Flow Based on Virtual Components," XV Conference on Design of Circuits and Integrated Systems (Nov. 2000) 6 pages.

Muchnick, S., "Advanced Compiler Design and Implementation" (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Nageldinger, U., "Design-Space Exploration for Coarse Grained Reconfigurable Architectures," (Dissertation) Universitaet Kaiserslautern, 2000, Chapter 2, pp. 19-45.

Neumann, T., et al., "A Generic Library for Adaptive Computing Environments," Field Programmable Logic and Applications, 11$^{th}$ International Conference, FPL 2001, Proceedings (Lecture Notes in Computer Science, vol. 2147) (2001) pp. 503-512.

Olukotun, K., "The Case for a Single-Chip Microprocessor," ACM Sigplan Notices, ACM, Association for Computing Machinery, New York, vol. 31, No. 9, Sep. 1996 pp. 2-11.

PACT Corporation, "The XPP Communication System," Technical Report 15 (2000), pp. 1-16.

Parhami, B., "Parallel Counters for Signed Binary Signals," Signals, Systems and Computers, 1989, Twenty-Third Asilomar Conference, vol. 1, pp. 513-516.

Saleeba, Z.M.G., "A Self-Reconfiguring Computer System," Department of Computer Science, Monash University (Dissertation) 1998, pp. 1-306.

Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.

Shin, D., et al., "C-based Interactive RTL Design Methodology," Technical Report CECS-03-42 (Dec. 2003) pp. 1-16.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Sondervan, J., "Retiming and logic synthesis," Electronic Engineering (Jan. 1993) vol. 65(793), pp. 33, 35-36.

Soni, M., "VLSI Implementation of a Wormhole Run-time Reconfigurable Processor," Jun. 2001, (Masters Thesis)Virginia Polytechnic Institute and State University, 88 pages.

Vasell et al., "The Function Processor: A Data-Driven Processor Array for Irregular Computations," Chalmers University of Technology, Sweden, pp. 1-21.

Waingold, E, et al., "Baring it all to software: Raw machines," IEEE Computer, Sep. 1997, at 86-93.

Weinhardt, Markus et al., "Memory Access Optimization for Reconfigurable Systems," IEEE Proceedings Computers and Digital Techniques, 48(3) (May 2001) pp. 1-16.

Wolfe, M. et al., "High Performance Compilers for Parallel Computing" (Addison-Wesley 1996) Table of Contents, 11 pages.

Xilinx, "Virtex-E 1.8 V Extended Memory Field Programmable Gate Arrays," Jul. 17, 2002, Xilinx Production Product Specification, pp. 1-118.

Xilinx, "Virtex-II and Virtex-II Pro X FPGA User Guide," Mar. 28, 2007, Xilinx user guide, pp. 1-559.

Zima, H. et al., "Supercompilers for parallel and vector computers" (Addison-Wesley 1991) Table of Contents, 5 pages.

ARM Limited, "ARM Architecture Reference Manual," Dec. 6, 2000, pp. A10-6-A10-7.

Abnous et al., "Ultra-Low-Power Domain-Specific Multimedia Processors," U.C. Berkeley, 1996 IEEE, pp. 461-470.

Abnous, A., et al., "The Pleiades Architecture," Chapter I of *The Application of Programmable DSPs in Mobile Communications*, A. Gatherer and A. Auslander, Ed., Wiley, 2002, pp. 1-33.

Ade, et al., "Minimum Memory Buffers in DSP Applications," Electronics Letters, vol. 30, No. 6, Mar. 17, 1994, pp. 469-471.

Albaharna, O.T. et al., "On the Viability of FPGA-Based Integrated Coprocessors," Dept. of Electrical and Electronic Engineering, Imperial College of Science, London, 1999 IEEE, pp. 206-215.

Alippi, et al., "Determining the Optimum Extended Instruction Set Architecture for Application Specific Reconfigurable VLIW CPUs," IEEE, 2001, pp. 50-56.

Altera, "Flex 8000 Programmable Logic Device Family," Altera Corporation product description, Jan. 2003, pp. 1-62.

Altera, "Flex 10K Embedded Programmable Logic Device Family," Altera Corporation product description, Jan. 2003, pp. 1-128.

Arabi, et al., "PLD Integrates Dedicated High-speed Data Buffering, Complex State machine, and Fast Decode Array," conference record on Wescon '93, Sep. 28, 1993, pp. 432-436.

Athanas, "A Functional Reconfigurable Architecture and Compiler for Adoptive Computing," IEEE 1993, pp. 49-55.

Athanas, et al., "An Adaptive Hardware Machine Architecture and Compiler for Dynamic Processor Reconfigutation," IEEE, Laboratory for Engineering man/Machine Systems Division of Engineering, Box D, Brown University, Providence, Rhode Island, 1991, pp. 397-400.

Athanas et al., "Processor Reconfiguration Through Instruction-Set Metamorphosis;" 1993, IEEE Computers, pp. 11-18.

Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.

Baumgarte, V. et al., PACT XPP "A Self-reconfigurable Data Processing Architecture," PACT Info. GMBH, Munchen Germany, 2001, 7 pages.

Beck et al., "From control flow to data flow," TR 89-1050, Oct. 1989, Dept. Of Computer Science, Cornell University, Ithaca, NY, pp. 1-25.

Becker, J. et al., "Parallelization in Co-compilation for Configurable Accelerators—a Host/accelerator Partitioning Compilation Method," Poceedings of Asia and South Pacific Design Automation Conference, Yokohama, Japan, Feb. 10-13, 1998, 11 pages.

Bittner, "Wormhole Run-time Reconfiguration: Conceptualization and VLSI Design of a High Performance Computing System," *Dissertation*, Jan. 23, 1997, pp. 1-XX, 1-415.

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.

Cadambi, et al., "Managing Pipeline-reconfigurable FPGAs," ACM, 1998, pp. 55-64.

Callahan, et al., "The Garp Architecture and C Compiler," Computer, Apr. 2000, pp. 62-69.

Cardoso, J.M.P. et al., "A novel algorithm combining temporal partitioning and sharing of functional units," University of Algarve, Faro, Portugal, 2001 IEEE, pp. 1-10.

Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12$^{th}$ International Conference FPL 2002, Proceedings (Lecture Notes in Computer Science, vol. 2438) Springer-Verlag Berlin, Germany, 2002, pp. 864-874.

Cardoso, J.M.P. "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and English Abstract only).

Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.

Compton, K. et al., "Configurable Computing: A Survey of Systems and Software," Northwestern University, Dept. Of ECE, Technical Report, 1999, (XP-002315148), 39 pages.

DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

Diniz, P., et al., "Automatic Synthesis of Data Storage and Control Structures for FPGA-based Computing Engines," 2000, IEEE, pp. 91-100.

Diniz, P., et al., "A behavioral synthesis estimation interface for configurable computing," University of Southern California, Marina Del Rey, CA, 2001 IEEE, pp. 1-2.

Donandt, "Improving Response Time of Programmable Logic Controllers by use of a Boolean Coprocessor," AEG Research Institute Berlin, IEEE, 1989, pp. 4-167-4-169.

Dutt, et al., "If Software is King for Systems-in-Silicon, What's New in Compilers?," IEEE, 1997, pp. 322-325.

Ferrante, J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.

Fornaciari, et al., System-level power evaluation metrics, 1997 Proceedings of the 2$^{nd}$ Annual IEEE International Conference on Innovative Systems in Silicon, New York, NY, Oct. 1997, pp. 323-330.

Forstner, "Wer Zuerst Kommt, Mahlt Zuerst!: Teil 3: Einsatzgebiete und Anwendungbeispiele von FIFO-Speichern," Elektronik, Aug. 2000, pp. 104-109.

Franklin, Manoj et al., "A Fill-Unit Approach to Multiple Instruction Issue," Proceedings of the Annual International Symposium on Microarchitecture, Nov. 1994, pp. 162-171.

Gokhale, M.B.et al., "Automatic Allocation of Arrays to Memories in FPGA processors with Multiple Memory Banks," Field-Programmable Custom Computing Machines, 1999, IEEE, 6 pages.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31.4.3 (3 pages).

Hauck, "The Roles of FPGAs in Reprogrammable Systems," IEEE, Apr. 1998, pp. 615-638.

Hauser, J.R., et al., "Garp: A MIPS Processor with a Reconfigurable Coprocessor," University of California, Berkeley, IEEE, 1997, pp. 24-33.

Hedge, S.J., "3D WASP Devices for On-line Signal and Data Processing," 1994, International Conference on Wafer Scale Integration, pp. 11-21.

Hwang, K., "Advanced Computer Architecture—Parallelism, Scalability, Programmability," 1993, McGraw-Hill, Inc., pp. 348-355.

Hwang, L. et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

IBM Technical Disclosure Bulletin, IBM Corp., New York, XP000424878, Bd. 36, Nr. 11, Nov. 1, 1993, pp. 335-336.

Iseli, C.,et al. "A C++ Compiler for FPGA Custom Execution Units Synthesis," IEEE, 1995, pp. 173-179.

Isshiki, Tsuyoshi, et al., "Bit-Serial Pipeline Synthesis for Multi-FPGA Systems with C++ Design Capture," 1996 IEEE, pp. 38-47.

Jacob, J., et al., "Memory Interfacing and Instruction Specification for Reconfigurable Processors," ACM 1999, pp. 145-154.

Jantsch, Axel et al., "A Case Study on Hardware/Software Partitioning," Royal Institute of Technology, Kista, Sweden, Apr. 10, 1994, IEEE, pp. 111-118.

John, L., et al., "A Dynamically Reconfigurable Interconnect for Array Processors," vol. 6, No. 1, Mar. 1998, IEEE, pp. 150-157.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Kaul, M., et al., "An automated temporal partitioning and loop fission approach of FPGA based reconfigurable synthesis of DSP applications," University of Cincinnati, Cincinnati, OH, ACM 1999, pp. 616-622.

Knittel, Gunter, "A PCI-compatible FPGA-Coprocessor for 2D/3D Image Processing," University of Turgingen, Germany, 1996 IEEE, pp. 136-145.

Koch, A., et al., "Practical Experiences with the SPARXIL Co-Processor," 1998, IEEE, pp. 394-398.

Koren et al., "A data-driven VLSI array for arbitrary algorithms," IEEE Computer Society, Long Beach, CA vol. 21, No. 10, Oct. 1, 1988, pp. 30-34.

Kung, "Deadlock Avoidance for Systolic Communication," 1988 Conference Proceedings of the 15$^{th}$ Annual International Symposium on Computer Architecture, May 30, 1998, pp. 252-260.

Lee et al., "A new distribution network based on controlled switching elements and its applications," IEEE/ACT Trans. of Networking, vol. 3, No. 1, pp. 70-81, Feb. 1995.

Lee, Jong-eun et al., "Reconfigurable ALU Array Architecture with Conditional Execution," International Soc. Design Conference (ISOOC) [online] Oct. 25, 2004, Seoul, Korea, 5 pages.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317 [This references is in Chinese, but should be comparable in content to the Ling et al. reference above].

Mano, M.M., "Digital Design," by Prentice Hall, Inc., Englewood Cliffs, New Jersey 07632, 1984, pp. 119-125, 154-161.

Margolus, N., "An FPGA architecture for DRAM-based systolic computations," Boston University Center for Computational Science and MIT Artificial Intelligence Laboratory, IEEE 1997, pp. 2-11.

Maxfield,C., "Logic that Mutates While-U-Wait," EDN (Bur. Ed) (USA), EDN (European Edition), Nov. 7, 1996, Cahners Publishing, USA, pp. 137-140, 142.

Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Myers, G. "Advances in Computer Architecture," Wiley-Interscience Publication, 2nd ed., John Wiley & Sons, Inc., 1978, pp. 463-494.

Nilsson, et al., "The Scalable Tree Protocol—A Cache Coherence Approaches for Large-Scale Multiprocessors," IEEE, pp. 498-506, Dec. 1992.

Norman, R.S., "Hyperchip Business Summary, The Opportunity," Jan. 31, 2000, pp. 1-3.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

Piotrowski, A., "IEC-BUS, Die Funktionsweise des IEC-Bus unde seine Anwendung in Geräten und Systemen," 1987, Franzis-Verlag GmbH, München, pp. 20-25.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Razdan et al., A High-Performance Microarchitecture with Hardware-Programmable Functional Units, Micro-27, Proceedings of the 27th Annual International Symposium on Microarchitecture, IEEE Computer Society and Association for Computing Machinery, Nov. 30-Dec. 2, 1994, pp. 172-180.

Saleeba, M. "A Self-Contained Dynamically Reconfigurable Processor Architecture," Sixteenth Australian Computer Science Conference, ASCS-16, QLD, Australia, Feb., 1993, pp. 59-70.

Schmit, et al., "Hidden Markov Modeling and Fuzzy Controllers in FPGAs, FPGAs for Custom Computing Machines," 1995; Proceedings, IEEE Symposium in Napa Valley, CA, Apr. 1995, pp. 214-221.

Schmidt, H. et al., "Behavioral synthesis for FGPA-based computing," Carnegie Mellon University, Pittsburgh, PA, 1994 IEEE, pp. 125-132.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Siemers, C.,"Rechenfabrik Ansaetze Fuer Extrem Parallele Prozessoren," Verlag Heinze Heise GmbH., Hannover, DE No. 15, Jul. 16, 2001, pp. 170-179.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the 3rd Australian Computer Architecture Conference, Perth, John Morris, Ed., Feb. 2-3, 1998, pp. 169-178.

Simunic, et al., Source Code Optimization and Profiling of Energy Consumation in Embedded Systems, Proceedings of the 13th International Symposium on System Synthesis, Sep. 2000, pp. 193-198.

Skokan, Z.E., "Programmable logic machine (A programmable cell array)," IEEE Journal of Solid-State Circuits, vol. 18, Issue 5, Oct. 1983, pp. 572-578.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

Sutton et al., "A Multiprocessor DSP System Using PADDI-2," U.C. Berkeley, 1998 ACM, pp. 62-65.

Tau, E., et al., "A First Generation DPGA Implementation," *FPD '95*, pp. 138-143.

Tenca, A.F., et al., "A Variable Long-Precision Arithmetic Unit Design for Reconfigurable Coprocessor Architectures," University of California, Los Angeles, 1998, pp. 216-225.

The XPP White Paper, Release 2.1, PACT—A Technical Perspective, Mar. 27, 2002, pp. 1-27.

TMS320C54X DSP: CPU and Peripherals, Texas Instruments, 1996, 25 pages.

TMS320C54x DSP: Mnemonic Instruction Set, Texas Instruments, 1996, 342 pages.

Tsutsui, A., et al., "Yards: FPGA/MPU Hybrid Architecture for Telecommunication Data Processing," NTT Optical Network Systems Laboratories, Japan, 1997 ACM, pp. 93-99.

Villasenor, et al., "Configurable Computing Solutions for Automatic Target Recognition," *IEEE*, 1996 pp. 70-79.

Villasenor, et al., "Configurable Computing," *Scientific American*, vol. 276, No. 6, Jun. 1997, pp. 66-71.

Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.

Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.

Weinhardt, M., "Compilation Methods for Structure-programmable Computers," dissertation, ISBN 3-89722-011-3, 1997 [Table of Contents and English Abstract Provided].

Weinhardt, Markus et al., "Pipeline Vectorization for Reconfigurable Systems," 1999, IEEE, pp. 52-62.

Weinhardt, Markus et al., "Pipeline Vectorization," IEEE Transactions on Computer-Aided Design of Integrated Circuits and Systems, vol. 20, No. 2, Feb. 2001, pp. 234-248.

Wittig, et al., "OneChip: An FPGA Processor with Reconfigurable Logic," IEEE, 1996, pp. 126-135.

Wu, et al., "A New Cache Directory Scheme," IEEE, pp. 466-472, Jun. 1996.

Xu, H.Y. et al., "Parallel QR Factorization on a Block Data Flow Architecture," Conference Proceeding Article, Mar. 1, 1992, pp. 332-336 XPO10255276, p. 333, Abstract 2.2, 2.3, 2.4-p. 334.

Xilinx, "Logic Cell Array Families: XC4000, XC4000A and XC4000H," 1994, product description, pp. 2-7, 2-9, 2-14, 2-15, 8-16, and 9-14.

Xilinx, "Spartan and SpartanXL Families Field Programmable Gate Arrays," Jan. 1999, Xilinx, pp. 4-3 through 4-70.

Xilinx, "XC6200 Field Programmable Gate Arrays," Apr. 24, 1997, Xilinx product description, pp. 1-73.

Xilinx, "XC3000 Series Field Programmable Gate Arrays," Nov. 6, 1998, Xilinx product description, pp. 1-76.

Xilinx, "XC4000E and XC4000X Series Field Programmable Gate Arrays," May 14, 1999, Xilinx product description, pp. 1-68.

Ye, Z.A. et al., "A C-Compiler for a Processor With a Reconfigurable Functional Unit," FPGA 2000 ACM/SIGNA International Symposium on Field Programmable Gate Arrays, Monterey, CA Feb 9-11, 2000, pp. 95-100.

Yeung, A. et al., "A data-driven architecture for rapid prototyping of high throughput DSP algorithms," Dept. of Electrical Engineering and Computer Sciences, Univ. Of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. Of Electrical Engineering and Computer Sciences, Univ. of California, Berkeley, USA, pp. 169-178, *IEEE* 1993.

Zhang, et al., "Architectural Evaluation of Flexible Digital Signal Processing for Wireless Receivers, Signals, Systems and Computers," 2000; Conference Record of the Thirty-Fourth Asilomar Conference, Bd. 1, Oct. 29, 2000, pp. 78-83.
Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.
Zhang et al., "Abstract: Low-Power Heterogeneous Reconfigurable Digital Signal Processors with Energy-Efficient Interconnect Network," U.C. Berkeley (2004), pp. 1-120.
Huang, Libo et al., "A New Architecture for Multiple-Precision Floating-Point Multiply-Add Fused Unit Design," School of Computer National University of Defense Technology, China, IEEE 2007, 8 pages.
Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.
Xilinx, White Paper 370: (Virtex-6 and Spartan-6 FPGA Families) "Reducing Switching Power with Intelligent Clock Gating," Frederic Rivoallon, May 3, 2010, pp. 1-5.
Xilinx, White Paper 298: (Spartan-6 and Virtex-6 Devices) "Power Consumption at 40 and 50 nm," Matt Klein, Apr. 13, 2009, pp. 1-21.
Culler, D.E; Singh, J.P., "Parallel Computer Architecture," p. 17, 1999, Morgan Kaufmann, San Francisco, CA USA, XP002477559.
Short, Kenneth L., *Microprocessors and Programmed Logic*, Prentice Hall, Inc., New Jersey 1981, p. 34.
Webster's Ninth New Collegiate Dictionary, Merriam-Webster, Inc., 1990, p. 332 (definition of "dedicated").
U.S. Appl. No. 90/010,450, filed Mar. 27, 2009.
U.S. Appl. No. 90/010,979, filed May 4, 2010, Vorbach et al.
U.S. Appl. No. 90/011,087, filed Jul. 8, 2010, Vorbach et al.
Altera, "2. TriMatrix Embedded Memory Blocks in Stratix & Stratix GX Devices," Altera Corporation, Jul. 2005, 28 pages.
Altera, "APEX II Programmable Logic Device Family," Altera Corporation Data Sheet, Aug. 2002, Ver. 3.0, 99 pages.
"BlueGene/L—Hardware Architecture Overview," BlueGene/L design team, IBM Research, Oct. 17, 2003 slide presentation, pp. 1-23.
"BlueGene/L: the next generation of scalable supercomputer," Kissel et al., Lawrence Livermore National Laboratory, Livermore, California, Nov. 18, 2002, 29 pages.
BlueGene Project Update, Jan. 2002, IBM slide presentation, 20 pages.
BlueGene/L, "An Overview of the BlueGene/L Supercomputer," The BlueGene/L Team, IBM and Lawrence Livermore National Laboratory, 2002 IEEE. pp. 1-22.
Galanis, M.D. et al., "Accelerating Applications by Mapping Critical Kernels on Coarse-Grain Reconfigurable Hardware in Hybrid Systems," Proceedings of the 13th Annual IEEE Symposium on Field-Programmable Custom Computing Machines, 2005, 2 pages.
Guo, Z. et al., "A Compiler Intermediate Representation for Reconfigurable Fabrics," University of California, Riverside, Dept. of Electrical Engineering, IEEE 2006, 4 pages.
Gwennap, Linley, "P6 Underscores Intel's Lead," Microprocessor Report, vol. 9., No. 2, Feb. 16, 1995 (MicroDesign Resources), p. 1 and pp. 6-15.
Gwennap, Linley, "Intel's P6 Bus Designed for Multiprocessing," Microprocessor Report, vol. 9, No. 7 (MicroDesign Resources), May 30, 1995, p. 1 and pp. 6-10.
Hauser, John Reid, (Dissertation) "Augmenting A Microprocessor with Reconfigurable Hardware," University of California, Berkeley, Fall 2000, 255 pages. (submitted in 3 PDFs, Parts 1-3).
Hauser, John R., "The Garp Architecture," University of California at Berkeley, Computer Science Division, Oct. 1997, pp. 1-55.
Intel, "Pentium Pro Family Developer's Manual, Volume 3: Operating System Writer's Guide," Intel Corporation, Dec. 1995, [submitted in 4 PDF files: Part I, Part II, Part III and Part IV], 458 pages.
Venkatachalam et al., "A highly flexible, distributed multiprocessor architecture for network processing," Computer Networks, The International Journal of Computer and Telecommunications Networking, vol. 41, No. 5, Apr. 5, 2003, pp. 563-568.

Xilinx, Inc.'s and Avnet, Inc.'s Disclosure Pursuant to P.R. 4-2; *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, 4 pages.
Xilinx, Inc.'s and Avnet, Inc.'s Disclosure Pursuant to P.R. 4-1; *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, 9 pages.
Defendant's Claim Construction Chart for P.R. 4-2 Constructions and Extrinsic Evidence for Terms Proposed by Defendants, *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, pp. 1-19.
PACT's P.R. 4-1 List of Claim Terms for Construction, *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, pp. 1-7.
PACT's P.R. 4-2 Preliminary Claim Constructions and Extrinsic Evidence, *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, pp. 1-16, and Exhibits re Extrinsic Evidence Parts in seven (7) separate additional PDF files (Parts 1-7).
Becker, J., "A Partitioning Compiler for Computers with Xputer-based Accelerators," 1997, Kaiserslautern University, 326 pp.
Hartenstein et al., "Parallelizing Compilation for a Novel Data-Parallel Architecture," 1995, PCAT-94, Parallel Computing: Technology and Practice, 13 pp.
Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.
Ryo, A., "Auszug aus Handbuch der Informationsverarbeitung," Information Processing Society of Japan, ed., *Information Processing Handbook, New Edition*, Software Information Center, Ohmsha, Dec. 1998, 4 pages [Translation provided].
Altera, "APEX 20K Programmable Logic Device Family," Altera Corporation Data Sheet, Mar. 2004, ver. 5.1, pp. 1-117.
Chaudhry, G.M. et al., "Separated caches and buses for multiprocessor system," Circuits and Systems, 1993; Proceedings of the 36th Midwest Symposium on Detroit, MI, USA, Aug. 16-18, 1993, New York, NY IEEE, Aug. 16, 1993, pp. 1113-1116, XP010119918 ISBN: 07803-1760-2.
Culler, D.E; Singh, J.P., "Parallel Computer Architecture," pp. 434-437, 1999, Morgan Kaufmann, San Francisco, CA USA, XP002477559.
IMEC, "ADRES multimedia processor & 3MF multimedia platform," Transferable IP, IMEC Technology Description, (Applicants believe the date to be Oct. 2005), 3 pages.
Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.
Kanter, David, "NVIDIA's GT200: Inside a Parallel Processor," http://www.realworldtech.com/page.cfm?ArticleID=RWT0909891952428&p=1, Sep. 8, 2008, 27 pages.
Kanter, David, "NVIDIA's GT200: Inside a Parallel Processor," http://www.realworldtech.com/page.cfm?ArticleID=RWT090989195242&p=1, Sep. 8, 2008, 27 pages.
Lee, Ming-Hau et al., "Design and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.
Mei, Bingfeng et al., "Adres: An Architecture with Tightly Coupled VLIW Processor and Coarse-Grained Reconfigurable Matrix," Proc. *Field-Programmable Logic and Applications* (FPL 03), Springer, 2003, pp. 61-70.
Xilinx, "Virtex-E 1.8 V Extended Memory Field Programmable Gate Arrays," (v2.2) Sep. 10, 2002, Xilinx Production Product Specification, pp. 1-52.
Xilinx, "Virtex-II and Virtex-II Pro X FPGA Platform FPGAs: Complete Data Sheet," (v4.6) Mar. 5, 2007, pp. 1-302.

Xilinx, "Virtex-II Platform FPGAs: Complete Data Sheet " (v3.5) Nov. 5, 2007, pp. 1-226.
Agarwal, A., et al., "APRIL: A Processor Architecture for Multiprocessing," Laboratory for Computer Science, MIT, Cambridge, MA, IEEE 1990, pp. 104-114.
Almasi and Gottlieb, *Highly Parallel Computing*, The Benjamin/Cummings Publishing Company, Inc., Redwood City, CA, 1989, 3 pages (Fig. 4.1).
Advanced RISC Machines Ltd (ARM), "AMBA—Advanced Microcontroller Bus Architecture Specification," (Document No. ARM IHI 0001C), Sep. 1995, 72 pages.
Alfke, Peter; New, Bernie, *Xilinx Application Note*, "Additional XC3000 Data," XAPP 024.000, 1994, pp. 8-11 through 8-20.
Alfke, Peter; New, Bernie, *Xilinx Application Note*, "Adders, Subtracters and Accumulators in XC3000," XAPP 022.000, 1994, pp. 8-98 through 8-104.
Alfke, Peter, *Xilinx Application Note*, "Megabit FIFI in Two Chips: One LCA Device and One DRAM," XAPP 030.000, 1994, pp. 8-148 through 8-150.
Alfke, Peter, *Xilinx Application Note*, "Dynamic Reconfiguration," XAPP 093, Nov. 10, 1997, pp. 13-45 through 13-46.
Alfke, Peter; New, Bernie, *Xilinx Application Note*, "Implementing State Machines in LCA Devices," XAPP 027.001, 1994, pp. 8-169 through 8-172.
Alfke, Peter, *Xilinx Application Note*, "Megabit FIFO in Two Chips: One LCA Device and One DRAM," XAPP 030.000, 1994, pp. 8-148 through 8-150.
Algotronix, Ltd., CAL4096 Datasheet, 1992, pp. 1-53.
Algotronix, Ltd., CHS2x4 User Manual, "CHA2x4 Custom Computer," 1991, pp. 1-38.
Allaire, Bill; Fischer, Bud, *Xilinx Application Note*, "Block Adaptive Filter," XAPP 055, Aug. 15, 1996 (Version 1.0), pp. 1-10.
Altera Application Note (73), "Implementing FIR Filters in Flex Devices," Altera Corporation, Feb. 1998, ver. 1.01, pp. 1-23.
Athanas, P. (Thesis), "An adaptive machine architecture and compiler for dynamic processor reconfiguration," Brown University 1992, pp. 1-157.
Berkeley Design Technology, Inc., *Buyer's Guide to DSP Processors*, 1995, Fremont, CA., pp. 673-698.
Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.
Camilleri, Nick; Lockhard, Chris, *Xilinx Application Note*, "Improving XC4000 Design Performance," XAPP 043.000, 1994, pp. 8-21 through 8-35.
Cartier, Lois, *Xilinx Application Note*, "System Design with New XC4000EX I/O Features," Feb. 21, 1996, pp. 1-8.
Chen, D., (Thesis) "Programmable arithmetic devices for high speed digital signal processing," U. California Berkeley 1992, pp. 1-175.
Churcher, S., et al., "The XC6200 FastMap TM Processor Interface," Xilinx, Inc., Aug. 1995, pp. 1-8.
Cowie, Beth, *Xilinx Application Note*, "High Performance, Low Area, Interpolator Design for the XC6200," XAPP 081, May 7, 1997 (Version 1.0), pp. 1-10.
Duncan, Ann, *Xilinx Application Note*, "A32x16 Reconfigurable Correlator for the XC6200," XAPP 084, Jul. 25, 1997 (Version 1.0), pp. 1-14.
Ebeling, C., et al., "RaPiD—Reconfigurable Pipelined Datapath," Dept. of Computer Science and Engineering, U. Washington, 1996, pp. 126-135.
Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.
Fawcett, B., "New SRAM-Based FPGA Architectures Address New Applications," Xilinx, Inc. San Jose, CA, Nov. 1995, pp. 231-236.
Goslin, G; Newgard, B, *Xilinx Application Note*, "16-Tap, 8-Bit FIR Filter Applications Guide," Nov. 21, 1994, pp. 1-5.
Iwanczuk, Roman, *Xilinx Application Note*, "Using the XC4000 RAM Capability," XAPP 031.000, 1994, pp. 8-127 through 8-138.
Knapp, Steven, "Using Programmable Logic to Accelerate DSP Functions," Xilinx, Inc., 1995, pp. 1-8.

New, Bernie, *Xilinx Application Note*, "Accelerating Loadable Counters in SC4000," XAPP 023.001, 1994, pp. 8-82 through 8-85.
New, Bernie, *Xilinx Application Note*, "Boundary Scan Emulator for XC3000," XAPP 007.001, 1994, pp. 8-53 through 8-59.
New, Bernie, *Xilinx Application Note*, "Ultra-Fast Synchronous Counters," XAPP 014.001, 1994, pp. 8-78 through 8-81.
New, Bernie, *Xilinx Application Note*, "Using the Dedicated Carry Logic in XC4000," XAPP 013.001, 1994, pp. 8-105 through 8-115.
New, Bernie, *Xilinx Application Note*, "Complex Digital Waveform Generator," XAPP 008.002, 1994, pp. 8-163 through 8-164.
New, Bernie, *Xilinx Application Note*, "Bus-Structured Serial Input-Output Device," XAPP 010.001, 1994, pp. 8-181 through 8-182.
Ridgeway, David, *Xilinx Application Note*, "Designing Complex 2-Dimensional Convolution Filters," XAPP 037.000, 1994, pp. 8-175 through 8-177.
Rowson, J., et al., "Second-generation compilers optimize semicustom circuits," Electronic Design, Feb. 19, 1987, pp. 92-96.
Schewel, J., "A Hardware/Software Co-Design System using Configurable Computing Technology," Virtual Computer Corporation, Reseda, CA, IEEE 1998, pp. 620-625.
Segers, Dennis, Xilinx Memorandum, "MIKE—Product Description and MRD," Jun. 8, 1994, pp. 1-29.
Texas Instruments, "TMS320C8x System-Level Synopsis," Sep. 1995, 75 pages.
Texas Instruments, "TMS320C80 Digital Signal Processor," Data Sheet, Digital Signal Processing Solutions 1997, 171 pages.
Texas Instruments, "TMS320C80 (MVP) Parallel Processor," User's Guide, Digital Signal Processing Products 1995, 73 pages.
Trainor, D.W., et al., "Implementation of the 2D DCT Using A Xilinx XC6264 FPGA," 1997, IEEE Workshop of Signal Processing Systems SiPS 97, pp. 541-550.
Trimberger, S, (Ed.) et al., "Field-Programmable Gate Array Technology," 1994, Kluwer Academic Press, pp. 1-258 (and the Title Page, Table of Contents, and Preface) [274 pages total].
Trimberger, S., "A Reprogrammable Gate Array and Applications," IEEE 1993, Proceedings of the IEEE, vol. 81, No. 7, Jul. 1993, pp. 1030-1041.
Trimberger, S., et al., "A Time-Multiplexed FPGA," Xilinx, Inc., 1997 IEEE, pp. 22-28.
Ujvari, Dan, *Xilinx Application Note*, "Digital Mixer in an XC7272," XAPP 035.002, 1994, p. 1.
Veendrick, H., et al., "A 1.5 GIPS video signal processor (VSP)," Philips Research Laboratories, The Netherlands, IEEE 1994 Custom Integrated Circuits Conference, pp. 95-98.
Wilkie, Bill, *Xilinx Application Note*, "Interfacing XC6200 to Microprocessors (TMS320C50 Example)," XAPP 064, Oct. 9, 1996 (Version 1.1), pp. 1-9.
Wilkie, Bill, Xilinx Application Note, "Interfacing XC6200 to Microprocessors (MC68020 Example)," XAPP 063, Oct. 9, 1996 (Version 1.1), pp. 1-8.
XCELL, Issue 18, Third Quarter 1995, "Introducing three new FPGA Families!", "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1.0), pp. 4-253-4-286.
*Xilinx Application Note*, A Fast Constant Coefficient Multiplier for the XC6200, XAPP 082, Aug. 24, 1997 (Version 1.0), pp. 1-5.
Xilinx Technical Data, "XC5200 Logic Cell Array Family," Preliminary (v1.0), Apr. 1995, pp. 1-43.
Xilinx Data Book, "The Programmable Logic Data Book," 1996, 909 pages.
Xilinx, Series 6000 User's Guide, Jun. 26, 1997, 223 pages.
Yeung, K, (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.
ZILOG Preliminary Product Specification, "Z86C95 CMOS Z8 Digital Signal Processor," 1992, pp. 1-82.

ZILOG Preliminary Product Specification, "Z89120 Z89920 (ROM-less) 16-Bit Mixed Signal Processor," 1992, pp. 1-82.
Defendants' Invalidity Contentions in *PACT XPP Technologies, AG v. Xilinx, Inc., et al.*, (E.D. Texas Dec. 28, 2007) (No. 2:07cv563)., including Exhibits A through K in separate PDF files.
Ballagh et al., "Java Debug Hardware Models Using JBits," 8$^{th}$ Reconfigurable Architectures Workshop, 2001, 8 pages.
Bellows et al., "Designing Run-Time Reconfigurable Systems with JHDL," Journal of VLSI Signal Processing, vol. 28, Kluwer Academic Publishers, The Netherlands, 2001, pp. 29-45.
Guccione et al., "JBits: Java based interface for reconfigurable computing," Xilinx, Inc., San Jose, CA, 1999, 9 pages.
Price et al., "Debug of Reconfigurable Systems," Xilinx, Inc., San Jose, CA, Proceedings of SPIE, 2000, pp. 181-187.
Sundararajan et al., "Testing FPGA Devices Using JBits," Proc. MAPLD 2001, Maryland, USA, Katz (ed.), NASA, CA, 8 pages.
U.S. Appl. No. 60/109,417, filed Nov. 18, 1998, Jefferson et al.
Becker et al., "Automatic Parallelism Exploitation for FPL-Based Accelerators," 1998, Proc. 31$^{st}$ Annual Hawaii International Conference on System Sciences, pp. 169-178.
Li, Zhiyuan, et al., "Configuration prefetching techniques for partial reconfigurable coprocessor with relocation and defragmentation," International Symposium on Field Programmable Gate Arrays, Feb. 1, 2002, pp. 187-195.
Advanced RISC Machines, "Introduction to AMBA," Section 1, pp. 1-1 to 1-7 (Oct. 1996).
ARM, "The Architecture for the Digital World," http://www.arm.com/products, 3 pages (Mar. 18, 2009).
ARM, "The Architecture for the Digital World; Milestones," http://www.arm.com/aboutarm/milestones.html, 5 pages (Mar. 18, 2009).
Del Corso, et al., "Microcomputer Buses and Links," Academic Press Inc. Ltd., pp. 138-143, 277-285 (1986).
"IEEE Standard Test Access Port and Boundary-Scan Architecture," IEEE Std. 1149.1-1990, pp. 1-127 (1993).
PCI Local Bus Specification, Production Version, Revision 2.1, Portland, OR, pp. 1-281 (Jun. 1, 1995).
"The Programmable Logic Data Book," Xilinx, Inc., Section 2, pp. 1-240, Section 8, pp. 1, 23-25, 29, 45-52, 169-172 (1994).
Asari, et al., "FeRAM circuit technology for system on a chip," *Proceedings First NASA/DoD Workshop on Evolvable Hardware*, pp. 193-197 (1999).
Lee, et al., "Multimedia extensions for general-purpose processors," *IEEE Workshop on Signal Processing Systems, SIPS 97—Design and Implementation*, pp. 9-23 (1997).
Pirsch, et al., "VLSI implementations of image and video multimedia processing systems," *IEEE Transactions on Circuits and Systems for Video Technology* 8(7): 878-891 (Nov. 1998).
Salefski, et al., "Re-configurable computing in wireless," *Annual ACM IEEE Design Automation Conference: Proceedings of the 38$^{th}$ conference on Design automation*, pp. 178-183 (2001).
Schmidt, et al., "Datawave: A Single-Chip Multiprocessor for Video Applications," *IEEE Micro* 11(3): 22-25 and 88-94 (Jun. 1991).
Microsoft Press Computer Dictionary, Third Edition, Redmond, WA, 1997, 3 pages.
Microsoft Press Computer Dictionary, Second Edition, Redmond, WA, 1994, 3 pages.
A Dictionary of Computing, Fourth Edition, Oxford University Press, 1997, 4 pages.
Communications Standard Dictionary, Third Edition, Martin Weik (Ed.), Chapman & Hall, 1996, 3 pages.
Dictionary of Communications Technology, Terms Definitions and Abbreviations, Second Edition, Gilbert Held (Ed.), John Wiley & Sons, England, 1995, 5 pages.
The Random House College Dictionary, Revised Edition, Random House, Inc., 1984, 14 pages.
The Random House College Dictionary, Revised Edition, Random House, Inc., 1984, 7 pages.
Random House Webster's College Dictionary with CD-ROM, Random House, 2001, 7 pages.
Random House Webster's College Dictionary with CD-ROM, Random House, 2001, 4 pages.
Random House Personal Computer Dictionary, Second Edition, Philip E. Margolis (Ed.), Random House, New York, 1996, 5 pages.
The IEEE Standard Dictionary of Electrical and Electronics Terms, Sixth Edition, 1996, 36 pages.
The IEEE Standard Dictionary of Electrical and Electronics Terms, Sixth Edition, 1996, 8 pages.
McGraw-Hill Electronics Dictionary, Sixth Edition, Neil Sclater et al. (Ed.), McGraw-Hill, 1997, 3 pages.
Modern Dictionary of Electronics, Sixth Edition, Rudolf Graf (Ed.), Newnes (Butterwoth-Heinemann), 1997, 5 pages.
The American Heritage Dictionary, Fourth Edition, Dell (Houghton-Mifflin), 2001, 5 pages.
The American Heritage Dictionary, Second College Edition, Houghton Mifflin, 1982, 23 pages.
The American Heritage Dictionary, Second College Edition, Houghton Mifflin, 1982, 8 pages.
The American Heritage Dictionary, Third Edition, Dell Publishing (Bantam Doubleday Dell Publishing Group, Inc.), 1994, 4 pages.
The American Heritage Dictionary, Fourth Edition, Dell/Houghton Mifflin 2001, 5 pages.
Webster's New Collegiate Dictionary, Merriam Co., 1981, 5 pages.
Webster's New Collegiate Dictionary, Merriam Co., 1981, 4 pages.
The Oxford American Dictionary and Language Guide, Oxford University Press, 1999, 5 pages.
The Oxford Duden German Dictionary, Edited by the Dudenredaktion and the German Section of the Oxford University Press, W. Scholze-Stubenrecht et al. (Eds), Clarendon Press, Oxford, 1990, 7 pages.
Oxford Dictionary of Computing, Oxford University Press, 2008, 4 pages.
Modern Dictionary of Electronics, Sixth Edition Revised and Updated, Rudolf F. Graf (Ed.), Butterworth-Heinemann, 1997, 7 pages.
Modern Dictionary of Electronics, Sixth Edition Revised and Updated, Rudolf F. Graf (Ed.), Butterworth-Heinemann, 1997, 5 pages.
Garner's Modern American Usage, Bryan A. Garner (Ed.), Oxford University Press, 2003, 3 pages.
The New Fowler's Modern English Usage, R.W. Burchfield (Ed.), Oxford University Press, 2000, 3 pages.
Wikipedia, the free encyclopedia, "Granularity," at http://en.wikipedia.org/wiki/Granularity, Jun. 18, 2010, 4 pages.
Wordsmyth, The Premier Educational Dictionary—Thesaurus, at http://www.wordsmyth.net, "communication," Jun. 18, 2010, 1 page.
Yahoo! Education, "affect," at http://education.yahoo.com/reference/dictionary/entry/affect, Jun. 18, 2010, 2 pages.
mPulse Living Language, "high-level," at http://www.macmillandictionary.com/dictionary/american/high-level, Jun. 18, 2010, 1 page.
MSN Encarta, "regroup," at http://encarta.msn.com/encnet/features/dictionary/DictionaryResults.aspx?lextyne=3&search=regroup, Jun. 17, 2010, 2 pages.
MSN Encarta, "synchronize," at http://encarta.msn.com/encnet/features/dictionary/DictionaryResults.aspx?lextype=3&search=synchronize, Jun. 17, 2010, 2 pages.
MSN Encarta, "pattern," at http://encarta.msn.com/encnet/features/dictionary/DictionaryResults.aspx?lextype=3&search=pattern, Jun. 17, 2010, 2 pages.
MSN Encarta, "dimension," at http://encarta.msn.com/encnet/features/dictionary/DictionaryResults.aspx?lextype=3&search=dimension, Jun. 17, 2010, 2 pages.
MSN Encarta, "communication," at http://encarta.msn.com/encnet/features/dictionary/DictionaryResults.aspx?lextype=3&search=communication, Jun. 17, 2010, 2 pages.
MSN Encarta, "arrangement," at http://encarta.msn.com/encnet/features/dictionary/DictionaryResults.aspx?lextype=3&search=arrangement, Jun. 17, 2010, 2 pages.
MSN Encarta, "vector," at http://encarta.msn.com/encnet/features/dictionary/DictionaryResufts.aspx?lextype=3&search=vector, Jul. 30, 2010, 2 pages.
Dictionary.com, "address," at http://dictionary.reference.com/browse/address, Jun. 18, 2010, 4 pages.
P.R. 4-3 Joint Claim Constructions Statement, *PACT XPP Technologies, AG v. Xilinx, Inc. and Avnet, Inc et al.*, E.D. Texas, 2:07-cv-00563-CE, Jul. 19, 2010, pp. 1-50.

Order Granting Joint Motion for Leave to File an Amended Joint Claim Construction and Prehearing Statement and Joint Motion to File an Amended Joint Claim Construction and Prehearing Statement Pursuant to Local Patent Rule 4-3, and Exhibit A: P.R. 4-3 Amended Joint Claim Constructions Statement, *PACT XPP Technologies, AG* v. *Xilinx, Inc. and Avnet, Inc. et al.*, E.D. Texas, 2:07-cv-00563-CE, Aug. 2, 2010, 72 pages.

P.R. 4-3 Amended Joint Claim Constructions Statement, *PACT XPP Technologies, AG* v. *Xilinx, Inc. and Avnet, Inc. et al.*, E.D. Texas, 2:07-cv-00563-CE, Aug. 3, 2010, pp. 1-65.

Exhibit A—P.R. 4-3 Amended Joint Claim Constructions Statement, *PACT XPP Technologies, AG* v. *Xilinx, Inc. and Avnet, Inc. et al.*, E.D. Texas, 2:07-cv-00563-CE, Aug. 2, 2010, pp. 1-66.

PACT's Opening Claim Construction Brief, *PACT XPP Technologies, AG* v. *Xilinx, Inc. and Avnet, Inc.*, E.D. Texas, 2:07-cv-00563-CE, Nov. 1, 2010, pp. 1-55.

Declaration of Harry L. (Nick) Tredennick in Support of PACT's Claim Constructions, *PACT XPP Technologies, AG* v. *Xilinx, Inc. and Avnet, Inc. et al*, E.D. Texas, 2:07-cv-00563-CE, Nov. 1, 2010, pp. 1-87.

Transcript of Harry (Nick) L. Tredennick III, Ph.D., Oct. 11, 2010, vol. 1, Exhibit 16 of PACT's Opening Claim Construction Brief, *PACT XPP Technologies, AG* v. *Xilinx, Inc. and Avnet, Inc. et al.*, E.D. Texas, 2:07-cv-00563-CE, Nov. 1, 2010, pp. 1-3.

Agreed and Disputed Terms, Exhibit 17 of PACT's Opening Claim Construction Brief, *PACT XPP Technologies, AG* v. *Xilinx, Inc. and Avnet, Inc. et al.*, E.D. Texas, 2:07-cv-00563-CE, Nov. 1, 2010, pp. 1-16.

Oral Videotaped Deposition—Joseph McAlexander dated Oct. 12, 2010, vol. 1, Exhibit 18 of PACT's Opening Claim Construction Brief, *PACT XPP Technologies, AG* v. *Xilinx, Inc. and Avnet, Inc. et al.*, E.D. Texas, 2:07-cv-00563-CE, Nov. 1, 2010, pp. 1-17.

Expert Report of Joe McAlexander Re Claim Construction dated Sep. 27, 2010, Exhibit 19 of PACT's Opening Claim Construction Brief, *PACT XPP Technologies, AG* v. *Xilinx, Inc. and Avnet, Inc. et al.*, E.D. Texas, 2:07-cv-00563-CE, Nov. 1, 2010, pp. 1-112.

Documents from File History of U.S. Appl. No. 09/290,342 (filed Apr. 12, 1999), Exhibit 20 of PACT's Opening Claim Construction Brief, *PACT XPP Technologies, AG* v. *Xilinx, Inc. and Avnet, Inc. et al.*, E.D. Texas, 2:07-cv-00563-CE, Nov. 1, 2010, pp. 1-37.

Amendment from File History of U.S. Appl. No. 10/156,397 (filed May 28, 2002), Exhibit 25 of PACT's Opening Claim Construction Brief, *PACT XPP Technologies, AG* v. *Xilinx, Inc. and Avnet, Inc. et al.*, E.D. Texas, 2:07-cv-00563-CE, Nov. 1, 2010, pp. 1-12.

Documents from File History U.S. Appl. No. 09/329,132 (filed Jun. 9, 1999), Exhibit 27 of PACT's Opening Claim Construction Brief, *PACT XPP Technologies, AG* v. *Xilinx, Inc. and Avnet, Inc. et al.*, E.D. Texas, 2:07-cv-00563-CE, Nov. 1, 2010, pp. 1-36.

Amendment from File History of U.S. Appl. No. 10/791,501 (filed Mar. 1, 2004), Exhibit 39 of PACT's Opening Claim Construction Brief, *PACT XPP Technologies, AG* v. *Xilinx, Inc. and Avnet, Inc. et al.*, E.D. Texas, 2:07-cv-00563-CE, Nov. 1, 2010, pp. 1-9.

Amendment from File History of U.S. Appl. No. 10/265,846 (filed Oct. 7, 2002), Exhibit 40 of PACT's Opening Claim Construction Brief; *PACT XPP Technologies, AG* v. *Xilinx, Inc. and Avnet, Inc. et al.*, E.D. Texas, 2:07-cv-00563-CE, Nov. 1, 2010, pp. 1-12.

Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-55.

Declaration of Aaron Taggart in Support of Defendants Xilinx, Inc. and Avnet, Inc.'s Responsive Claim Construction Brief, Defendants Xilinx, Inc. and Avnet, Inc.'s Responsive Claim Construction Brief (Exhibit A), *PACT XPP Technologies, AG* v. *Xilinx, Inc. and Avnet, Inc. et al.*, E.D. Texas, 2:07-cv-00563-CE, Dec. 6, 2010, pp. 1-5.

Oral Videotaped Deposition Joseph McAlexander (Oct. 12, 2010), Exhibit 1 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-9.

Expert Report of Joe McAlexander re Claim Construction, Exhibit 2 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-137.

Various Documents from File History of U.S. Appl. No. 09/290,342 (filed Apr. 12, 1999), Exhibit 6 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-181.

Transcript of Harry (Nick) L. Tredennick III, Ph.D., Oct. 11, 2010, vol. 1, Exhibit 7 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-28.

Amendment, Response from File History of U. S. Appl. No. 10/156,397 (filed May 28, 2002), Exhibit 15 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-137.

Application from File History of U.S. Appl. No. 08/544,435 (filed Nov. 17, 1995), Exhibit 20 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-102.

Documents from File History of U.S. Appl. No. 09/329,132 (filed Jun. 9, 1999), Exhibit 24 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-13.

Documents from File History of U.S. Appl. No. 10/791,501 (filed Mar. 1, 2004), Exhibit 25 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-14.

Amendment from File History of U.S. Appl. No. 11/246,617 (filed Oct. 7, 2005), Exhibit 26 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-9.

Documents from File History of U.S. Appl. No. 08/947,254 (filed Oct. 8, 1997), Exhibit 27 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-38.

Documents from File History of U.S. Appl. No. 08/947,254 (filed Oct. 8, 1997), specifically, German priority application specification [English translation provided], Exhibit 33 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, 54 pages [including English translation].

Documents from File History of U.S. Appl. No. 09/335,974 (filed Jun. 18, 1999), Exhibit 28 of Defendants Xilinx, Inc. and Avnet, Inc.'s Responsive Claim Construction Brief, *PACT XPP Technologies, AG*v. *Xilinx, Inc. and Avnet, Inc. et al.*, E.D. Texas, 2:07-cv-00563-CE, Dec. 6, 2010, pp. 1-32.

Documents from File History of U.S. Patent Reexamination Control No. 90/010,450 (filed Mar. 27, 2009), Exhibit 30 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-71.

Documents from File History of U.S. Appl. No. 10/265,846 (filed Oct. 7, 2002), Exhibit 32 of Defendants Xilinx, Inc. and Avnet, Inc.'s Responsive Claim Construction Brief, *PACT XPP Technologies, AG* v. *Xilinx, Inc. and Avnet, Inc. et al.*, E.D. Texas, 2:07-cv-00563-CE, Dec. 6, 2010, pp. 1-23.

PACT's Claim Construction Reply Brief; *PACT XPP Technologies, AG* v. *Xilinx, Inc and Avnet, Inc. et al.*, E.D. Texas, 2:07-cv-00563-CE, Jan. 7, 2011, pp. 1-20.

Defendants Xilinx, Inc. and Avnet, Inc.'s Claim Construction Sur-reply Brief, *PACT XPP Technologies, AG* v. *Xilinx, Inc. and Avnet, Inc. et al.*, E.D. Texas, 2:07-cv-00563-CE, Jan. 18, 2011, 142 pages.

Markman Hearing Minutes and Attorney Sign-In Sheet, *PACT XPP Technologies, AG* v. *Xilinx, Inc. and Avnet, Inc. et al.*, E.D. Texas, 2:07-cv-00563-CE, Feb. 22, 2011, 3 pages; and court transcript, 245 pages.

Memorandum Opinion and Order, *PACT XPP Technologies, AG v. Xilinx, Inc. and Avnet, Inc. et al.*, E.D. Texas, 2:07-cv-00563-CE, Jun. 17, 2011, pp. 1-71.

Atmel Corporation, Atmel 5-K- 50K Gates Coprocessor FPGA and FreeRAM, (www.atmel.com), Apr. 2002, pp. 1-68.

Glaskowsky, Peter N., "PACT Debuts Extreme Processor; Reconfigurable ALU Array Is Very Powerful—and Very Complex," Microprocessor, The Insider's Guide to Microprocessor Hardware, MicroDesign Resources—Microprocessor Report, Oct. 9, 2000 (www.MPRonline.com), 6 pages.

Glaskowsky, Peter N., "Analysis' Choice Nominees Named; Our Picks for 2002's Most Important Products and Technologies," Microprocessor, The Insider's Guide to Microprocessor Hardware, MicroDesign Resources—Microprocessor Report, Dec. 9, 2002 (www.MPRonline.com), 4 pages.

Lattice Semiconductor Corporation, "ispLSI 2000E, 2000VE and 2000 VL Family Architectural Description," Oct. 2001, pp. 1-88.

Olukotun, K. et al., "Rationale, Design and Performance of the Hydra Multiprocessor," Computer Systems Laboratory, Stanford University, CA, Nov. 1994, pp. 1-19.

PACT Corporate Backgrounder, PACT company release, Oct. 2008, 4 pages.

Page, Ian., "Reconfigurable processor architectures," Oxford University Computing Laboratory, Oxford UK, Elsevier Science B.V., Microprocessors an Microsystems 20 (1996) pp. 185-196.

Singh, Hartej et al., "Morpho-Sys: A Reconfigurable Architecture for Multimedia Applications," Univ. of California, Irvine, CA and Federal University of Rio de Janiero, Brazil, at http://www.eng.uci.edu/morphosys/docs/sbcci98.html, Jun. 18, 2010, 10 pages.

Theodoridis, G. et al., "Chapter 2—A Survey of Coarse-Grain Reconfigurable Architectures and Cad Tools, Basic Definitions, Critical Design Issues and Existing Coarse-grain Reconfigurable Systems," from S. Vassiliadis, and D. Soudris (eds.) *Fine- and Coarse-Grained Reconfigurable Computing*, Springer 2007, pp. 89-149.

Weinhardt, Markus et al., "Using Function Folding to Improve Silicon Efficiency of Reconfigurable Arithmetic Arrays," PACT XPP Technologies AG, Munich, Germany, IEEE 2004, pp. 239-245.

Xilinx, XC6200 Field Programmable Gate Arrays, Advance Product Specification, Jun. 1, 1996 (Version 1.0), pp. 4-255 through 4-286.

Xilinx, Virtex-II Platform FPGA User Guide, UG002 (V2.1) Mar. 28, 2007, pp. 1-502 [Parts 1-3].

Xilinx, XC4000E and SC4000X Serial Field Programmable Gate Arrays, Product Specification (Version 1.6), May 14, 1999, pp. 1-107.

Altera, "Implementing High-Speed Search Applications with Altera CAM," Jul. 2001, Ver. 2.1, Application Note 119, 50 pages.

Bolsens, Ivo (CTO Xilinx), "FPGA, a history of interconnect," Xilinx slide presentation, posted on the internet Oct. 30, 2008 at http://www.docstoc.com/docs/2198008/FPGA-a-history-of-interconnect, 32 pages.

Bondalapati et al., "Reconfigurable Meshes: Theory and Practice," Dept. of Electrical Engineering-Systems, Univ. of Southern California, Apr. 1997, Reconfigurable Architectures Workshop, International Parallel Processing Symposium, 15 pages.

Cherbaka, Mark F., "Verification and Configuration of a Run-time Reconfigurable Custom Computing Integrated Circuit for DSP Applications," Thesis: Virginia Polytechnic Institute and State University, Jul. 8, 1996, 106 pages.

Cong et al., "Structural Gate Decomposition for Depth-Optimal Technology Mapping in LUT-Based FPGA Designs," Univ. Of California, ACM Transactions on Design Automation of Electronic Systems, vol. 5, No. 2, Apr. 2000, pp. 193-225.

FOLDOC, The Free On-Line Dictionary of Computing, "handshaking," online Jan. 13, 1995, retrieved from Internet Jan. 23, 2011 at http://foldoc.org/handshake.

Li et al., "Hardware-Software Co-Design of Embedded Reconfigurable Architectures," Los Angeles, CA, 2000 ACM, pp. 507-512.

Marshall et al., "A Reconfigurable Arithmetic Array for Multimedia Applications," FPGA '99 Proceedings of the 1999 ACM/SIGDA Seventh International Symposium on Field Programmable Gate Arrays, 10 pages.

Melvin, Stephen et al., "Hardware Support for Large Atomic Units in Dynamically Scheduled Machines," Computer Science Division, University of California, Berkeley, IEEE (1988), pp. 60-63.

Pistorius et al., "Generation of Very Large Circuits to Benchmark the Partitioning of FPGAs," Monterey, CA, ACM 1999, pp. 67-73.

Ramanathan et al., "Reconfigurable Filter Coprocessor Architecture for DSP Applications," Journal of VLSI Signal Processing, 2000, vol. 26, pp. 333-359.

Rotenberg, Eric., et al., "Trace Cache: a Low Latency Approach to High Bandwidth Instruction Fetching," Proceedings of the $29^{th}$ Annual International Symposium on Microarchitecture, Paris, France, IEEE (1996), 12 pages.

Shoup, Richard, "Programmable Cellular Logic Arrays," Dissertation, Computer Science Department, Carnegie-Mellon University, Mar. 1970, 193 pages.

Translation of DE 101 39 170, filed Aug. 16, 2001, by examiner in related case using Google Translate, 10 pages.

Zucker, Daniel F., "A Comparison of Hardware Prefetching Techniques for Multimedia Benchmarks," Technical Report: CSL-TR-95-683, Dec. 1995, 26 pages.

Bus = 4
FREG, BREG = 1

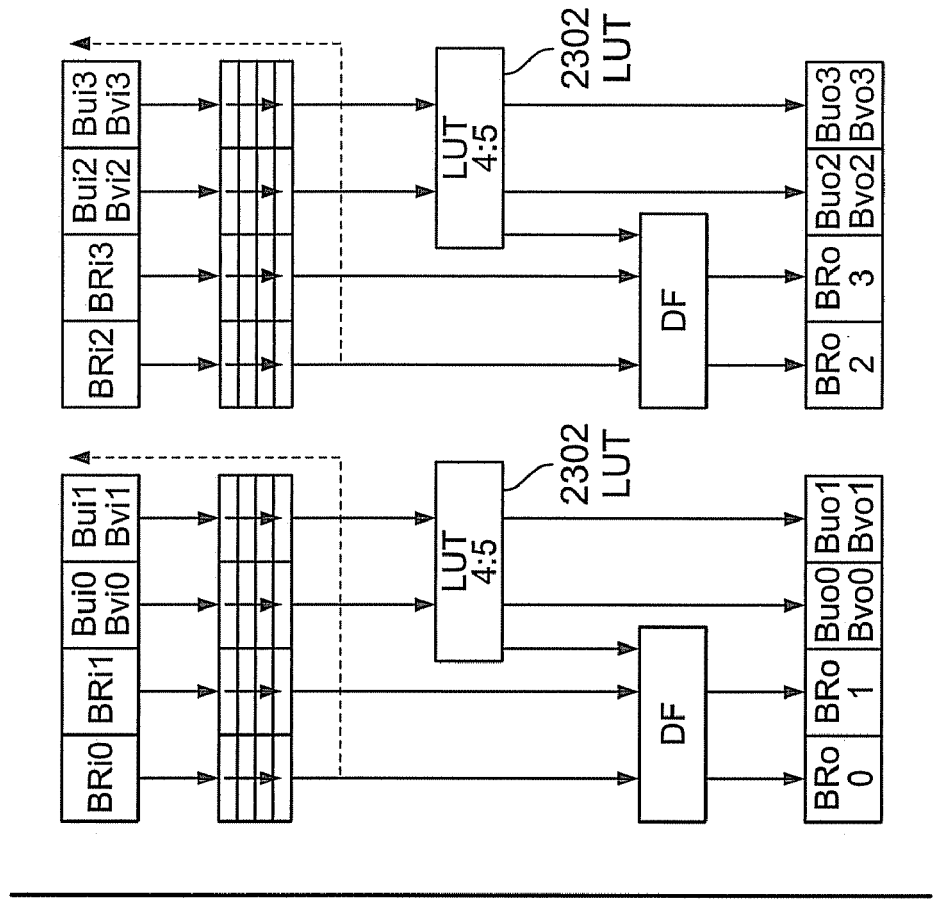
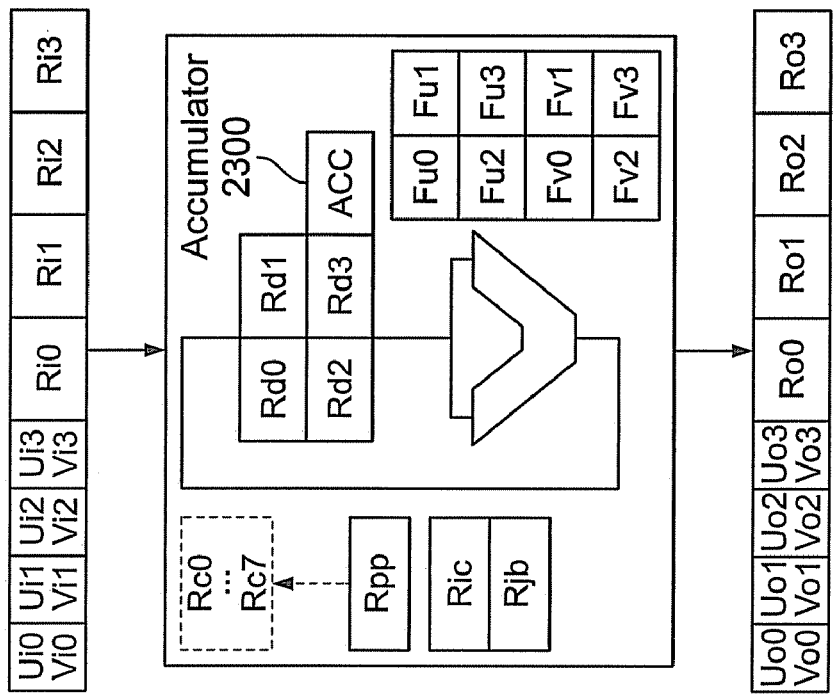
FIG. 23

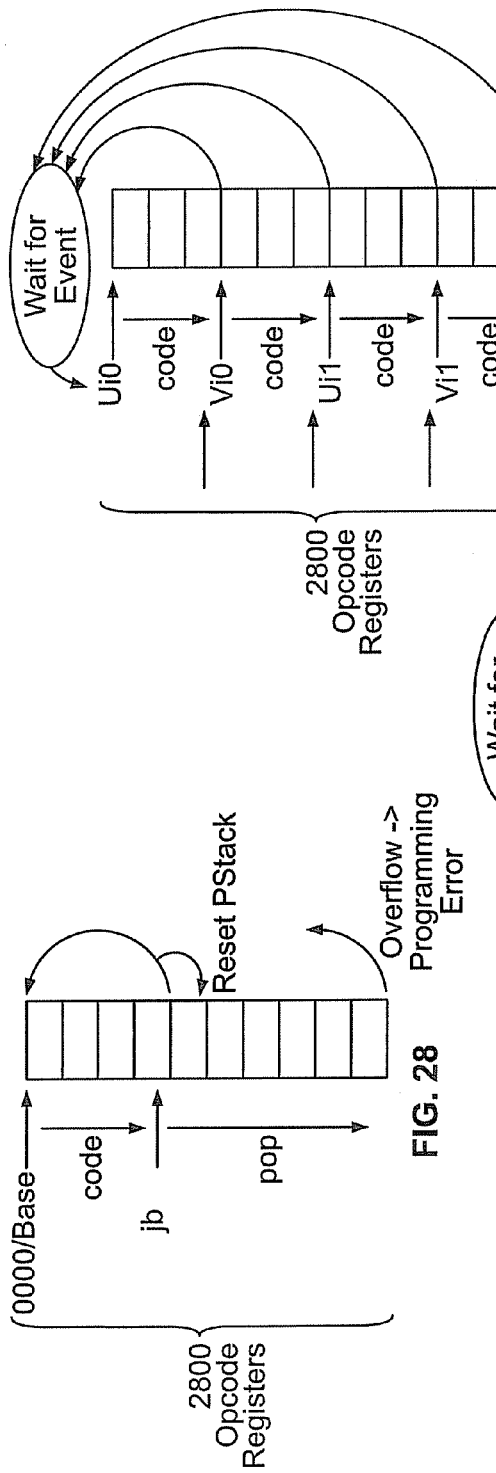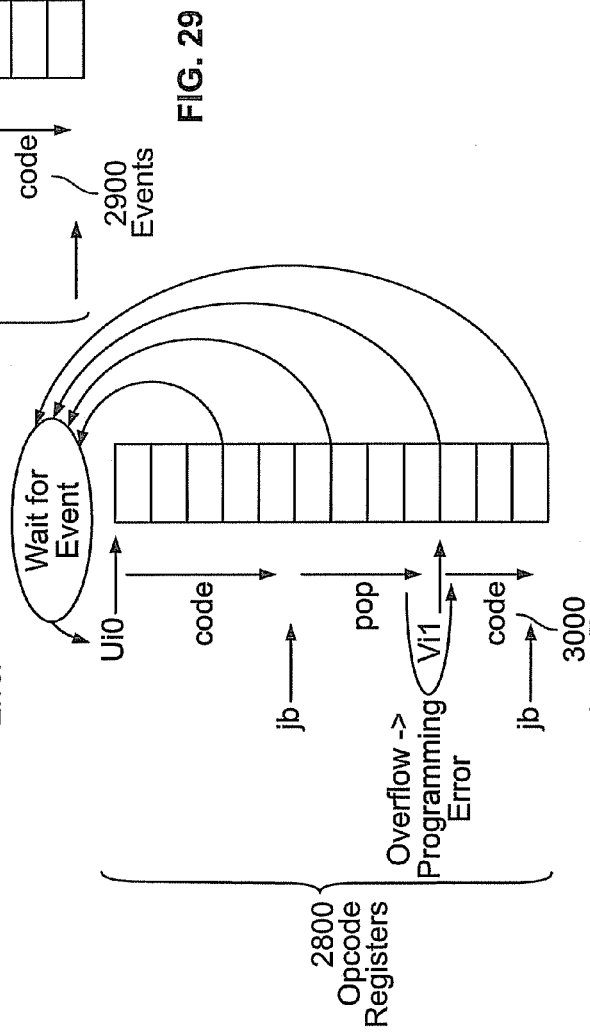
FIG. 29
FIG. 30
FIG. 28

- ⋯▸ Free Strip having a 1 or 8 Bit Granularity
- ――▸ 4 Bit Wide Logical Connection
- ⋯⋯▸ 10 Bit Wide Logical Connection
- ‒‒‒▸ 1 Bit Wide Logical Connection
- ---▸ Free Strip having a 1 or 8 Bit Granularity

DATA PROCESSING DEVICE AND METHOD

CROSS REFERENCE TO RELATED APPLICATIONS

This application is a continuation of and claims priority to U.S. patent application Ser. No. 10/570,173, filed on Nov. 10, 2006 now U.S. Pat. No. 7,844,796, which was the National Stage of International Application No. PCT/EP04/09640, filed on Aug. 30, 2004, which claims benefit of and priority to German Patent Application Serial No. DE 030 19 428.6, filed on Aug. 28, 2003, the entire contents of each of which are expressly incorporated herein by reference; and, this application is a continuation-in-part of and claims priority to U.S. patent application Ser. No. 10/469,909, filed on Sep. 21, 2004 now U.S. Pat. No. 7,444,531, which was the National Stage of International Application Serial No. PCT/EP02/02402, filed on Mar. 5, 2002, which claims benefit of and priority to German Patent Application Serial No. DE 101 10 530.4, filed on Mar. 5, 2001, the entire contents of each of which are expressly incorporated herein by reference.

FIELD OF INVENTION

The present invention relates to reconfigurable computing. In particular, the present invention relates to improvements in the architecture of reconfigurable devices.

BACKGROUND INFORMATION

Reconfigurable data processing arrays are known in the art. Reference is being made to the previous applications and/or publications of the present applicant/assignee all of which are incorporated herein by way of reference. Accordingly, the devices described hereinafter may be multidimensional (n>1) arrays comprising coarse grained computing and/or data operation elements allowing for runtime reconfiguration of the entire array or parts thereof, preferably in response to a signal indicating reconfigurability to a loading unit (CT, CM or the like). Now, several of these data processing arrays have been built (i.e. Xpp1, XPP128, XPP2, XPP64). It is however desirable to improve the known device further as well as to improve methods of its operation.

SUMMARY OF THE INVENTION

Accordingly, in order to achieve this object there will be described a number of improvements allowing separately or in common to improve the performance and/or power consumption and/or cost of the device.

A first way to improve the known devices is to improve the functionality of each single processor element. It has been previously suggested to include a ring-memory (RINGSPEICHER) in the array, to store instructions in the ring-memory and to provide a pointer that points to one of the ring-memory addresses so as to select an instruction to be carried out next. Furthermore, it has been suggested to provide at least one "shadow configuration" and to switch over between several configurations/shadow configurations. Another or additional suggestions has been designated as "wave reconfiguration".

While these known methods improve the performance of a reconfigurable device, there seems to be both a need and a possibility for further improvements.

It is to be understood that while in the following description, a detailed example is given, for example with respect to the number of registers given associated with each PAE, it is not deemed necessary to provide an ALU with exactly this number of registers. Rather, it will be understood by the average skilled person that deviations from the explicitly described embodiment are easily feasible and that the detailed level of description stems from an effort to provide an exemplary PAE and not from the wish to restrict the scope of invention.

BRIEF DESCRIPTION OF THE DRAWINGS

FIG. 23 shows an enhanced DF or Bypass (PB) part within the PAEs.
FIG. 28 shows a parameter stack mode.
FIG. 29 shows multi-config mode.
FIG. 30 shows multi-config mode for long configurations.

DETAILED DESCRIPTION

1 Overview of Changes vs. XPP XPP-II 1.1 ALU-PAE Architecture

In the suggested improved architecture, a PAE might e.g. comprise 4 input ports 100 and 4 output ports 104. Embedded with each PAE is the FREG path newly named DF 135 with its dataflow capabilities, like MERGE, SWAP, DEMUX as well as ELUT.

2 input ports Ri0 and Ri1 are directly connected to the ALU. Two output ports receive the ALU results.

Ri2 and Ri3 are typically fed to the DF path which output is Ro2 and Ro3.

Alternatively Ri2 and Ri3 can serve as inputs for the ALU as well. This extension is needed to provide a suitable amount of ALU inputs if Function Folding (as described later) is used. In this mode Ro2 and Ro3 serve as additional outputs.

Associated to each data register (Ri or Ro) is an event port (Ei or Eo).

It is possible, albeit not necessary to implement an additional data and event bypass BRi0-1 125, BEi0-. The decision depends on how often Function Folding will be used and how many inputs and outputs are required in average.

Figure 1:
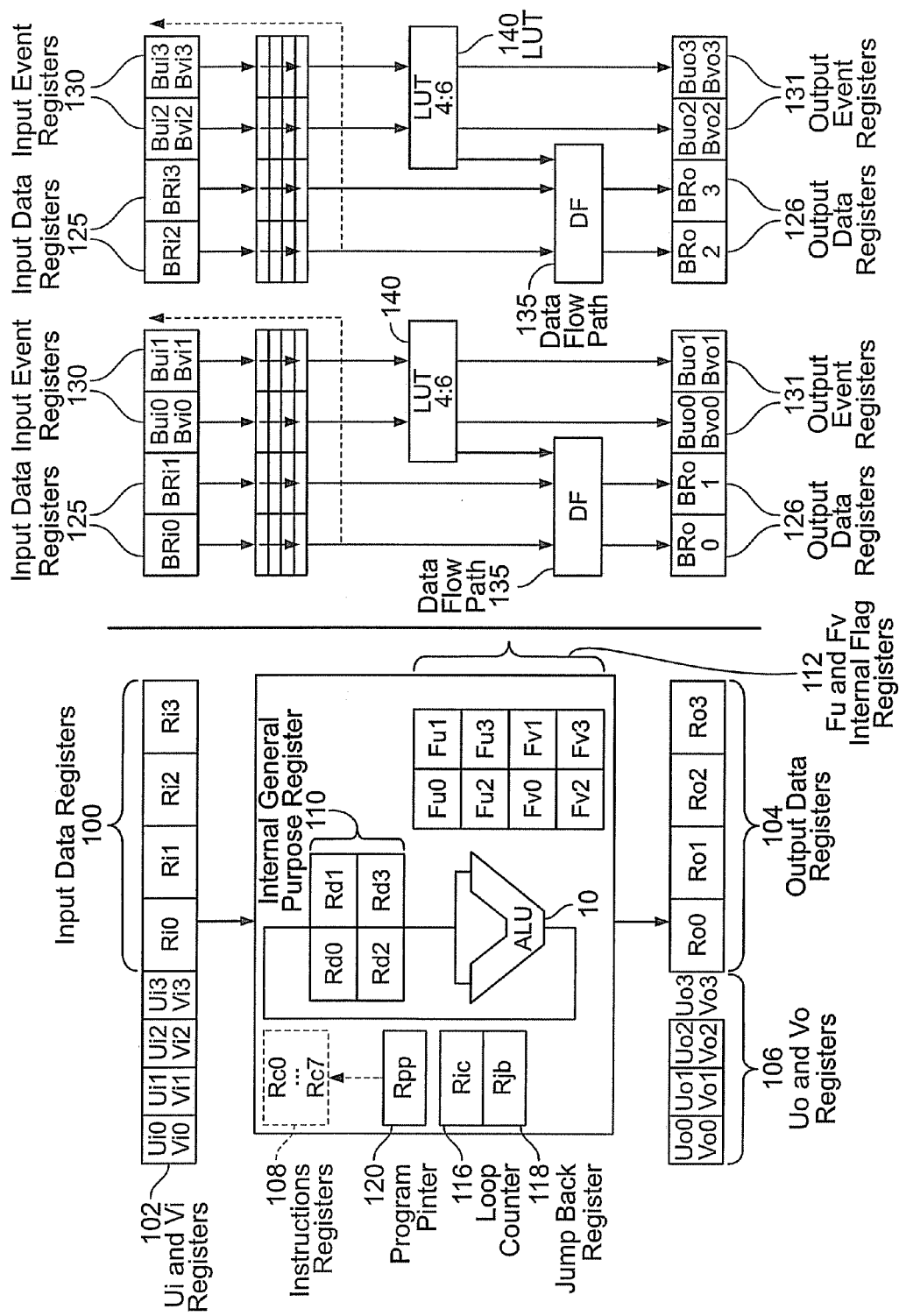
FIG. 1 shows an ALU-PAE architecture.

(See FIG. 1 Now)

1.1.1 Other Extensions

SIMD operation is implemented in the ALUs to support 8 and 16 bit wide data words for i.e. graphics and imaging.

Saturation is supported for ADD/SUB/MUL instructions for i.e. voice, video and imaging algorithms.

1.2 Function Folding

1.2.1 Basics and Input/Output Paradigms

Within this chapter the basic operation paradigms of the XPP architecture are repeated for a better understanding based on Petri-Nets. In addition the Petri-Nets will be enhanced for a better understanding of the subsequently described changes of the current XPP architecture.

In most arrays each PAE operates as a data flow node as defined by Petri-Nets. (Some arrays might have parts that have other functions and should thus be not considered as a standard PAE). A Petri-Net supports a calculation of multiple inputs 5200 and produces one single output 5202. Special for a Petri-Net is that the operation is delayed until all input data is available.

For the XPP technology this means:
1. all necessary data is available
2. all necessary events are available The quantity of data—and events is defined by the data and control flow, the availability is displayed at runtime by the handshake protocol RDY/ACK.

Figure 50:
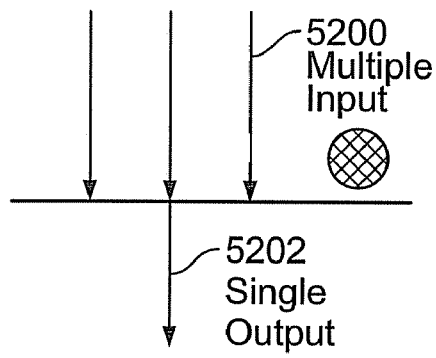
FIG. 50 shows data and control flow.

(See FIG. 50 Now)

Here, the thick arbor indicates the operation, the dot on the right side indicates that the operation is delayed until all inputs 5300 are available.

Enhancing the basic methodology function folding supports multiple operations—maybe even sequential—instead of one, defined as a Cycle. It is important that the basics of Petri-Nets remain unchanged.

Figure 51:
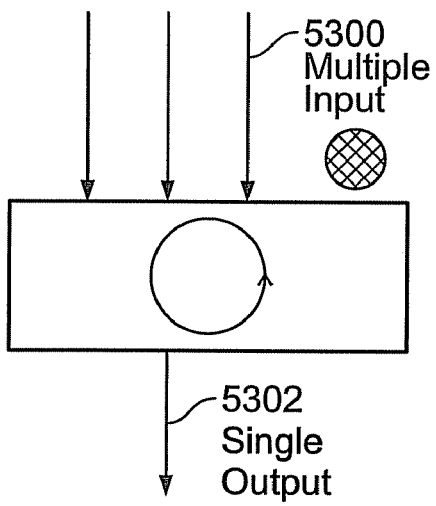
FIG. 51 shows a PAE-like Petri-Net.

(See FIG. 51 Now)

Here, typical PAE-like Petri-Nets consume one input packet 5400 per one operation. For sequential operation multiple reads of the same input packet are supported. However, the interface model again keeps unchanged.

Data duplication occurs in the output path 5402 of the Petri-Net, which does not influence the operation basics again.

Figure 52:
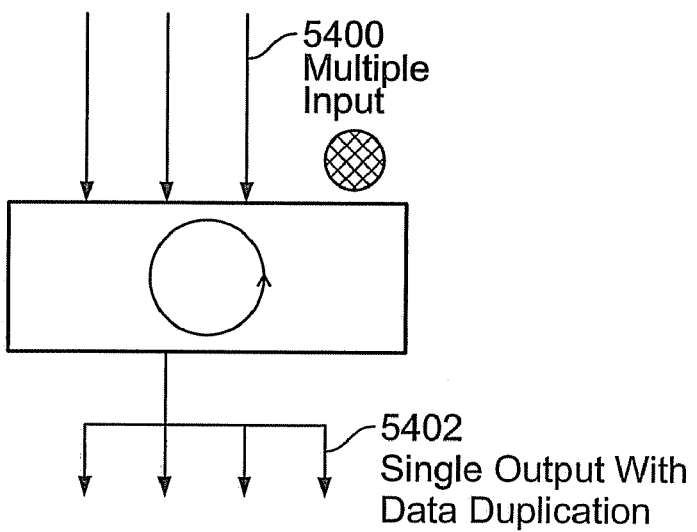
FIG. 52 shows data duplication in the output path of the Petri-Net.

(See FIG. 52 Now)

1.2.2 Method of Function Folding

One of the most important extensions is the capability to fold multiple PAE functions onto one PAE and execute them in a sequential manner. It is important to understand that the intention is not to support sequential processing or even microcontroller capabilities at all. The intention of Function Folding is just to take multiple dataflow operations and map them on a single PAE, using a register structure instead, of a network between each function.

One goal may be to save silicon area by rising to clock frequency locally in the PAE's. An additional expectation is to save power since the busses operate at a fraction of the clock frequencies of the PAEs. Data transfers over the busses, which consume much power, are reduced.

Figure 2:
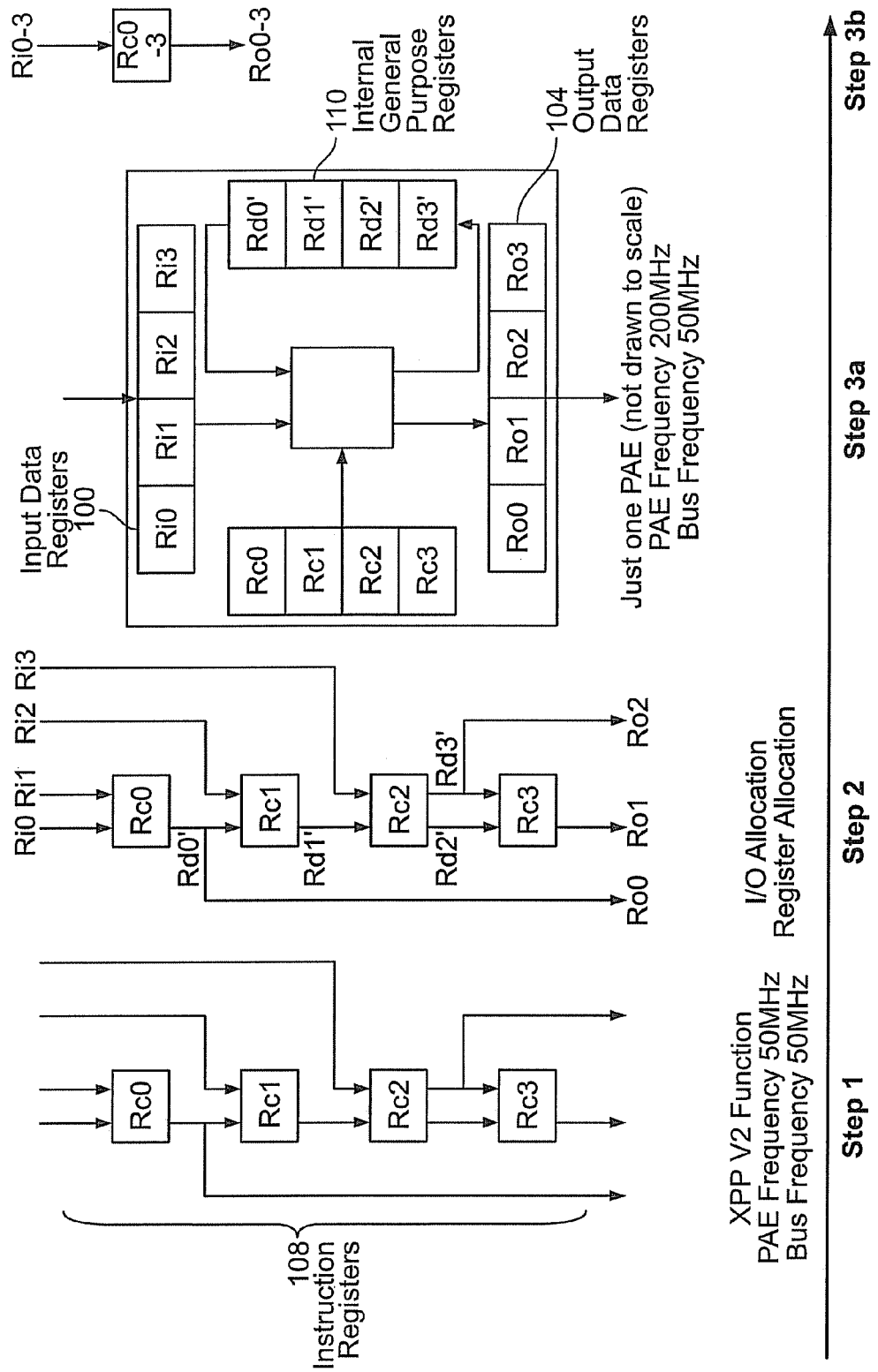
FIG. 2 shows function folding.

(See FIG. 2 Now)

The internal registers can be implemented in different ways, e.g. in one of the following two:

1. Dataflow Model

Each register (r') has a valid bit which is set as soon as data has been written into the register and reset after the data has been read. Data cannot be written if valid is set, data can not—be read if valid is not set. This approach implements a 100% compatible dataflow behaviour.

2. Sequencer Model

The registers have no associated valid bits. The PAE operates as a sequencer, whereas at the edges of the PAE (the bus connects) the paradigm is changed to the XPP-like dataflow behaviour.

Even if at first the dataflow model seems preferable, it has major down sides. One is that a high amount of register is needed to implement each data path and data duplication is quite complicated and not efficient. Another is that sometimes a limited sequential operation simplifies programming and hardware effort.

Therefore it is assumed consecutively that sequencer model is implemented. Since pure dataflow can be folded using automatic tools the programmer should stay within the dataflow paradigm and not be confused with the additional capabilities. Automatic tools must take care i.e. while register allocation that the paradigm is not violated.

Figure 3:
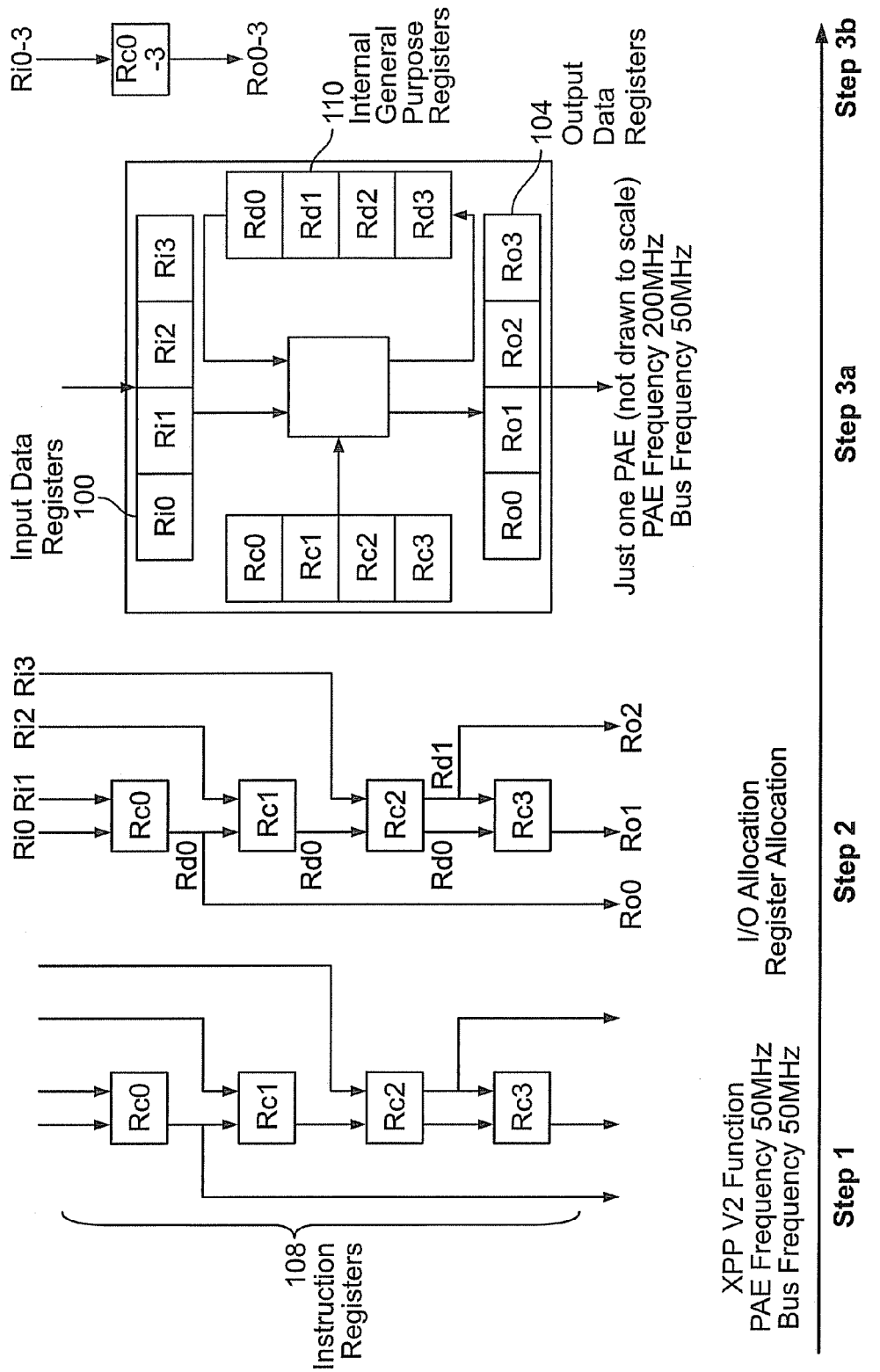
FIG. 3 shows a sequencer model.

FIG. 3 now shows that using sequencer model only 2 registers (instead of 4) are required.

For allowing complex function like i.e. address generation as well as algorithms like "IMEC"-like data stream operations the PAE has not only 4 instruction registers implemented but 8, whereas the maximum bus-clock vs. PAE-clock ration is limited to a factor of 4 for usual function folding.

It is expected that the size of the new PAE supporting Function Folding will increase by max. 25%. On the other hand 4 PAEs are reduced to 1.

Assuming that in average not the optimum but only about 3 functions can be folded onto a single PAE a XPP64 could be replaced by a XPP21. Taking the larger PAEs into account the functionality of a XPP64 XPP-II should be executable on a XPP XPP-III with an area of less than half.

The function folding method and apparatus as well as other further improvements will be described in even more detailed hereinafter.

Equality of Internal Data Registers and Bus Transfers

The function fold concept realises two different models of data processing:
a) Sequential model, wherein within the PAE the same rules apply as in von-Neuman- and Harvard-processors.
b) PACT VPU-model, wherein data are calculated or operated upon in arbitrary order according to the PETRI-Net-Model (data flow+synchronization).

Due to the unpredictability of the arrival of data at the input registers (IR) a deadlock or at a least significant reduction in performance could occur if the commands in RC0 . . . RCn 108 were to be performed in a linear manner. In particular, if feed-backs of the PAE outputs to the inputs of the PAE are present, deadlocks might occur. This can be avoided if the instructions are not to be processed in a given order but rather according to the possibility of their processing, that is, one instruction can be carried out as soon as all conditions of the VPU-model are fulfilled. Therefore, for example, once all RDY-handshakes of incoming data, ACK-handshakes of outgoing data and, if necessary, triggers, (including their handshakes) are valid, then the instruction can be carried out. As the FF PAE has data additionally stored in internal registers, their validity and status has to be checkable as well in a preferred embodiment. Therefore, every internal data register (RD0 . . . RDn) 110 is separately assigned a valid bit indicating whether or not valid data are present in the register. When writing data into the register, valid is set; when reading, valid is reset. Data can be read only if "valid" is set and can be written only if "valid" is not set. Accordingly, the valid flag corresponds most closely to the status that is produced in the state machines of bus systems by the transmittal of RDY/ACK-handshakes. It is a preferred embodiment and considered to be inventive to provide a register with a status bit in that way.

It is therefore possible to carry out instructions at the time when all conditions for the execution—again very similar to PETRI-nets are fulfilled.

Basically, there are two methods available for selection of instruction and control of their execution described herein after.

Figure 4:
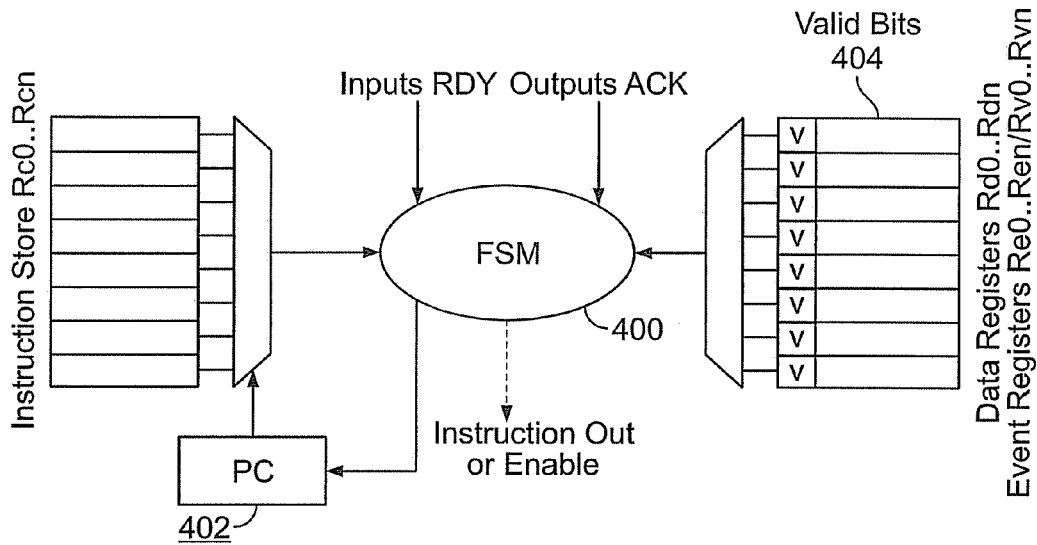
FIG. 4 shows Method A: FF PAE program pointer.

Method A: FF PAE Program Pointer
(Finite State Machine & Program Pointer-Approach)
(See FIG. 4 Now)

According to the control principle of sequential processors, a program counter is used to select a certain instruction within the instruction memory. A finite state machine 400 controls the program counter. This finite state machine now checks whether or not all conditions for the instruction in RC (PC), that is the instruction, onto which the PC. (Program Counter) 402 points, are fulfilled. To do so, the respective RDY- and/or ACK-handshakes of the in—and/or outputs needed for the execution of the instructions are checked. Furthermore, the valid-flags of the internal registers to be read (RD0 . . . RDn) 404 are checked so as to control whether or not they are set, and the valid-flags of those internal registers (RD0 . . . RDn) into which is to be written, are checked whether they are not set. If one of the conditions is not fulfilled, the instructions will not be carried out. PC is controlled to count further, the instruction is skipped and the next instruction is selected and checked as described.

The advantage of this method is the compatibility with sequential processor models. The disadvantage resides in the necessity to test and to skip instructions. Both of which might result in significant losses of performance under certain circumstances.

Figure 5:
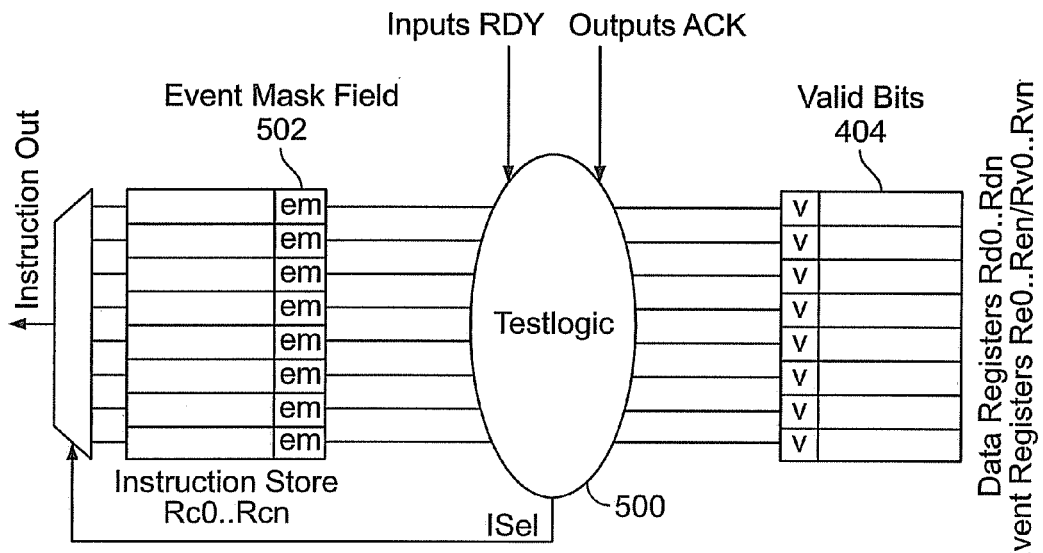
FIG. 5 shows Method B: FF PAE program pointer.

Method B: FF PAE Program Pointer
(Enabler & Arbiter-Approach)
(See FIG. 5. Now)

This method is based upon the possibility to test all instructions in Rc0 . . . . Rcn 502 in parallel. In order to save the expense of the complete decoding of array instructions, each RC is assigned an entry in an evaluation mask field, the length of which corresponds to the maximum number of states to be tested; therefore, for every possible RDY- or ACK-triggersignal (as well the RDY/ACKs of the triggers) as well as for every valid bit in RD0 . . . RDn 404 two bits are available indicating whether or not the respective signal is to be set or not set; or, whether the state of the signal is unimportant for the execution of the instruction.

| InData-RDY | | OutData-ACK | | InTrigger | | OutTrigger-ACK | | Rd Data Valid | |
|---|---|---|---|---|---|---|---|---|---|
| Rdy value | don't care | Ack value | don't care | trigger value | rdy value | don't care | ack value | don't care | valid value | don't care |

The mask shows only some entries. At In-Trigger, both the state of the trigger (set, not set) as well as the value of the trigger (trigger value) can be tested via RDY-value.

A test logic testing 500 via for example the Line Control described herein after all instructions in parallel. Using an arbiter 650, an instruction of the set of all executables is selected. The arbiter controls the instruction multiplexer via ISel according to the transferral of the selected instructions to the PAE.

The Line Control has one single line of Boolean test logic for every single instruction. By means of an ExOR-gate (e) 600 the value of the signal to be tested against the setting in em of the line is checked. By means of an OR-gate (+) 602 respectively, a selection is carried out, whether the checked signal is relevant (don't care). The results of all checked signals are ANDed. A logic 1 at the −output of the AND-gates (&) 604 shows an executable instruction. For every RC, a different test-line exists. All test-lines are evaluated in parallel. An arbiter having one of a number of possible implementations such as a priority arbiter, Round-Robin-Arbiter and so forth, selects one instruction for execution out of all executable instructions. There are further implementations possible obvious to the average skilled person. Those variants might be widely equivalent in the way of operation and function. In particular, the possibility of using "negative logic" is to be mentioned.

Figure 6:
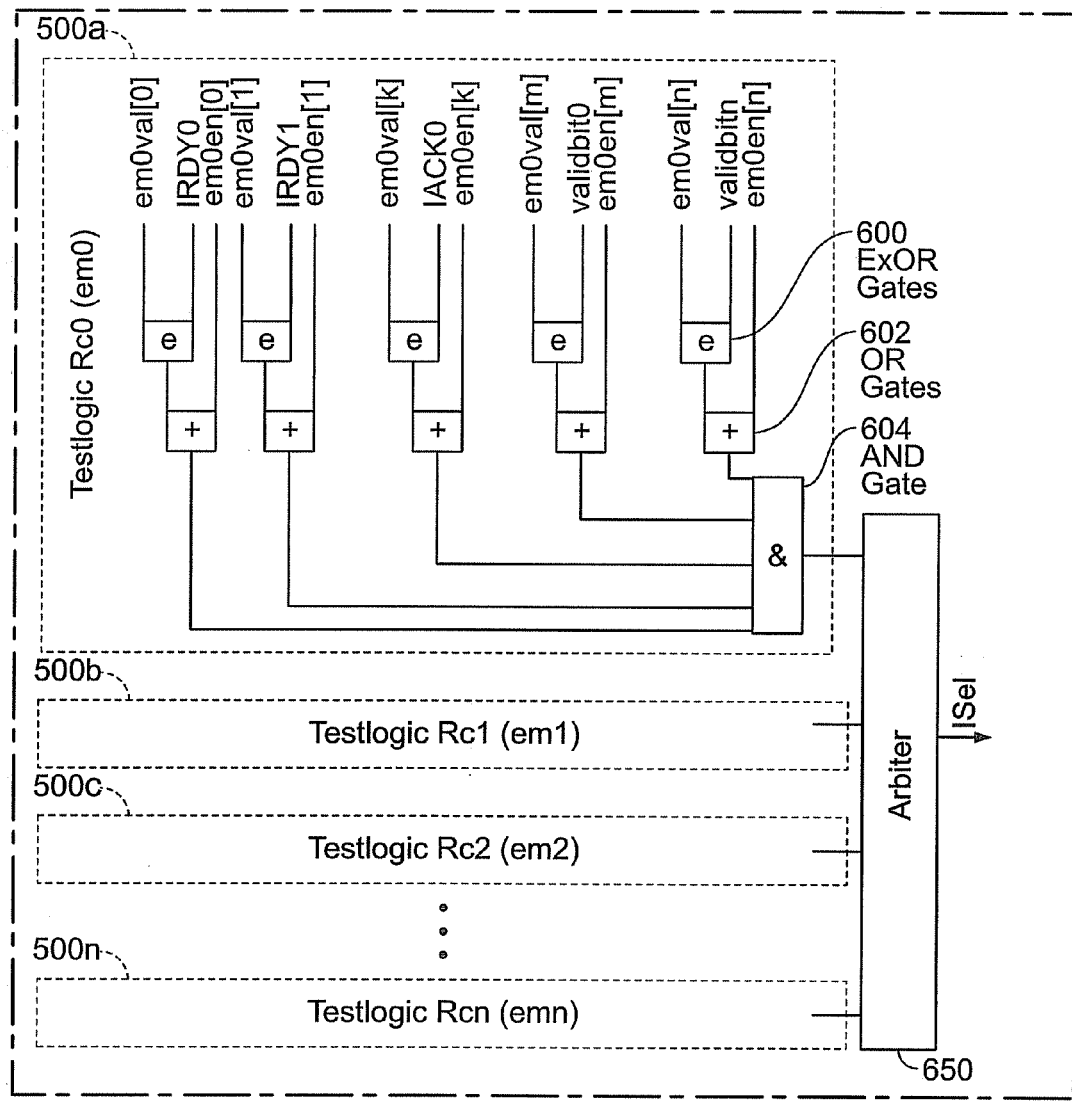
FIG. 6 shows a test logic.

(See FIG. 6 Now))

Figure 7:
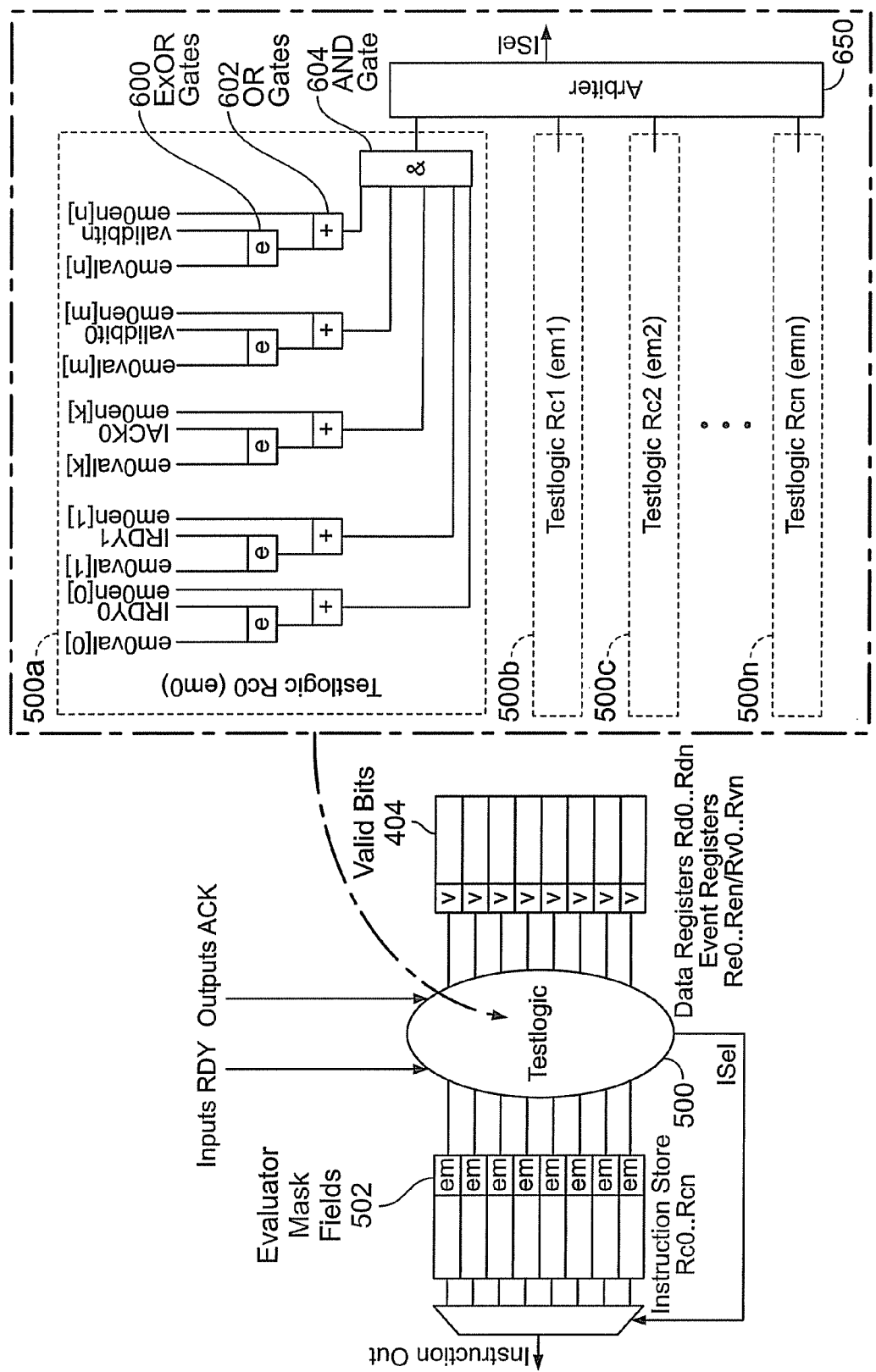
FIG. 7 shows an overview of the entire circuitry of FIGS. 5 and 6.

FIG. 7 now gives an overview of the entire circuitry.
Advantages of the method are:
  Significantly fast, in view of the fact that one instruction can be carried out in every single clock
  Reduced power consumption, since no energy is wasted on discarded cycles which is in particular advantageous to the static power dissipation.
  Similar hardware expense as in the sequential solution when using small and medium sized configuration memories (RC) therefore similar costs.
Disadvantages:
  Likely to be significantly more expensive on large RC; therefore, an optimisation is suggested for a given set of applications.
  In order to implement the sequencer mode (compare other parts of the application) the program counter having an FSM must be provided for. The FSM then is restricted to the tasks of the sequencer so that the additional expenses and the additional costs are relatively low.
Depopulated Busses according to the State of the Art
  All busses assigned to a certain PAE are connected to the input registers (IR) or the output registers of the PAE are connected to all busses respectively (compare for example DE 100 50 442.6 or the XPP/VPU-handbooks of the applicant).

It has been realised that PAEs, in particular FF PAEs, allow for a depopulation of bus interconnects, in particular, if more IR/OR will be available compared to the State of the Art of the XPP as previously known. The depopulation, that is the reductions of the possibilities to connect the IR or ER onto the busses can be symmetrically or asymmetrically. The depopulation will typically amount to 20 to 70%. It is significant that the depopulation will not or not significantly affect the interconnectability and/or the routability of an algorithm in a negative way.

The method of depopulation is particularly relevant in view of the fact that several results can be achieved. The hardware-expense and thus the costs of the bus systems can be reduced significantly; the speed of the busses is increased since the gate delay is reduced by the minimisation of connecting points; simultaneously, the power consumption of the busses is reduced.

Figure 8:
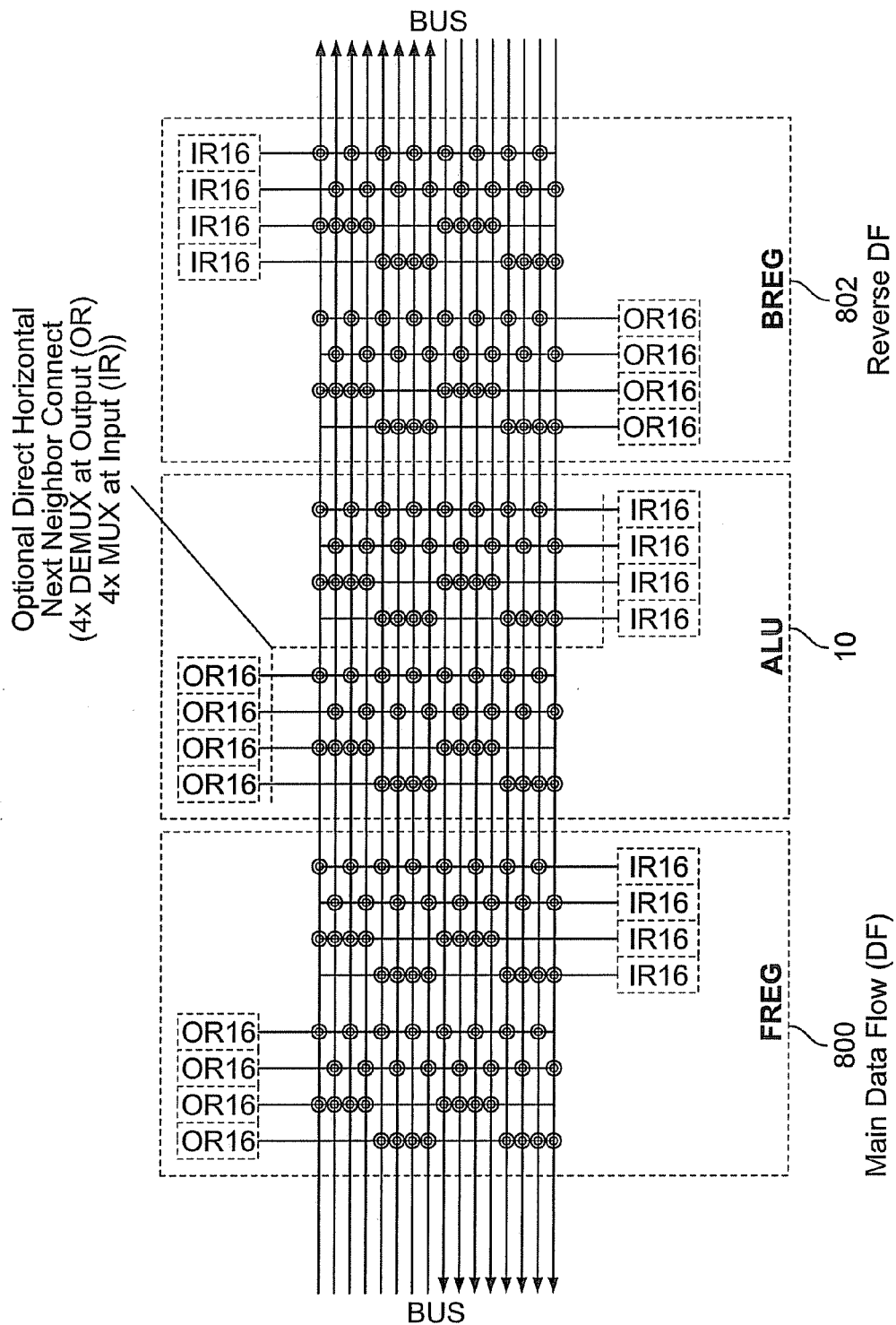
FIG. 8 shows a VPU architecture.

A preferred depopulation according to the VPU-architecture according to the State of the Art, however, with more IR/OR is shown in FIG. 8 now.

In particular, reference is being made to an optional extension of the bus architecture allowing for a direct next neighbour data transfer of two adjacent PAEs, in particular two PAEs placed one onto the other. Here, the outputs (OR) of one PAE are directly connected to a dedicated bus which is then directly connected to the inputs (IR) of a neighbouring PAE (compare FIG. 9 now). The figure only shows a horizontal next neighbour bus, however, in general, vertical busses are possible as well.

In FIG. 8 now, the shaded circles stand for possible bus connects: MUX. Double circuits stand for a connection from the bus: DeMUX.

Changes of the PAE IO

Figure 9:
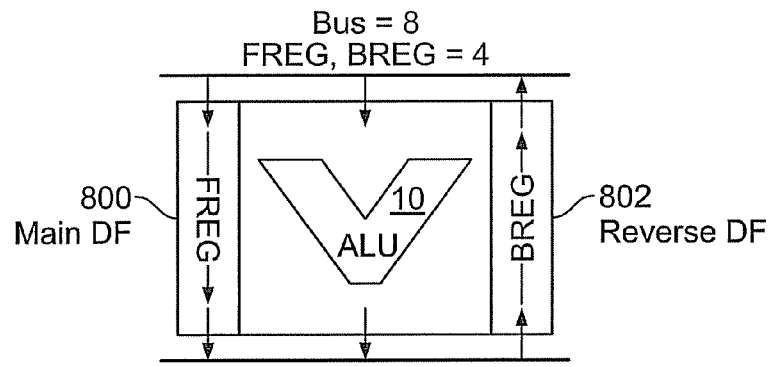
FIG. 9 shows a PAE implementation.

FIG. 9 now shows the State of the Art of a PAE implementation as known from XPU128, XPP64A and described in DE 100 50 442.6

The known PAE has a main data flow in the direction from top to bottom to the main ALU 10 in the PAE-core. At the left and right side, data channels are placed additionally transmitting data along the main data flow direction, once the same direction as the main data flow (FREG) 800 and once in the reverse direction (BREG) 802. On both sides of the PAE, data busses are provided that run in the reverse direction of the main data flow of the PAE and onto which the PAE as well as FREG and BREG are connected. The architecture of the State of the Art requires eight data busses for each PAE side as well as four transfer channels for FREG/BREG for typical applications.

The bus system of the State of the Art has switching elements, register elements (R) 1000, each at the side of the PAEs. The switching elements allow for the disruption of a bus segment or disconnection to a neighbouring bus, the register elements allow the construction of an efficient pipelining by transferring data through the register, so as to allow for higher transferral band-width. The typical latency in vertical direction for next-neighbour-transmitting is 0 per segment, however is 0.5-1 in horizontal direction per segment and higher frequencies.

Figure 10:
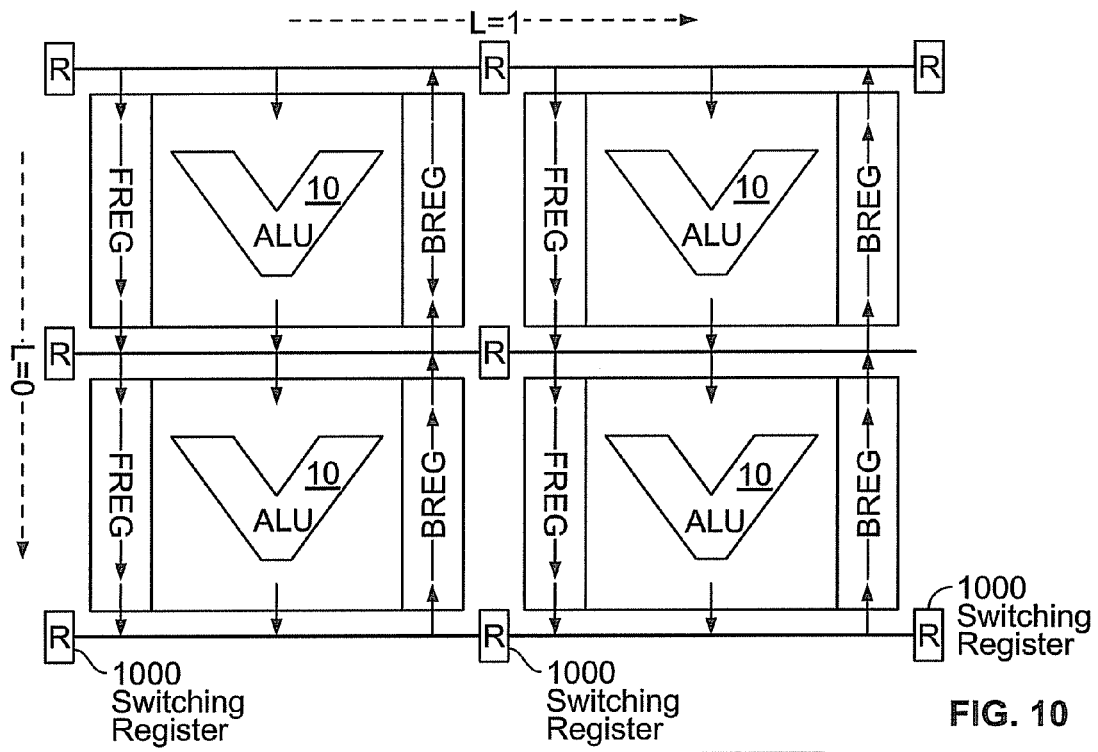
FIG. 10 shows a bus system.

(See FIG. 10 Now)

Now, a modified PAE structure is suggested, wherein two ALUs 10a, 10b, each having a different main data flow direction are provided in each PAE, allowing for significantly improved routability. On one hand, the tools used for routing are better and simpler; on the other hand, a significant reduction in hardware resources is achieved. First tests show that the number of busses necessary in horizontal direction is reduced by about 25% over the State of the Art. The vertical connects in FREG/BREG (=BYPASS) can even be reduced by about 50%. Also, it is no more necessary to distinguish between FREG and BREG as was necessary in DE 100 50 442.6.

Figure 11:
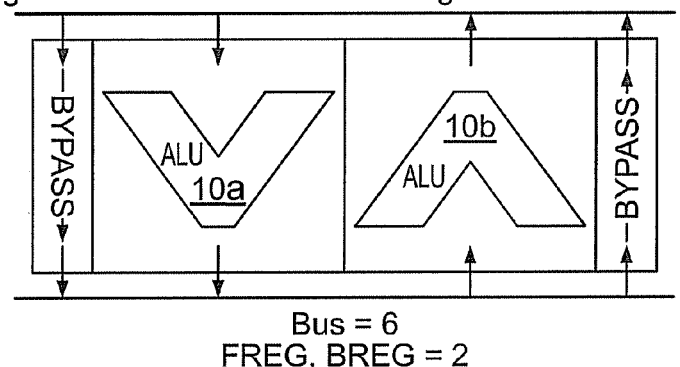
FIG. 11 shows a modified PAE structure.

(See FIG. 11 Now)

The double-ALU structure has been further developed to an ALU-PAE 10 having inputs and outputs in both directions. Using automatic routers as well as hand-routed applications, further additional significant improvements of the network topology can be shown. The number of busses necessary seems to be reduced to about 50% over the State of the Art, the number of vertical connects in the FREG/BREG (=BYPASS) can be reduced by about 75%.

Figure 12:
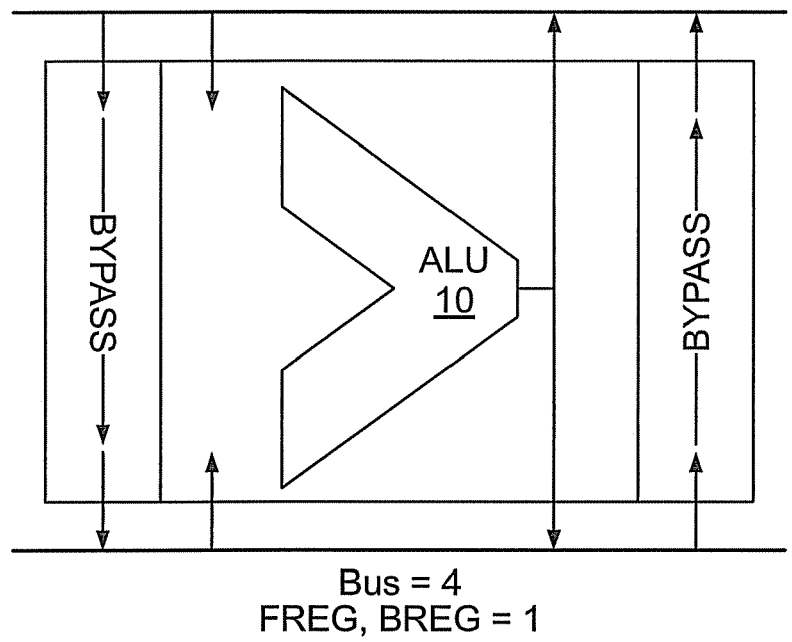
FIG. 12 shows an ALU-PAE having inputs and outputs in both directions.

(See FIG. 12 Now)

Figure 13:
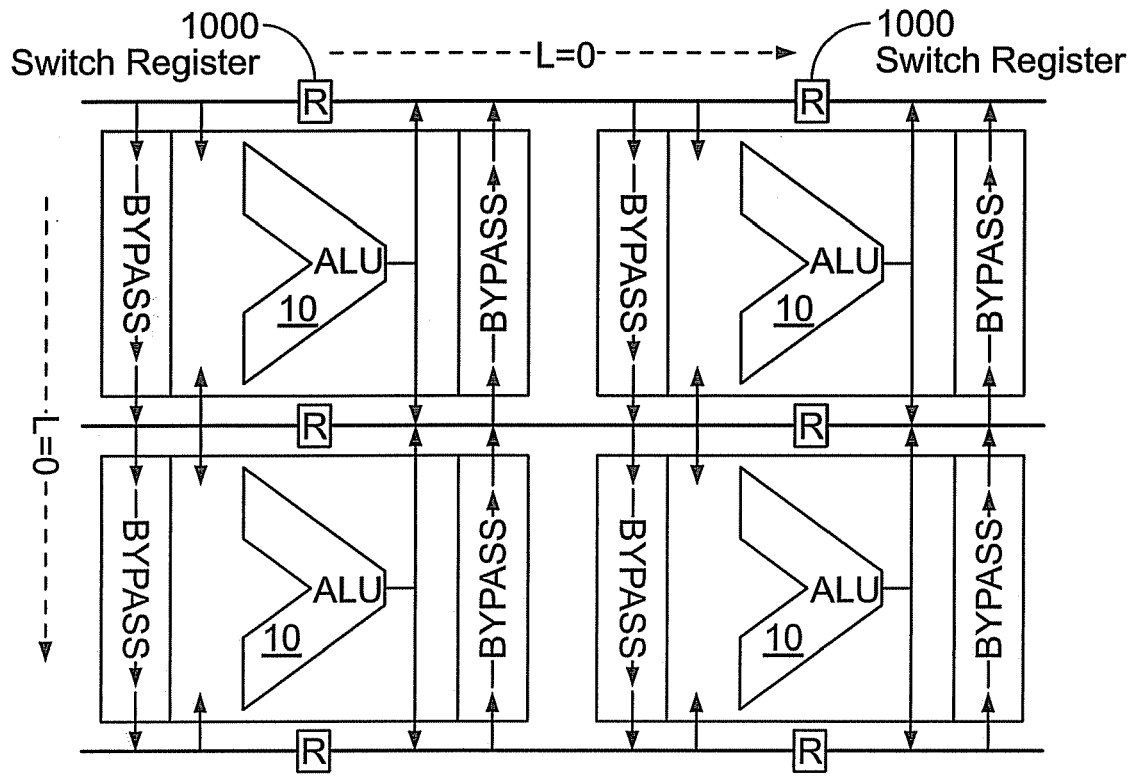
FIG. 13 shows a modified bus system.

For this preferred embodiment which can be used for conventional as well as for function fold ALUs, it is possible to place register and switching elements 1000 in the busses in the middle of the PAE instead of at the sides thereof (see FIG. 13 now).

In this way, it is possible even for high frequencies to transmit data in horizontal direction to the respective neighbouring PAE without having to go through a register element. Accordingly, it is possible to set, up next neighbour connections in vertical and horizontal directions which are latency free (compare State of the Art and drawings referring to depopulated busses). The example of the interconnections shown in the respective figure allows transferral having zero latency in vertical direction and horizontally from left to right. Using an optimisation of PAE interface structure a latency free next neighbouring transmission in both horizontal directions can be achieved. If in every corner of the PAE input register (IR, arrow of bus into PAE) 1405 from bus and output register (OR, arrow from PAE to bus) 1400 to the bus are implemented, each neighbouring PAE can exchange data without latency.

Figure 14:
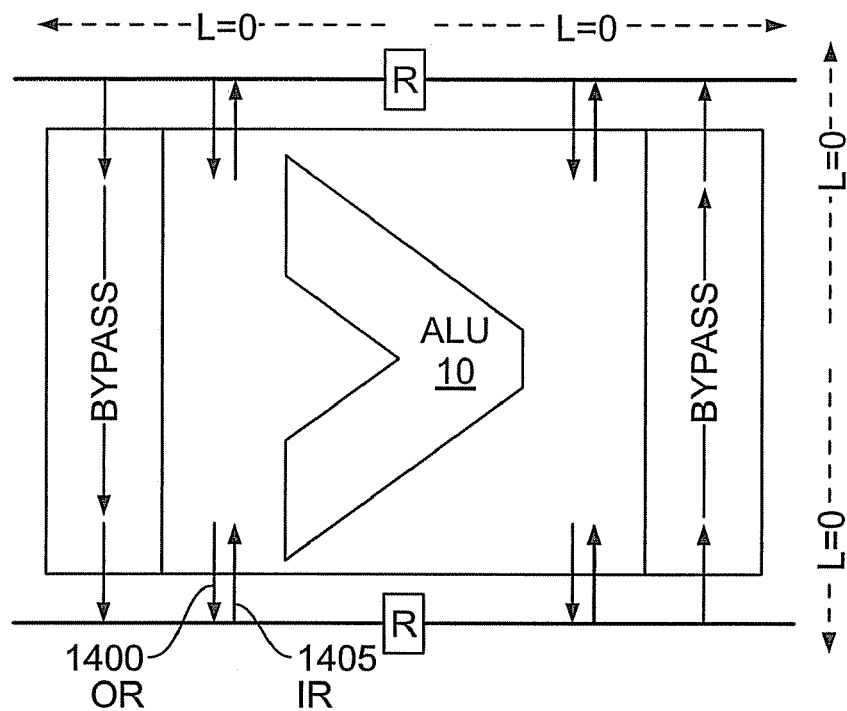
FIG. 14 shows a PAE exchanging data without latency.

(See FIG. 14 Now)

Figure 15:
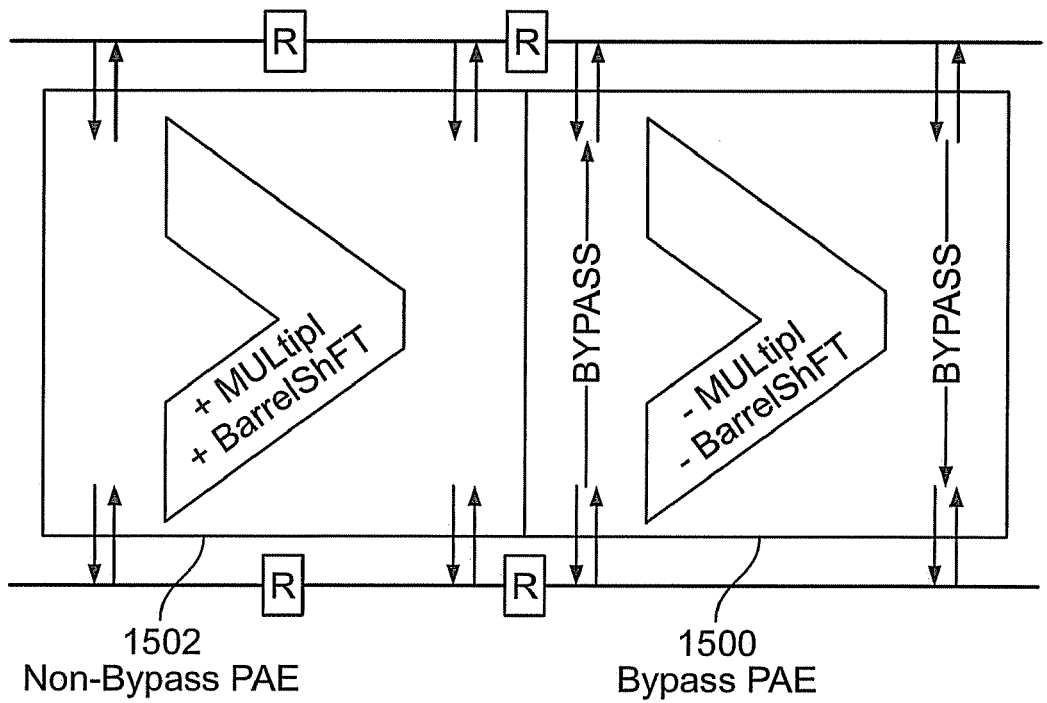
FIG. 15 shows an optimised PAE arrangement.

It is possible to further optimise the above disclosed PAE arrangement. This can be done by using no separate bypass at all in all or some of the PAEs. The preferred embodiment comprises two ALUs 1500, 1502, one of these being "complete" and having all necessary functions, for example multiplication and BarrelShift while the second has a reduced instruction set eliminating functions that require larger arrays such as multiplication and BarrelShift. The second ALU is in a way replacing BYPASS (as drawn). There are several possible positions for the register in switching elements per bus system, and two of the preferred positions per bus are shown in FIG. 15 in dotted lines.

Both ALUs comprise additional circuits to transfer data between the busses so as to implement the function of the bypass. A number of possible ways of implementations exist and two of these shall be explained as an example.

a) Multiplexer

Configurable multiplexers within the ALU are connected so that ALU inputs are bypassing the ALU and are directly connected to their outputs.

b) MOVE Instruction

A MOVE instruction, stored in Rc0 . . . . Rcn is transferring within the respective processing clock of the function fold the data according to the input specified within the instruction to the specified output.

Superscalarity/Pipelining

It is possible and suggested as first way of improving performance to provide roughly superscalar FF ALU-PAEs which calculate for example 2, 4, 8 operations per bus clock @ FF=2, 4, 8, even while using the MUL opcode.

The basic concept is to make use of the VALID-flags of each internal register. MUL is implemented as one single opcode which is pipelined over two stages.

MUL 1704 takes its operands from the input registers Ri and stores the results into internal data registers Rd. VALID is set if data is stored into Rd. ADD (or any other Opcode, such as BSFT 1706) uses the result in Rd if VALID is set; if not the execution is skipped according to the specified VALID behaviour. In addition the timing changes for all OpCodes, if the MUL instruction is used inside a PAE configuration. In this case all usually single cycle OpCodes will change to pipelined 2 cycle, OpCodes. The change is achieved by inserting a bypass able multiplexer into the data stream as well as into control.

The following program will be explained in detail: MUL (Rd0, Rd1), Ri0, Ri1;

ADD Ro0, Rd1, Ri2;

In the first bus-cycle after configuration ($t_0$) MUL is executed (assuming the availability of data at Ri0/1). The register pair Rd0/1 is invalid during the whole bus-cycle, which means during both FF-PAE internal clock cycles. Therefore ADD is not executed in the $2^{nd}$ clock cycle. After to the result of MUL is written into the register pair, which VALID flags are set at the same time.

In $t_1$ new data is multiplied. Since the VALID is set for Rd0/1 now the ADD command is executed in the $2^{nd}$ clock cycle, but takes 2 clock cycles for over all execution. Therefore operand read and result write is inline for both operations, MUL as well as ADD.

The result of a MUL-ADD combination is available with 2 clocks latency in a FF=2 ALU-PAE. For FF>=6 no latency is inserted.

Figure 16:
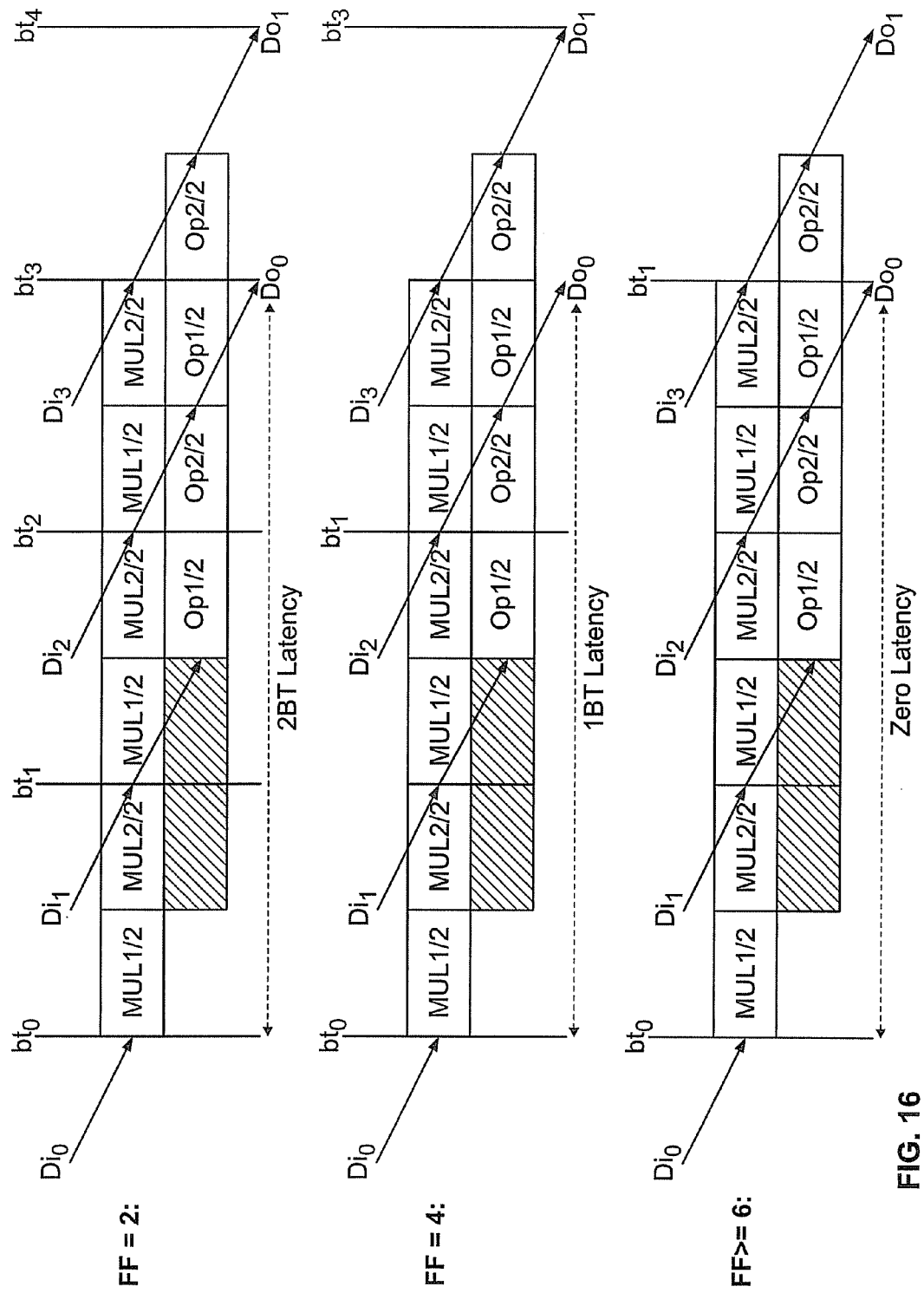
FIG. 16 shows superscalar FF ALU-PAEs.

(See FIG. 16 Now)

However since multiplication and all other commands are processed in parallel the machine streams afterwards without any additional delays.

Figure 17:
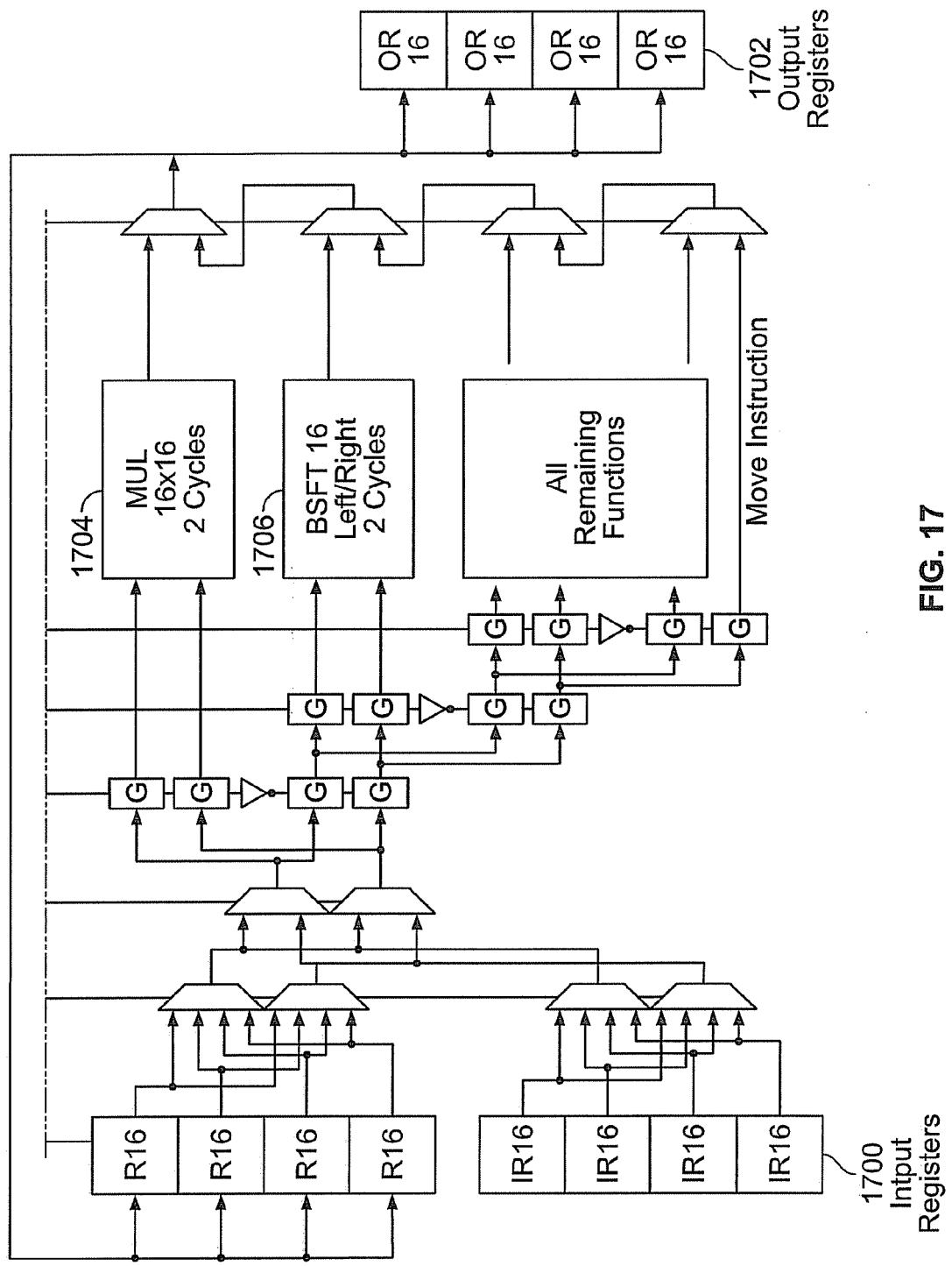
FIG. 17 shows a datapath architecture.

(See FIG. 17 Now)

If there are OpCodes besides MUL which require 2 clock cycles for execution (e.g. BSTF) the architecture must be modified to allow at least 3 data writes to registers after the second internal clock cycle.

The data path output multiplexer gets 2 times larger as well as the bus system to the output registers (OR) 1702 and the feedback path to the internal data registers (Rd). If accordingly defined for the OpCodes, more than 4 internal registers can be used without increasing the complexity by using enables (en) to select the specific register to write in the data. Multiple registers are connected to the same bus, e.g. Rd0, Rd4, Rd8, Rd12. However not all combinations of register transfers are possible with this structure. If e.g. MUL uses Rd0 and Rd1 the following registers are blocked for the OpCode executed in parallel: Rd4, 5, 8, 9, 12, 13.

Register Map:

Rd0
Rd1
Rd2
Rd3
Rd4
Rd5
Rd6
Rd7
Rd8
Rd9
Rd10
Rd11
Rd12
Rd13
Rd14
Rd15

Figure 18:
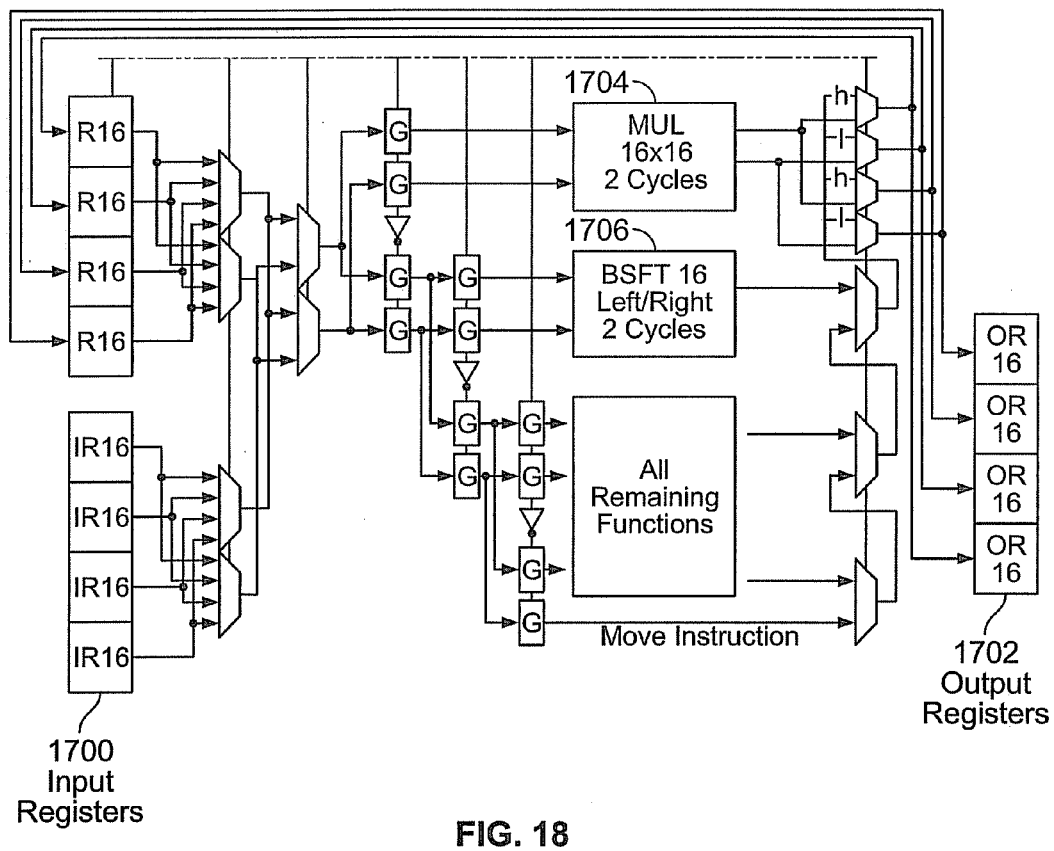
FIG. 18 shows another datapath architecture.

Datapath Architecture: see FIG. 18 now.

The Sequencer PAEs

Since there is a need to be able to run control flow dominated applications on the XPP III as well, Sequencer PAEs will be introduced. Such a PAE can be thought of as a very simple kind of processor which is capable to run sequential code within the XPP. This allows the efficient implementation of control flow oriented applications like the H.264 Codec on the array whereas with SEQ-PAEs missing the realization would be more difficult and resource consuming.

Figure 19:
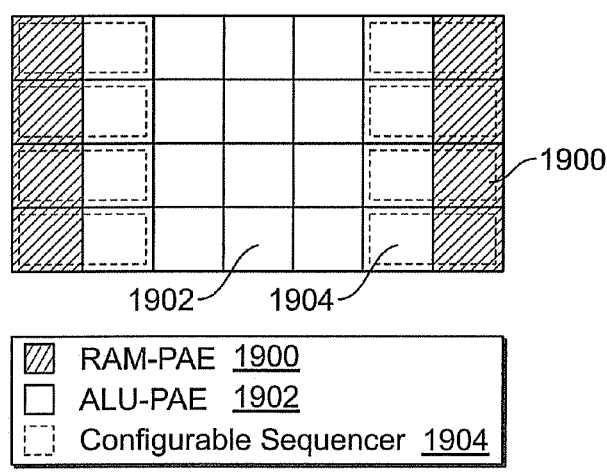
FIG. 19 shows a configurable sequencer.

The SEQ-PAEs are not built from scratch. Instead such a tile will be built up by a close coupling of a ALU-PAE 1902 and neighboring RAM-PAE 1900, which can be seen in FIG. 19 now.

Therefore the functionality of the ALU—as well as RAM-PAE has to be enhanced to be able to fulfill the requirements of such a SEQ-PAE. This information will be given next.

ALU-PAE Enhancements

Figure 20:
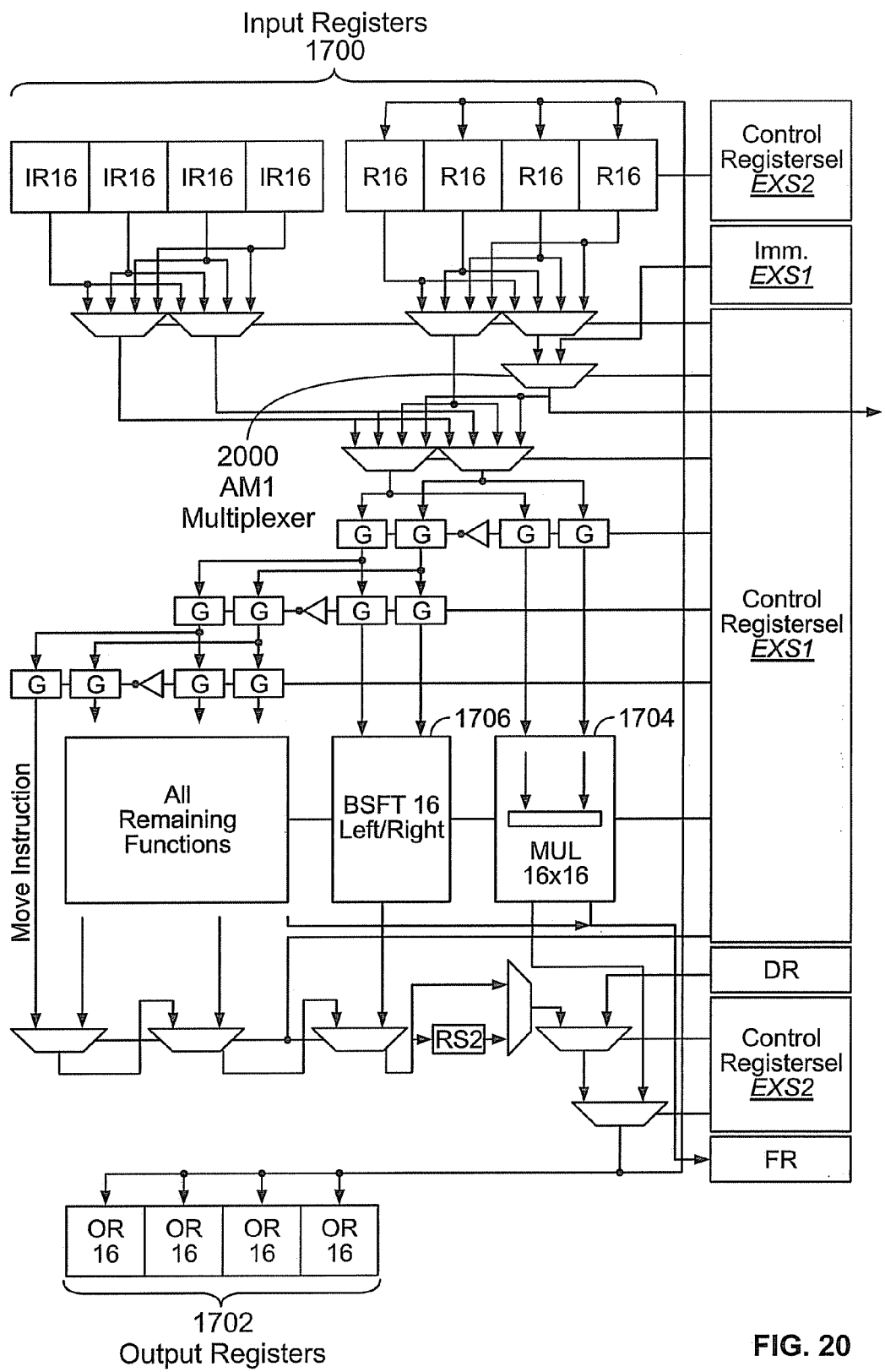
FIG. 20 shows an enhanced version of an ALU-PAE.

The extended version of the ALU-PAE is given in FIG. 20 now. To the right border the registers which are controlling the different modules can be seen. Those registers will be used in normal—as well as in SEQ-mode. Therefore the appropriate control signals from the local configuration manager and the RAM-PAE are first merged by OR-Gates and then are forwarded to the register whereas it has to be ensured that in normal mode the signals from the RAM-PAE are 0 and vice versa.

Furthermore, since the ALU-PAE marks the execution part of the tiny processor, there is a need to transfer values to and from the internal register directly to the RAM. Therefore, an additional multiplexer AM1 2000 is inserted in the multiplexer hierarch of section 2. In the normal mode this multiplexer feeds the word from its predecessor to the next stage whereas in the SEQ mode an immediate value provided by the 1 mm. Register will be delivered. In addition in SEQ mode a value of one of the internal registers can be delivered to the RAM-PAE via the output of the multiplexer. However, it has also to be considered to provide a "LOAD reg, imm" since this is not much slower than "ADD reg, reg, imm"

To enable the RAM-PAE to write data to the internal register of the ALU-PAE another multiplexer is inserted in the multiplexer chain of section 4. Similar to the scenario given above this multiplexer will only be activated in SEQ mode whereas in normal mode this multiplexer will just forward the data of its predecessor. In one preferred embodiment, it is suggested to place RS2 behind BSFT-Mux in view of the delay. Data could be written into the internal registers via this. (LOAD reg, imm)]

As it has already been discussed, data can be processed during one or two cycles by the ALU-PAE depending on the selected arithmetic function. Due to the auto synchronization feature of the XPP and due to the fact that in normal mode a successive operation will not start before the previous one is finished, it does not really care if an operation lasts one or two clock cycles. Whereas the tile is working in SEQ mode there is a difference since we assume to have a pipeline character. This means that a one cycle operation could run in parallel with a two cycle module where the operation would be executed in stage two at this time. Due to the limited multiplexing capacities of a word—16 Bit—only one result could be written to the connected registers whereas the other one would be lost. In general there are three possibilities to solve this problem.

The first one could be that the compiler is capable to handle this problem. This would mean that it has to know about the pipeline structure of the whole SEQ-PAE as well as of a tile in detail. To prohibit a parallel execution the compile would have to add a NOP to every two cycle instruction for the structure given above. However this idea seems not to be convenient due to the strong relation between the hardware structure and the compiler. The drawback would be that every time changes are made to the hardware the compile would most likely have to be trimmed to the new structure.

The second idea could be to recognize such a situation in the decode stage of the pipeline. If a two cycle instruction is directly followed by an instruction accessing a one stage arithmetic unit it has to be delayed by one clock cycle as well.

The last possibility is to make the complete ALU-PAE look like a two stage execution unit. Therefore only one register has to be included in the multiplexer chain of section four right after the crossover from the multiplexer separating the one stage of the two stage modules. Obviously, this is preferred.

Comparing the last to ideas the third one seems to be the best one since only one register has to be inserted If we a closer look to the second solution special logic would be needed for analyzing the disallowed combination of instructions as well as logic for stopping the program counter (PC) and the instruction retardation. It has to be assumed that this logic would require much more area than the registers as well as the fact that the delay of the logic would possibly increase the critical path.

Since it has to be distinguished between the SEQ and the normal mode where a one cycle execution should still be available. This possibility is given by a multiplexer which allows bypassing the RS2 Register as shown in the corresponding figure (FIG. 20 now).

The RAM-PAE

A Short Description of the Stages

Figure 21:
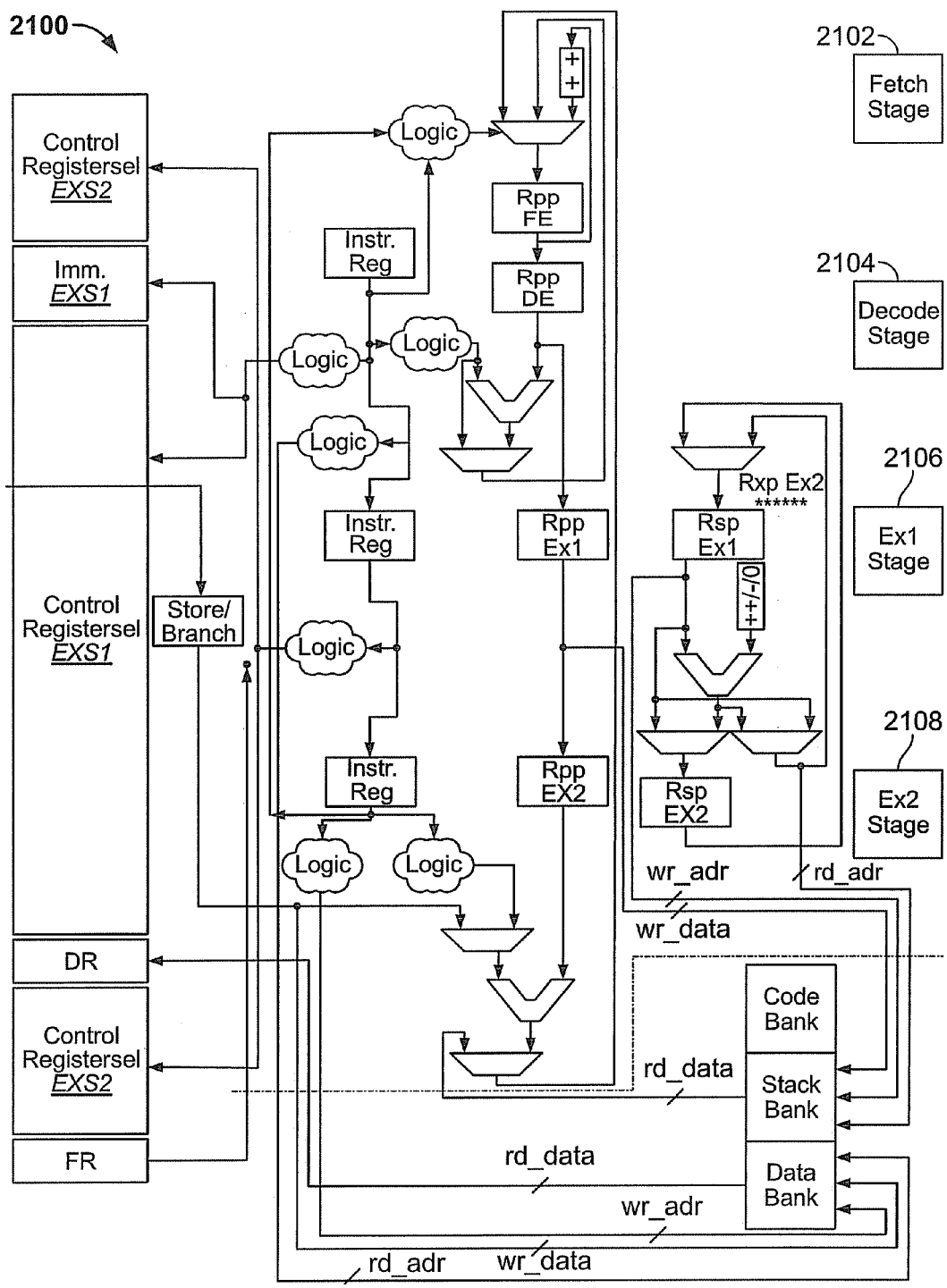
FIG. 21 shows an overview of the RAM-PAE.

To get the SEQ-PAE working there still has to be provided more functionality. Right now the RAM-PAE 2100 will take care of it. As a first approach for realizing the sequencer a four stage pipeline has been chosen. The stages are, as it can be seen in FIG. 21 now:

The fetch stage 2102
The decode stage 2104
The execution stage 1 2106
The execution stage 2 2108

In the fetch stage the program counter for the next clock cycle will be calculated. This means that it will be either incremented by 1 via a local adder or one of the program counters from the decode or execution stage 2 will be selected. The program counter of the execution stage thereby provides the address if a call instruction occurred whereas the program counter of the execution stage provides the PC if there has been a conditional jump. Right now the branch address can either be calculated out of the current PC and a value which either is an immediate value or a value from internal registers of the ALU-RAM—indirect addressing mode—or an absolute value. This e.g. is necessary if there is return from a subroutine to the previous context whereas the according absolute PC will be provided by the stack bank.

In the decode stage the instruction coming from the code bank will be decoded. Necessary control signals and, if needed, the immediate value, for the internal execution stage 1 as well as for the execution stage 1 of the ALU-PAE will be generated. The signals include the control information for the multiplexers and gating stages of section two of the ALU-PAE, the operation selection of the ALU's tiles, e.g. signed or unsigned multiplication, and the information whether the stack pointer (SP) should be in/decremented or kept unchanged in the next stage depending on the fact if the instruction is either a call or jump. In case a call instruction occurred a new PC will be calculated in parallel and delivered to the fetch stage. Furthermore the read address and read enable signal to the data bank will be generated in case of a load instruction. In the execution stage 1, which by the way is the first stage available on the ALU as well as on the RAM-PAE, the control signals for execution stage 2 of the ALU-PAE are generated. Those signals will take care that the correct output of one of the arithmetical tiles will be selected and written to the enabled registers. If the instruction should be a conditional jump or return the stack pointer will be modified in this stage. In parallel the actual PC will be saved to the stack bank at the address give by the Rsp EX1 register in case of a branch. Otherwise, in case of a return, the read address as well as the read enable signal will be applied to the stack bank.

In execution stage 2 the value of the PC will be calculated and provided to the multiplexer in the fetch stage in case of a jump. At the time write address and write enable signal to the data bank are generated if data from the ALU have to be saved.

Instead of two adders, it is possible to provide only one in the rpp path.

Pipeline Actions

In the following section a short overview of the actions that are taking place in the four stages will be given for some basic instructions. It should help to understand the behaviour of the pipeline. Since the instruction which is going to be discussed will be available at the instruction register the actins of the fetch stage will be omitted in this representation.

IR: Instruction Register

DR: Data Register

DB: Data Bank

SBR: Store/Branch Register

Instruction: Load value from data bank to R[n]

| ALU-PAE | RAM-PAE |
|---|---|
| | decode stage |
| | IR_ex1 <- IR_ex2 |
| | Control Registerset EXS1 <- 0x0 |
| | Imm. EXS1 <- 0x0 |
| | Rpp_ex1 <- Rpp_de |
| | DB_radr <0 imm |
| | Execution stage 1 |
| | IR_ex2 <- IR_ex1 |
| | Control Registerset EXS2 <- enable R, set mux section 4 |
| | Rpp_ex2 <- Rpp_ex1 |
| | DR <- DB_radr [imm] |
| | Rsp_ex2 <- Rsp_ex1 |
| | Execution stage 2 |
| R[n] <- DR | |

Instruction: Store value from R[n] to data bank

| ALU-PAE | RAM-PAE |
|---------|---------|
| decode stage | |
| | IR_ex1 <- IR_ex2 |
| | Control Registerset EXS1 <- enable mux section 2 |
| | Imm. EXS1 <- 0x0 |
| | Rpp_ex1 <- Rpp_de |
| | Execution stage 1 |
| SBR <- R[n] | IR_ex2 <- IR_ex1 |
| | Control Registerset EXS2 <- 0x0 |
| | Rpp_ex2 <- Rpp_ex1 |
| | Rsp_ex2 <- Rsp_ex1 |
| | Execution stage 2 |
| | DB_wradr <- imm |
| | DB_wrdata <- SBR |

1.3 Array Structure

First advantages over the prior art are obtained by using function folding PAEs. These as well as other PAEs can be improved.

The XPP-II structure of the PAEs consumes much area for FREG and BREG and their associated bus interfaces. In addition feed backs through the FREGs require the insertion of registers into the feedback path, which result not only in an increased latency but also in a negative impact onto the throughput and performance of the XPP.

A new PAE structure and arrangement is proposed with the expectation to minimize latency and optimize the bus interconnect structure to achieve an optimized area.

The XPP-III PAE structure does not include BREGs any more. As a replacement the ALUs are alternating flipped horizontally which leads to improved placement and routing capabilities especially for feedback paths i.e. of loops.

Figure 22:
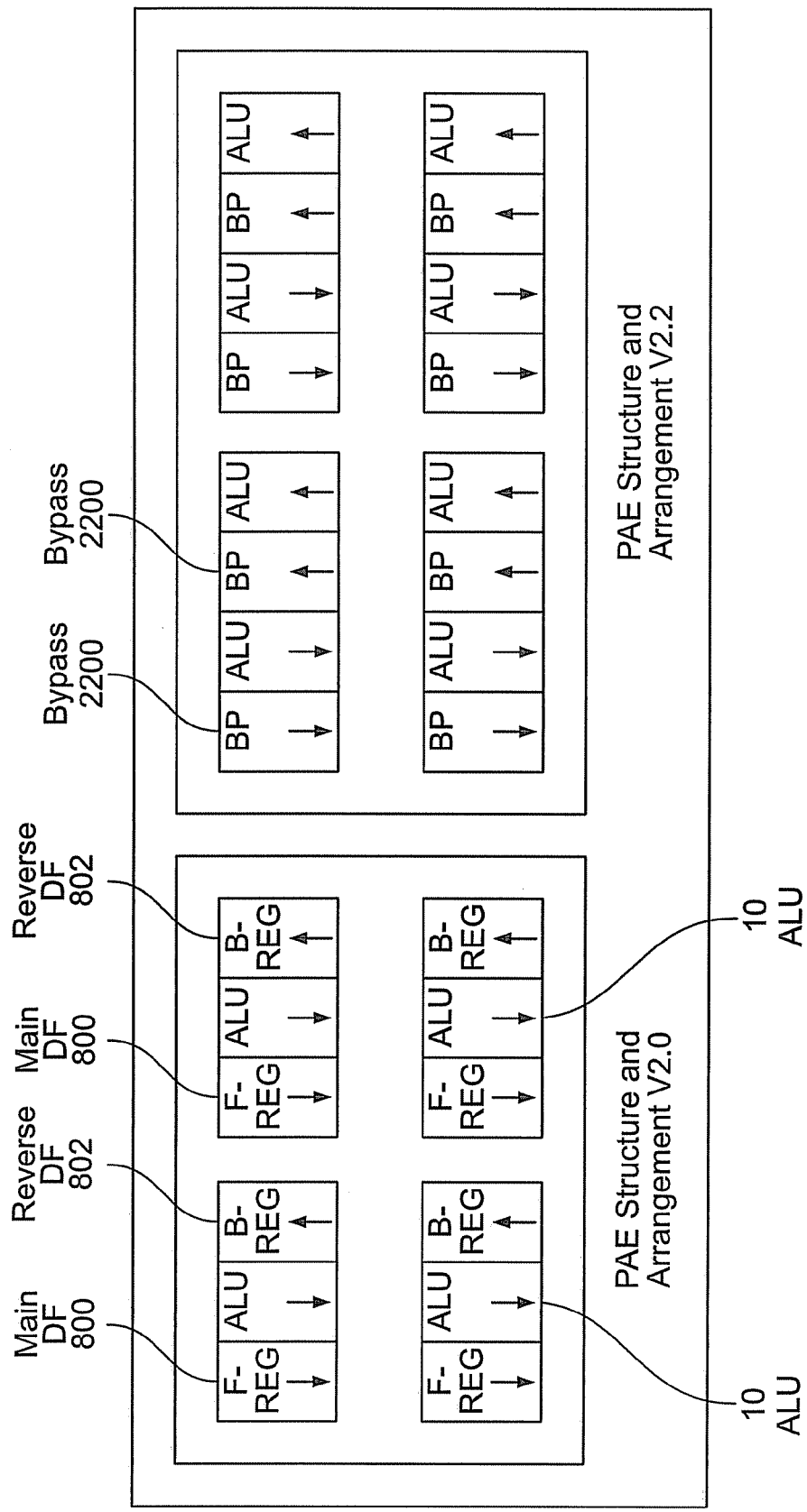
FIG. 22 shows PAE Structure and Arrangement V2.0 and PAE Structure and Arrangement V2.2.

Each PAE contains now two ALUs and two BP paths 2200, one from top to bottom and one flipped from bottom to top.
(See FIG. 22 Now)

1.4 Bus Modifications

Within this chapter optimizations are described which might reduce the required area and the amount of busses. However, those modifications comprise several proposals, since they have to be evaluated based on real algorithms. It is possible to e.g. compose a questionnaire to collect the necessary input from the application programmes 1.4.1 Next Neighbour In XPP-II architecture a direct horizontal data path between two PAEs block a vertical data bus. This effect increases the required vertical busses within a XPP and drives cost unnecessarily. Therefore in XPP-III a direct feed path between horizontal PAEs is proposed.

In addition horizontal busses—of different length are proposed, i.e. next neighbour, crossing 2 PAEs, crossing 4 PAEs.

1.4.2 Removal of Registers in Busses

In XPP-II registers are implemented in the vertical busses which can be switched on by configuration for longer paths. This registers can furthermore be preloaded by configuration which requires a significant amount of silicon area. It is proposed to not implement registers in the busses any more, but to use an enhanced DF or Bypass (PB) part within the PAEs which is able to reroute a path to the same bus using the DF or BP internal registers instead.

(See FIG. 23 Now)

Here, it might be to decide how many resources are saved for the busses and how many are needed for the PAEs and/or how often must registers be inserted, are 1 or max. 2 paths enough per PAE (limit is two since DF/BP offers max. 2 inputs)

1.4.3 Shifting n: 1, 1:n Capabilities from Busses to PAEs

In XPP-II n:1 and 1:n transitions are supported by the busses which require a significant amount of resources i.e. for the sample-and-hold stage of the handshake signals.

Depending on the size of n two different capabilities are provided with the new PAE structure:

| | |
|---|---|
| $n \leq 2$ | The required operations are done within the DF path of the PAE |
| $2 \leq n \leq 4$ | The ALU path is required since 4 ports are necessary |
| $n > 4$ | Multiple ALUs have to be combined. |

This method saves a significant amount of static resources in silicon but requires dedicated PAE resources at runtime.

Here, it might be worthwhile to evaluate how much silicon area is saved per bus how often occurs n=2, $2 \leq n \leq 4$, n>4 the ratio between saved silicon area and required PAE resource and to decide on the exact bus structure in response to one or all of said criteria.

1.5 FSM in RAM-PAEs

In the XPP-II architecture implementing control structures is very costly, a lot of resources are required and programming is quite difficult.

Figure 24:
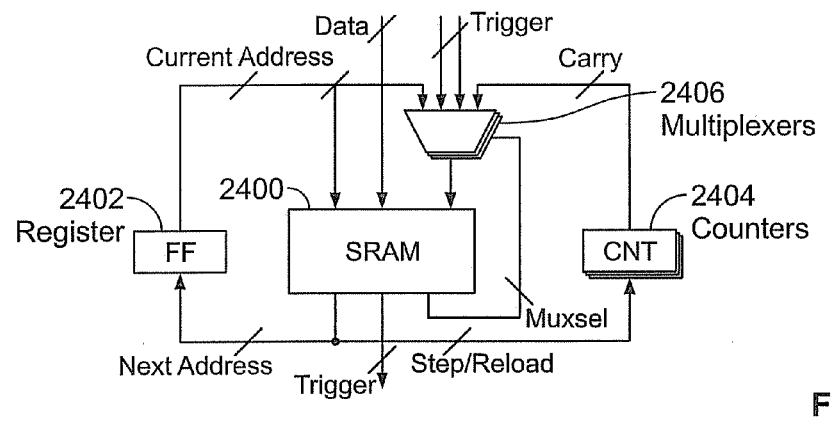
FIG. 24 shows an enhancement of RAM-PAEs.

However memories can be used for a simple FSMs implementation. The following enhancement of the RAM-PAEs offers a cheap and easy to program solution for many of the known control issues, including HDTV.
(See FIG. 24 Now)

Basically the RAM-PAE is enhanced by a feedback from the data output to the address input through a register (FF) 2402 to supply subsequent address within each stage. Furthermore additional address inputs from the PAE array can cause conditional jumps; data output will generate event signals for the PAE array. Associated counters 2404 which can be reloaded and stepped by the memory output generate address input for conditional jumps (i.e. end of line, end of frame of a video picture).

A typical RAM PAE implementation has about 16-32 data bits but only 8-12 address bits. To optimize the range of input vectors it is therefore suggested to insert some multiplexers at the address inputs to select between multiple vectors, whereas the multiplexers are controlled by some of the output data bits.

Figure 25:
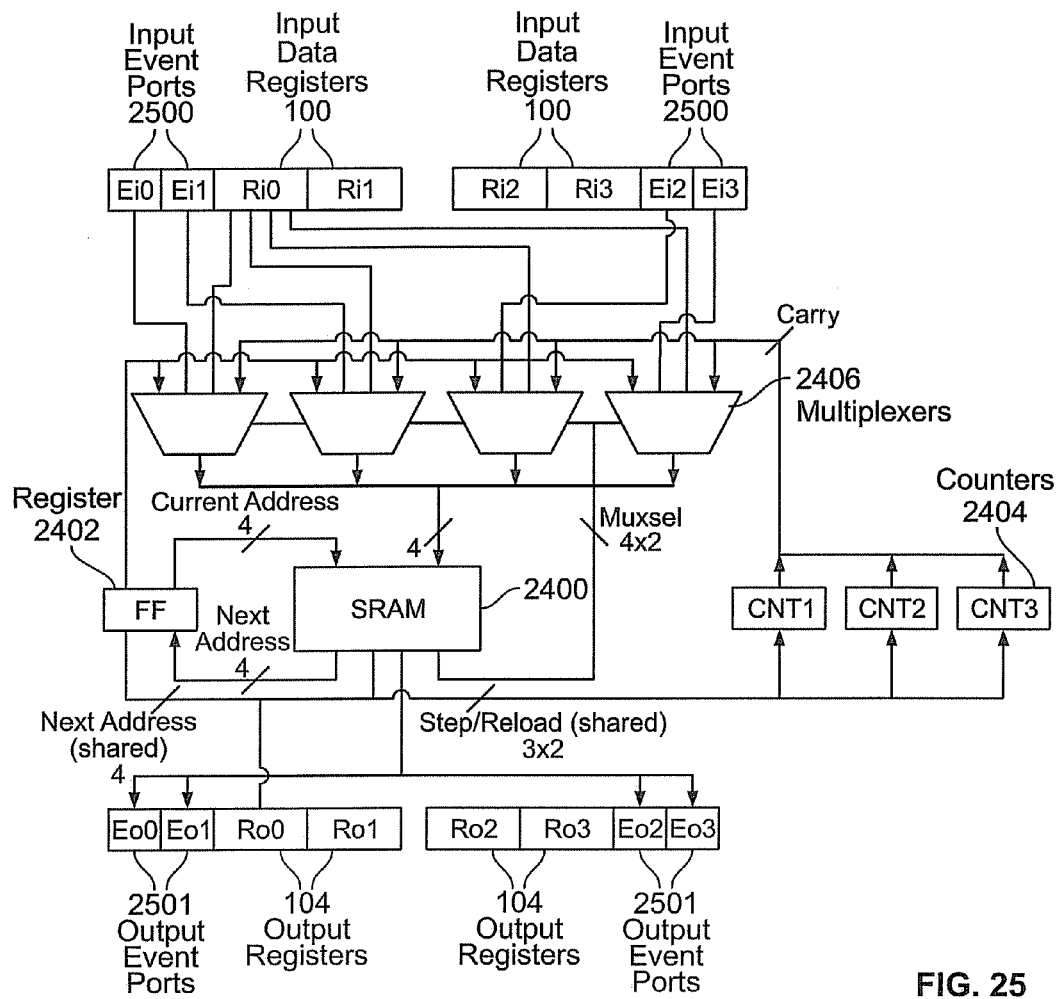
FIG. 25 shows a memory organization.

One implementation for an XPP having 24 bit wide data busses is sketched in FIG. 25 now. 4 event inputs are used as input, as well as the lower for bits of input port Ri0. 3 counters are implemented, 4 events are generated as well as the lower 10 bits of the Ro0 port.

The memory organisation suggested here may be as follows:
    8 address bits
    24 data bits (22 used)
        4 next address
        8 multiplexer selectors
        6 counter control (shared with 4 additional next address)
        4 output
(See FIG. 25 Now)

It is to be noted that the typical memory mode of the RAM-PAE is not sketched in the block-diagram mentioned above.

The width of the counters is according to the bus width of the data busses.

For a 16 bit implementation it is suggested to use the carry signal of the counters as their own reload signal (auto reload), also some of the multiplexers are not driven by the memory but "hard wired" by the configuration.

Figure 26:
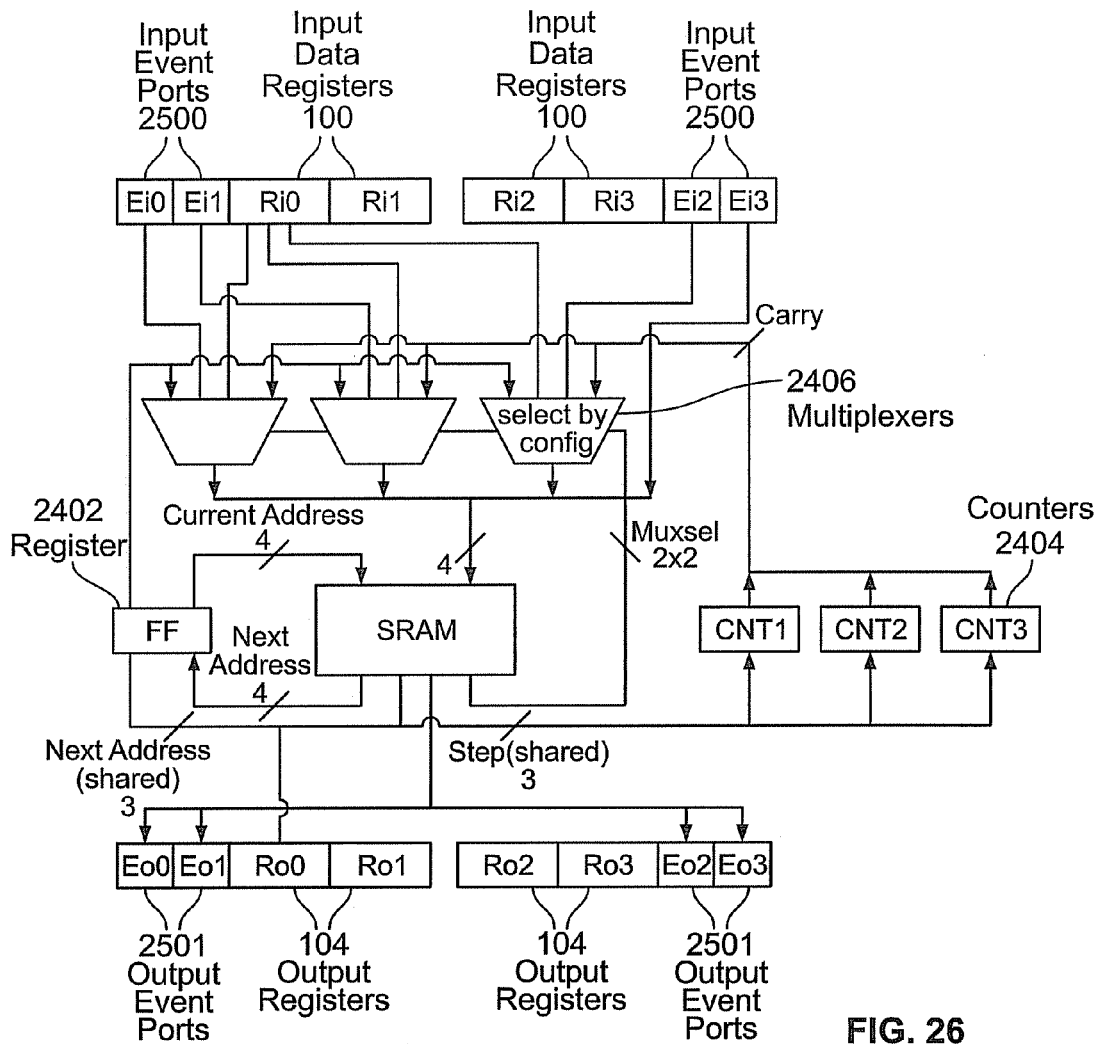
FIG. 26 shows another memory organization.

The proposed memory organisation is as follows:
8 address bits
16 data bits (16 used)
    4 next address
    4 multiplexer selectors
    3 counter control (shared with 3 additional next address)
    4 output
(See FIG. 26 Now)

It is to be noted that actually the RAM-PAEs typically will not be scaleable any more since the 16-bit implementation is different from the 24-bit implementation. It is to decide whether the striped down 16-bit implementation is used for 24-bit als.

1.6 IOAG Interface
1.6.1 Address Generators and Bit Reversal Addressing Implemented within the IO interfaces are address generators 2700 to support e.g. 1 to 3 dimensional addressing directly without any ALU-PAE resources. The address generation is then done by 3 counters; each of them has e.g. configurable base address, length and step width.

The first counter (CNT1) has a step input to be controlled by the array of ALU-PAEs. Its carry is connected to the step input of CNT2, which carry again is connected to the step input of CNT3.

Each counter generates carry if the value is equal to the configured length. Immediately with carry the counter is reset to its configured base address.

One input is dedicated for addresses from the array of ALU-PAEs which can be added to the values of the counters. If one or more counters are not used they are configured to be zero.

Figure 27:
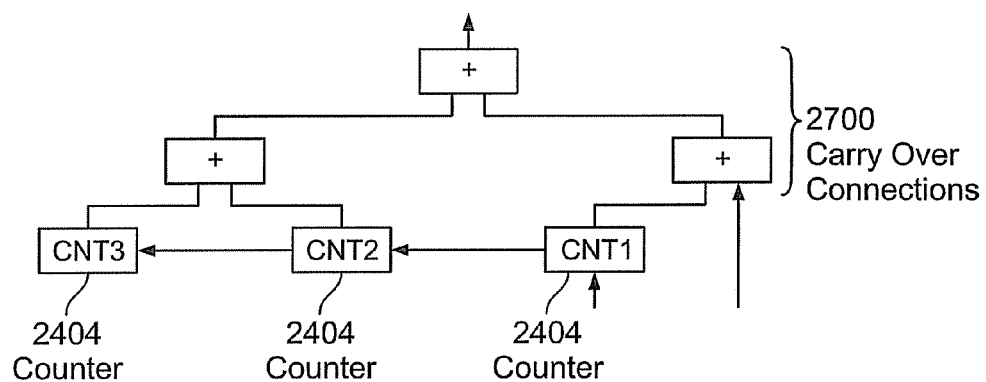
FIG. 27 shows address generators.

In addition CNT1 supports generation of bit reversal addressing by supplying multiple carry modes.
(See FIG. 27 Now)

1.6.2 Support for Different Word Width

In general it is necessary to support multiple word width within the PAE array. 8 and 16 bit wide data words are preferred for a lot of algorithms i.e. graphics. In addition to the already described SIMD operation, the IOAG allows the split and merge of such smaller data words.

Since the new PAE structure allows 4 input and 4 output ports, the IOAG can support word splitting and merging as follows:

| I/O 0 | I/O 1 | I/O 2 | I3 |
|---|---|---|---|
| 16/24/32-bit data word | | | address |
| 16-bit data word | 16-bit data word | | address |
| 8-bit data word | 8-bit data word | 8-bit data word | address |

Input ports are merged within the IOAG for word writes to the IO.

For output ports the read word is split according to the configured word width.

1.7 Multi-Voltage Power Supply and Frequency Stepping

PAEs and busses are built to perform depending on the workload. Therefore the clock frequency is configurable according to the data bandwidth, in addition clock gating for registers is supported, busses are decoupled using row of AND gates. Dynamically clock pulses are gated, whenever no data can be processed.

Depending on the clock frequency in the PAEs and the required bandwidth for the busses the voltage is scaled in an advanced architecture. Within the 4S project such methods are evaluated and commercially usable technologies are researched.

1.8 XPP/μP Coupling

For a closed coupling of a gP and a XPP a cache and register interface would be the preferable structure for high level tools like C-compilers. However such a close coupling is expected not to be doable in a very first step.

Yet, two different kind of couplings may be possible for a tight coupling:
a) memory coupling for large data streams: The most convenient method with the highest performance is a direct cache coupling, whereas an AMBA based memory coupling will be sufficient for the beginning (to be discussed with ATAIR)
b) register coupling for small data and irregular MAC operations: Preferable is a direct coupling into the processors registers with an implicit synchronisation in the OF-stage of the processor pipeline. However coupling via load/store- or in/out-commands as external registers is acceptable with the penalty of a higher latency which causes some performance limitation.

2 Specification of ALU-PAE

2.1 Overview

In a preferred embodiment, the ALU-PAE comprises 3 paths:
ALU arithmetic, logic and data flow handling
BP bypass
Then, each of the paths contains 2 data busses and 1 event bus. The busses of the DF path can be rerouted to the ALU path by configuration.

2.2 ALU Path Registers

The ALU path comprises 12 data registers:
Ri0-3 Input data register 0-3 from bus
Rv0-3 Virtual output data register 0-3 to bus
Rd0-3 Internal general purpose register 0-3
Vi0-3 V event input 0-3 from bus
Ui0-3 U event input 0-3 from bus
Ev0-3 Virtual V event output register 0-3 to bus
Eu0-3 Virtual U event output register 0-3 to bus
Fu0-3
Fv0-3 Internal Flag u and v registers according to the XPP-II PAE's event busses
Acc Accumulator
Eight instruction registers are implemented; each of them is 24 bit wide according to the opcode format.
Rc0-7 Instruction registers
Three special purpose registers are implemented:
Rlc Loop Counter, configured by CM, not accessible through ALU-PAE itself. Will be decremented according to JL opcode. Is reloaded after value 0 is reached.
Rjb Jump-Back register to define the number of used entries in Rc[0 . . . 7]. It is not accessible through ALU-PAE itself.
If Rpp is equal to Rjb, Rpp is immediately reset to 0. The jump back can be bound to a condition i.e. an incoming event. If the condition is missing, the jump back will be delayed.
Rpp Program pointer

2.3 Data Duplication and Multiple Input Reads

Since Function Folding can operate in a purely data stream mode as well as in a sequential mode (see 1.2) it is useful to support Ri reads in dataflow mode (single read only) and sequential mode (multiple read). The according protocols are described below:

Each input register Ri can be configured to work in one of two different modes:

Dataflow Mode

This is the standard protocol of the XPP-II implementation:

A data packet is taken read from the bus if the register is empty, an ACK handshake is generated. If the register is not empty ACK the data is not latched and ACK is not generated. If the register contains data, it can be read once. Immediately with the read access the register is marked as empty. An empty register cannot be read.

Simplified the protocol is defined as follows:

| RDY & empty | → full |
|---|---|
|  | → ACK |
| RDY & full | → notACK |
| READ & empty | → stall |
| READ & full | → read data |
|  | → empty |

Please note: pipeline effects are not taken into account in this description and protocol.

Sequencer Mode

The input interface is according to the bus protocol definition: A data packet is taken read from the bus if the register is empty, an ACK handshake is generated. If the register is not empty ACK the data is not latched and ACK is not generated.

If the register contains data it can be read multiple times during a sequence. A sequence is defined from Rpp=0 to Rpp=Rjb. During this time no new data can be written into the register. Simultaneously with the reset of Rpp to 0 the register content is cleared an new data is accepted from the bus.

Simplified the protocol is defined as follows:

| RDY & empty | → full |
|---|---|
|  | → ACK |
| RDY & full | → notACK |
| READ & empty | → stall |
| READ & full | → read data |
| (Rpp == Rjb) | → empty |

Please note: pipeline effects are not taken into account in this description and protocol.

2.4 Data Register and Event Handling

Data registers are directly addressed, each data register can be, individually selected. Three address opcode form is used, $r_1 \leftarrow r_{s1}, r_{s0}$. An virtual output register is selected by adding 'o' behind the register. The result will be stored in $r_t$ and copied to the virtual output register $r_v$ as well according to the rule op out $(r_v, r_t) \leftarrow r_{s1}, r_{s0}$.

Please note, accessing input and (virtual) output registers follow the rules defined in chapter 2.3.

| Source | $r_t$ | Notation |
|---|---|---|
| 000 | 0 | Rd0 |
| 001 | 1 | Rd1 |
| 010 | 2 | Rd2 |
| 011 | 3 | Rd3 |
| 100 | 0 | Ri0 |
| 101 | 1 | Ri1 |
| 110 | 2 | Ri2 |
| 111 | 3 | Ri3 |

| Target | $r_t$ | $r_v$ | Notation |
|---|---|---|---|
| 000 | 0 | — | Rd0 |
| 001 | 1 | — | Rd1 |
| 010 | 2 | — | Rd2 |
| 011 | 3 | — | Rd3 |
| 100 | 0 | 0 | Ro0 |
| 101 | 1 | 1 | Ro1 |
| 110 | 2 | 2 | Ro2 |
| 111 | 3 | 3 | Ro3 |

Events are used equal to data registers. All input and internal events can be addressed directly, output events are used whenever an 'o' is added behind the event.

| Etp | $ep_t$ | $ep_v$ | Notation |
|---|---|---|---|
| 000 | 0 | — | Fu0, Fv0 |
| 001 | 1 | — | Fu1, Fv1 |
| 010 | 2 | — | Fu2, Fv2 |
| 011 | 3 | — | Fu3, Fv3 |
| 100 | 0 | 0 | Eou0, Eov0 |
| 101 | 1 | 1 | Eou1, Eov1 |
| 110 | 2 | 2 | Eou2, Eov2 |
| 111 | 3 | 3 | Eou3, Eov3 |

| Es4/et4 | $e_t$ | $e_v$ | Notation |
|---|---|---|---|
| 0000 | 0 | — | v0 |
| 0001 | 1 | — | v1 |
| 0010 | 2 | — | v2 |
| 0011 | 3 | — | v3 |
| 0100 | 0 | 0 | vo0 |
| 0101 | 1 | 1 | vo1 |
| 0110 | 2 | 2 | vo2 |
| 0111 | 3 | 3 | vo3 |
| 1000 | 0 | — | u0 |
| 1001 | 1 | — | u1 |
| 1010 | 2 | — | u2 |
| 1011 | 3 | — | u3 |
| 1100 | 0 | 0 | uo0 |
| 1101 | 1 | 1 | uo1 |
| 1110 | 2 | 2 | uo2 |
| 1111 | 3 | 3 | uo3 |

2.4.1. ACCumulator Mode

To achieve low power consumption and for better supporting DSP-like algorithms an accumulator register is available which can be addressed by just one set bit for the result register (ao) and operand register (ai).

For commutative operations always operand register 1 is replaced by ai. For non commutative operations as SUBtract operand register 1 selects, whether ai is the first or second operand. register 2 defines the accordingly other operand.

It is to be noted that it has to be clarified whether a real ACCumulator mode makes sense or just a MAC-command should be implemented to handle the multiply accumulate in a single command consuming two clock cycles with an implicit hidden accumulator access.

2.4.2. Parameter Stack Mode (PSTACK)

Unused entries in the Opcode Registers Rc can operate as stack for constants and parameters. At Rpp==0000 the Rps PStack registers points to Rjb+1, which means the PStack area starts immediately behind the last entry in the Opcode register file.

To access the PStack, the FF-PAE must be in the Fast-Parameter Mode. Each read access to Ri3 is redirected to read from the PStack, whereas after each read access the pointer incremented with one. There is no check for an overflow of the PStack pointer implemented; an overflow is regarded as a program bug.
(See FIG. 28 Now)

2.4.3 n: 1 Transitions n:1 transitions are not supported within the busses any more. Alternatively simple writes to multiple output registers Ro and event outputs Eo are supported. The Virtual Output registers (Rv) and Virtual Event (Ev) are translated to real Output registers (Ro) and real Events (Eo), whereas a virtual register can be mapped to multiple output registers.

To achieve this a configurable translation table is implemented for both data registers and event registers:

|   | Rv | | | |
|---|-----|-----|-----|-----|
|   | Ro0 | Ro1 | Ro2 | Ro3 |
|   | Ev | | | |
|   | Eo0 | Eo1 | Eo2 | Eo3 |
| 0 | | | | |
| 1 | | | | |
| 2 | | | | |
| 3 | | | | |

EXAMPLE

Rv0 mapped to Ro0, Ro1
Rv1 mapped to Ro2
Rv2 mapped to Ro3
Rv3 unused

|   | Rv | | | |
|---|-----|-----|-----|-----|
|   | Ro0 | Ro1 | Ro2 | Ro3 |
| 0 | 1 | 1 | 0 | 0 |
| 1 | 0 | 0 | 1 | 0 |
| 2 | 0 | 0 | 0 | 1 |
| 3 | 0 | 0 | 0 | 0 |

2.4.4 Accessing Input and Output Registers (Ri/Rv) and Events (Ei/Ev)

Independently from the opcode accessing input or output registers or events is defined as follows:

Reading an Input Register:

| Register status | Operation |
|---|---|
| empty | Wait for data |
| full | Read data and continue operation |

Writing to an Output Register:

| Register status | Operation |
|---|---|
| empty | Write data to register |
| full | Wait until register is cleared and can accept new data |

2.4.5. Multi-Config Mode

The Multi-Config Mode allows for selecting 1 out of maximum 4 stored configurations. Incoming events on Fui0, 1 and Fvi0, 1 select one of the 4 configurations. Only one Event shall be active at a clock cycle.

The selection is done by a simple translation, each event points to a specific memory address.
(See FIG. 29 Now)

Long configurations may use more than 3 opcode by using the next code segments as well. In this case, the according events can not be used.
(See FIG. 30 Now)

2.5 Opcode Format 24 bit wide 3 address opcodes are used in a preferred embodiment:

$$opr_t \leftarrow r_a, r_b$$

Source registers can be Ri and Rd, target registers are Rv and Rd. A typical operation targets only Rd registers. If the source register for $r_a$ is Ri[x] the target register will be Rd[x]. The translation is shown is the following table:

| Target | Source $r_a$ |
|---|---|
| Rd0 | Rd0 |
| Rd1 | Rd1 |
| Rd2 | Rd2 |
| Rd3 | Rd3 |
| Rd0 | Ri0 |
| Rd1 | Ri1 |
| Rd2 | Ri2 |
| Rd3 | Ri3 |

Each operation can target a Virtual Output Register Rv by adding an out tag 'o' as a target identifier to the opcode:

$$op(r_t, ro_t) \leftarrow r_a, r_b$$

Data is transferred to the virtual output register and to the according internal register as well:

| Rv | Rd |
|---|---|
| Rv0 | Rd0 |
| Rv1 | Rd1 |
| Rv2 | Rd2 |
| Rv3 | Rd3 |

2.5.1 Conditional Execution

The SKIPE command supports conditional execution. Either an event or ALU flag is tested for a specific value. Depending on the check either the next two addresses are executed (Rpp+1) or skipped (Rpp+3). If an incoming event is checked, the program execution stops until the event is arrived at the event port (RDY handshake set).

SKIPE supports conditional execution of any OpCode which is not larger than two memory entries.

In SEQ-PAEs, which support CALL and RET OpCodes, also stack based subroutine calls are supported.

2.6 Clock

The PAE can operate at a configurable clock frequency of
- 1× Bus Clock
- 2× Bus Clock
- 4× Bus Clock
- [8× Bus Clock]

2.7 The DF Path

The DataFlow path comprises the data registers Bri0 . . . 3 and Bro0 . . . 3 as well as the event register Bui/Bvi0 . . . 3 and Buo/Bvo0 . . . 3.

The main purpose of the DF path is to establish bus connections in the vertical direction. In addition the path includes a 4 stage FIFO for each of the data and event paths.

The DF path supports numerous instructions, whereas the instruction is selected by configuration and only one of them can be performed during a configuration, function folding is not available.

The following instructions are implemented in the DF path:
1. ADD, SUB
2. NOT, AND, OR, XOR
3. SHL, SHR, DSHL, DSHR, DSHRU
4. EQ, CMP, CMPU
5. MERGE, DEMUX, SWAP
6. SORT, SORTU
7. ELUT

2.9 Parameter Broadcast and Update

Figure 31:
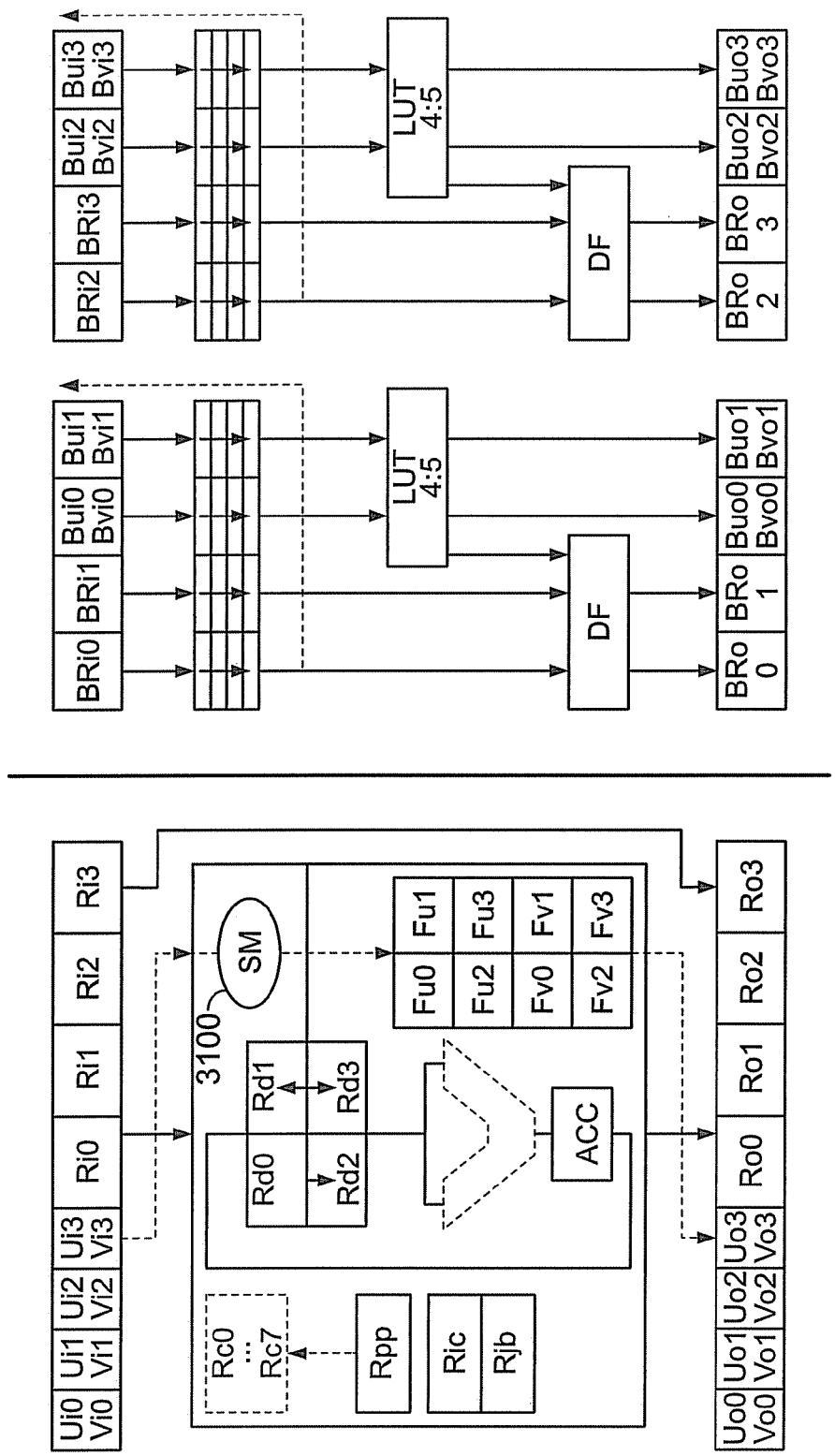
FIG. 31 shows parameter broadcast and update.

Parameters and constants can be updated fast and synchronous using input register Ri3 and event input Ei7.
(See FIG. 31 Now)

Depending on the update mode, data packets at the input register Ri3 are copied subsequently into Rd3, Rd2 and Rd1 at each access of the according register by the PAE, if the event Ei7 is set. Afterwards all input data at Ri3 is propagated to the output register Ro3, also the Eo7 event output is set, to indicate following PAEs the occurrence of a fast parameter update, which allows to chain PAEs, together (i.e. in a multi-TAP FIR filter) and updating all parameters in the chain.

| Register access | Ei7 | UPM1 Upmcfg = 0100 | UPM2 upmcfg = 1000 | UPM3 upmcfg = 1100 |
|---|---|---|---|---|
| — | 0 | — | — | — |
| read Rd3 | 1 | Ri3 -> Rd3 | Ri3 -> Rd3 | Ri3 -> Rd3 |
| read Rd2 | 1 | Ri3 -> Ro3<br>1 -> Eo7 | Ri3 -> Rd2 | Ri3 -> Rd2 |
| read Rd1 | 1 | Ri3 -> Ro3<br>1 -> Eo7 | Ri3 -> Ro3<br>1 -> Eo7 | Ri3 -> Rd1 |
| — | 1 | Ri3 -> Ro3<br>1 -> Eo7 | Ri3 -> Ro3<br>1 -> Eo7 | Ri3 -> Ro3<br>1 -> Eo7 |

Also the OpCode UPDATE updates all registers subsequently if Ei7 is set, depending on the Update Parameter Mode (upmcfg=nn10).

Also the register update can be configured to occur whenever Rpp==0 and Ei7 is set by upmcfg=nn01.

In both cases nn indicates the number of registers to be updated (1-3).

Ei7 must be 0 for at least one clock cycle to indicate the end of a running parameter update and the start of a new update.

3 Input Output Address Generators (IOAG)

The IOAGs are located in the RAM-PAEs and share the same registers to the busses. An IOAG comprises 3 counters with forwarded carries. The values of the counters and an immediate address input from the array are added to generate the address. One counter offers reverse carry capabilities.

3.1 Addressing Modes

Several addressing modes are supported by the IOAG to support typical DSP-like addressing:

| Mode | Description |
|---|---|
| Immediate | Address generated by the PAE array |
| xD counting | Multidimensional addressing using IOAG internal counters xD means 1D, 2D, 3D |
| xD circular | Multidimensional addressing using IOAG internal counters, after overflow counters-reload with base address |
| xD plus immediate | xD plus a value from the PAE array |
| Stack | decrement after "push" operations<br>increment after "read" operations |
| Reverse carry | Reverse carry for applications such as FFT |

3.1.1 Immediate Addressing

The address is generated in the array and directly fed through the adder to the address output. All counters are disabled and set to 0.

3.1.2 xD Counting

Counters are enabled depending on the required dimension (x-dimensions require x counters). For each counter a base address and the step width as well as the maximum address are configured. Each carry is forwarded to the next higher and enabled counter; after carry the counter is reloaded with the start address.

A carry at the highest enabled counter generates an event, counting stops.

3.1.3 xD Circular

The operation is exactly the same as for xD counting, with the difference that a carry at the highest enabled counter generates an event, all counters are reloaded to their base address and continue counting.

3.1.4 Stack

One counter (CNT1) is used to decrement after data writes and increment after data reads. The base value of the counter can either be configured (base address) or loaded by the PAE array.

3.1.5 Reverse Carry

Typically carry is forwarded from LSB to MSB. Forwarding the carry to the opposite direction (reverse carry) allows generating address patterns which are very well suited for applications like FFT and the like. The carry is discarded at MSB.

For using reverse carry a value larger than LSB must be added to the actual value to count, wherefore the STEP register is used.

Example:
Base=0h
Step=1000b

| Step | Counter Value |
|---|---|
| 1 | B0 . . . 00000 |
| 2 | B0 . . . 01000 |
| 3 | B0 . . . 00100 |
| 4 | B0 . . . 01100 |
| 5 | B0 . . . 00010 |
| . . . | . . . |
| 16 | B0 . . . 01111 |
| 17 | B0 . . . 00000 |

The counter is implemented to allow reverse carry at least for STEP values of −2, −1, +1, +2.

4. ALU/RAM Sequencers

SEQ-PAEs

Each ALU-PAE at the left or right edge of the array can be closely coupled to the neighbouring RAM-PAEs as an IP option, thus allowing for configure a sequencer. For compatibility reasons, the data and opcode width of the sequencer is 16 bits.
(See FIG. 19 Now)

The ALU-PAEs can operate exactly as array internal ALU-PAEs but have several extensions. Operation is Sequencer mode the register file is 8 data registers wide, Fu and Fv flags are, used as carry, sign, null, overflow and parity ALU flag word 112.

| Event Registers FF-Mode | Processor Registers SEQ-Mode |
|---|---|
| Fu0 | carry |
| Fu1 | sign |
| Fu2 | null |
| Fu3 | overflow |
| Fv0 | parity |

The address width is accordingly 16 bit. However since the RAM-PAE size is limited it is segmented into 16 segments. Those segments are used for code, data and stack 3300 and must be individually preloaded by the compiler.
4 segment registers point to the specific segments:

| CodeBank | Points to the actual code segment |
|---|---|
| DataBank | Points to the actual data segment |
| StackBank | Points to the actual stack segment |
| AuxiliaryBank | Points to any Segment (but code), allowing copy operations between segments |

Figure 32:
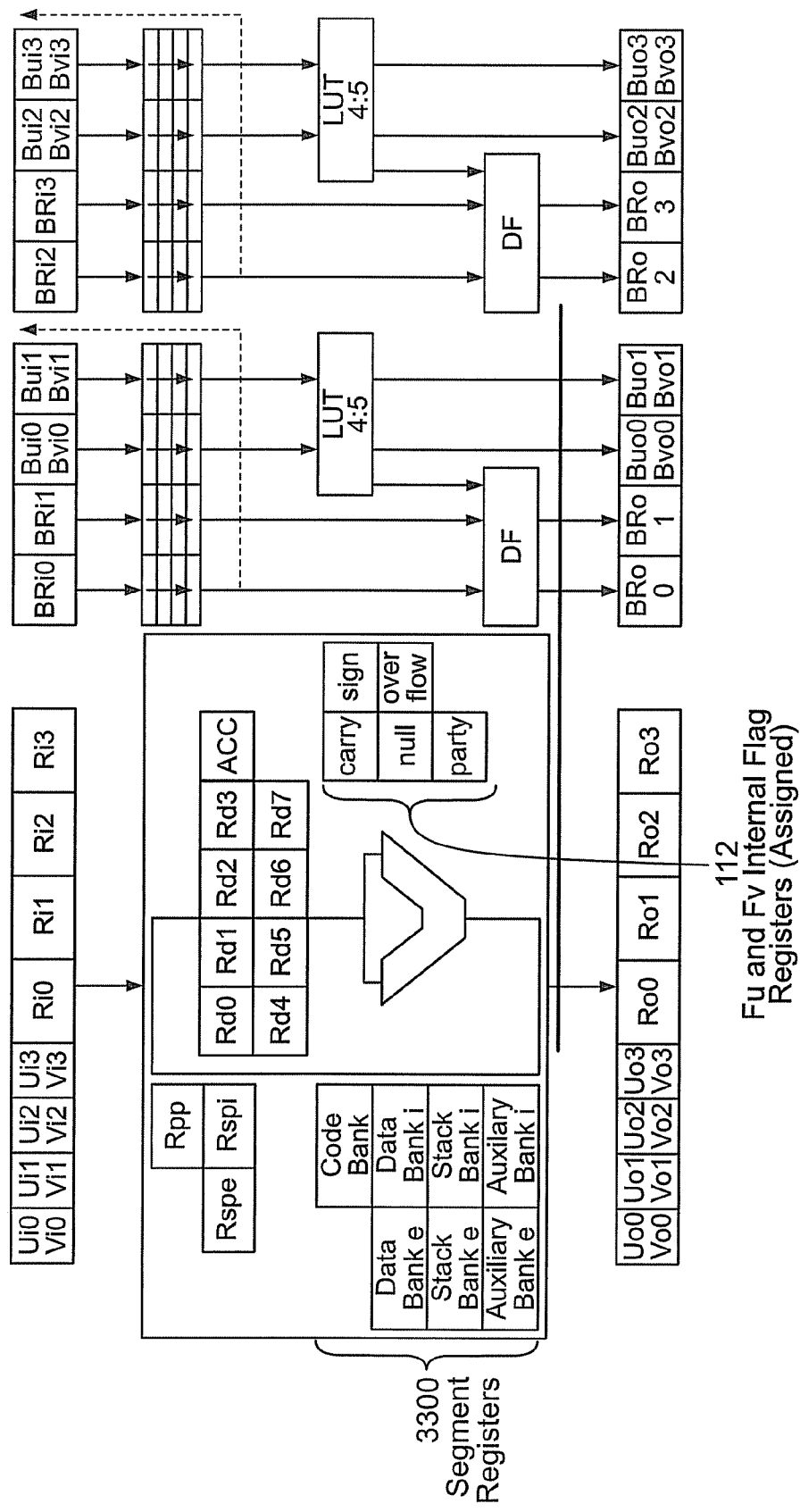
FIG. 32 shows code bank, data bank, stack bank, and auxiliary bank.

(See FIG. 32 Now)

The compiler has to take care that necessary data segments are preloaded and available. For cost reasons there is no automatic TLB installed.

Also segments have to be physically direct addressed due to the absence of TLBs. This means that the compiler has to implement range checking functions for according addresses.

Code segments behave accordingly to data segments. The compiler has to preload them before execution jumps into them. Also jumps are physically direct addressed, due to the absence of TLBs again.

A relocation of any segments is not possible; the mapping is fixed by the compiler.

Figure 33:
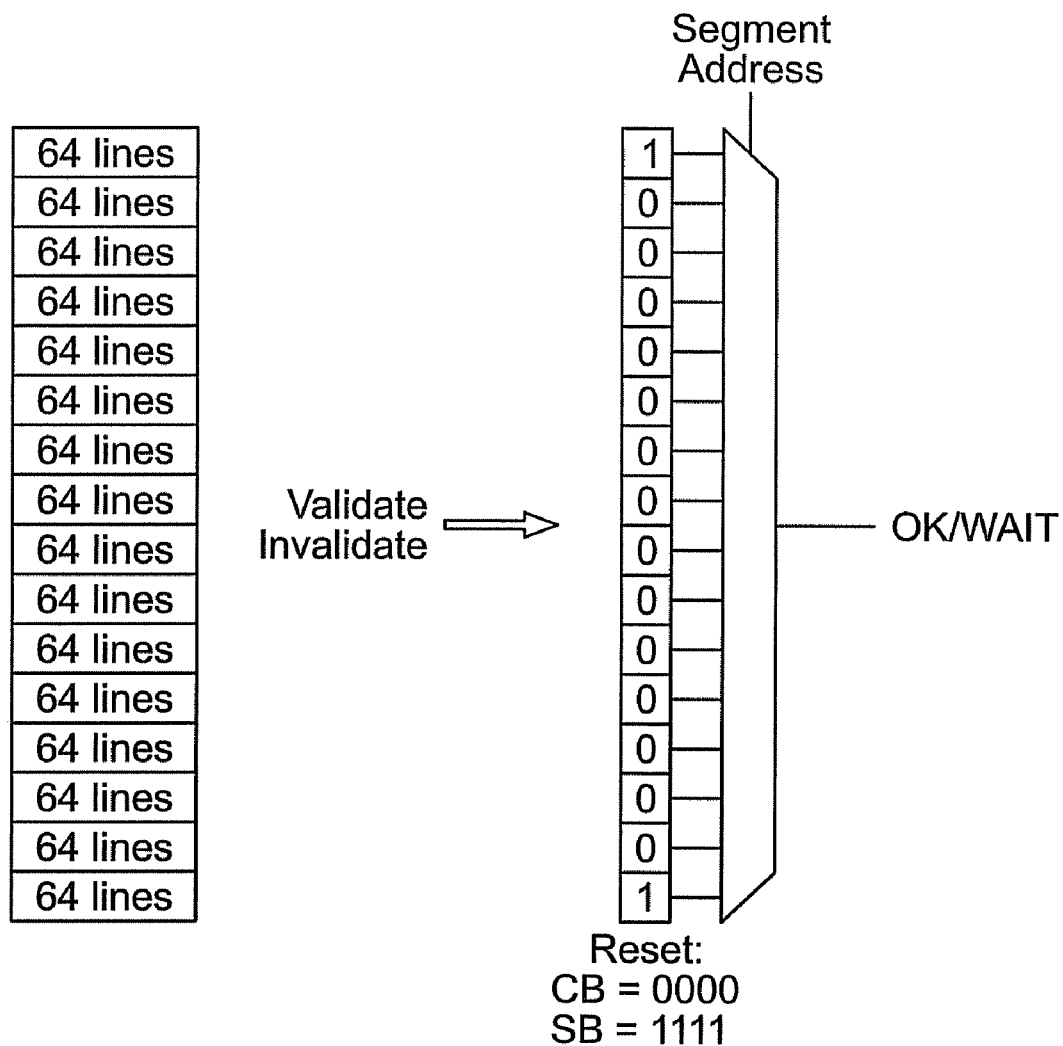
FIG. 33 shows the memory layout.

The memory layout is shown in FIG. 33 now. A simple check mechanism is implemented to validate or invalidate memory segments.

At least the CodeBank (CB) and StackBank (SB) must be set. The first CodeBank must start at location 0000h. For all other banks 0000h is an illegal entry. Loading segments to the memory validates them, accordingly flushing invalidates them.

Memory banks 3500 are updates in terms of loaded or flushed in the background by a DMA engine controlled by the following opcodes

| LOADDSEG | Loads and validates a data/auxiliary/stack bank |
|---|---|
| STOREDSEG | Stores and invalidates a data/auxiliary/stack bank |
| LOADCSEG | Loads and validates a code bank |

The address generators 3502 in the IOAG interfaces can be reused as DMA engine.

Memory banks can be specifically validated or invalidated as follows:

| VALIDATESSEG | Validates a bank |
|---|---|
| INVALIDATESEG | Invalidates a bank |

The bank pointers are added to the address of any memory access. Since the address pointer can be larger than the 6 bits addressing a 64 line range, segment boarders are not "sharp", which means, can be crossed without any limitation. However the programmer or compiler has to take care that no damage occurs while crossing them. If an invalid segment is reached a flag or trap is generated indicating the fault, eventually just wait states are inserted if a segment preload is running already in the background.

Figure 34:
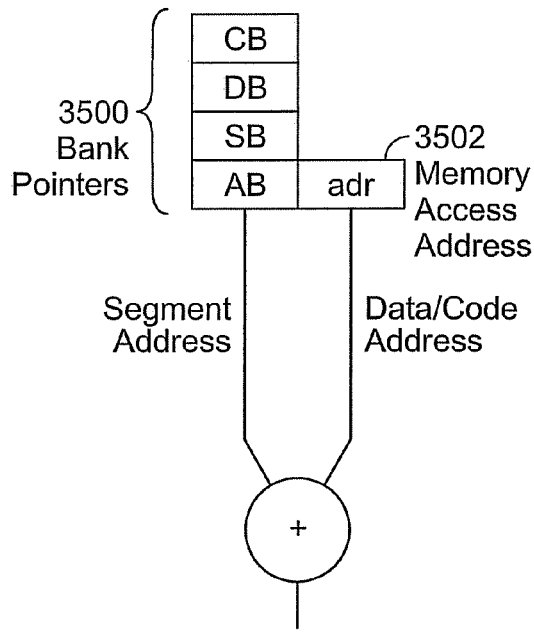
FIG. 34 shows the memory layout.

(See FIG. 34 Now)

Figure 35:
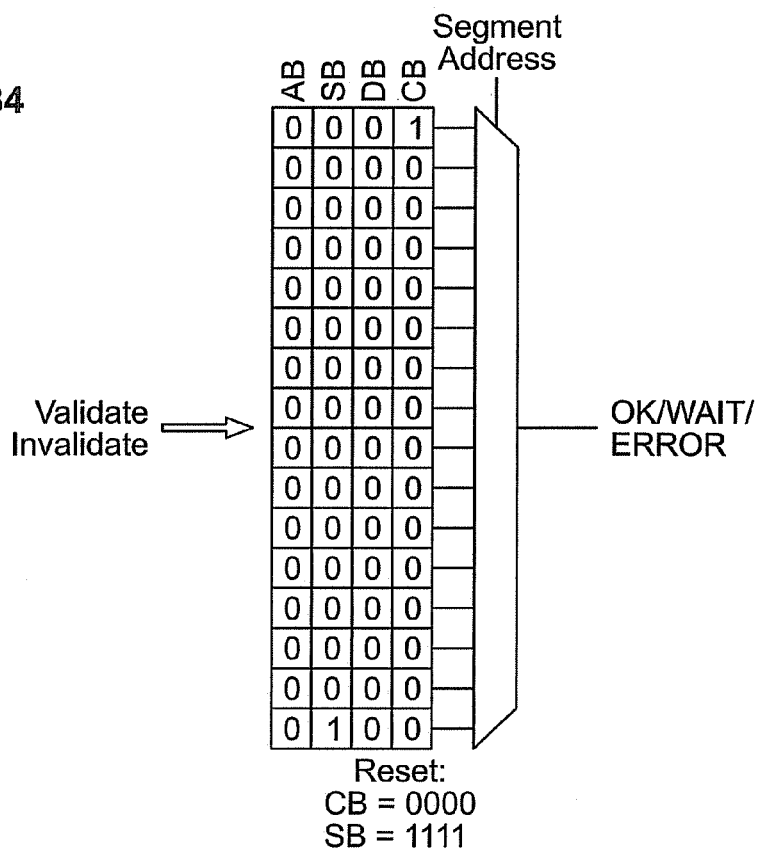
FIG. 35 shows an advanced valid checking scheme.
Figure 36:
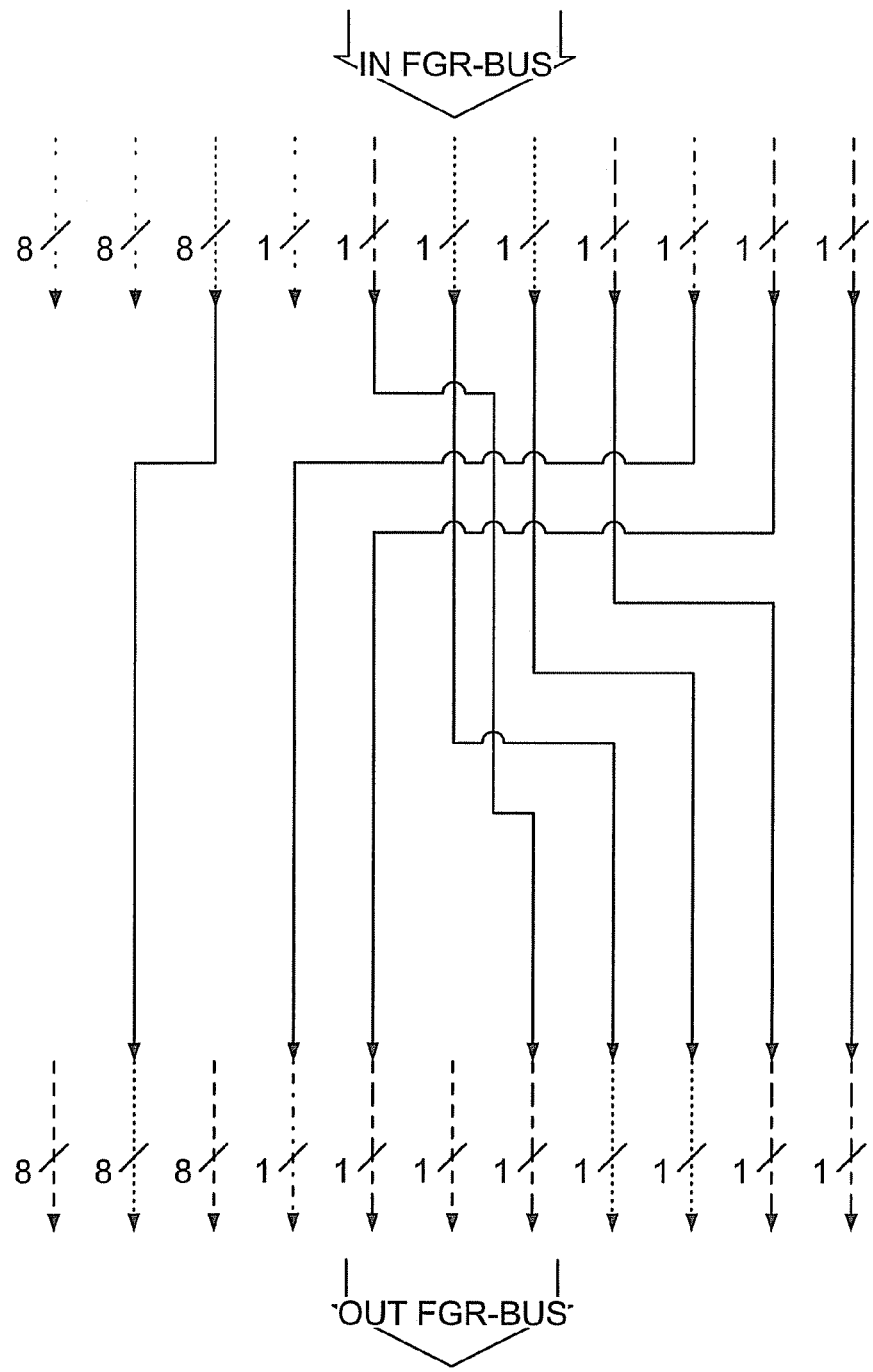
FIGS. 36 to 44 show an improved way of routing.
Figure 37:
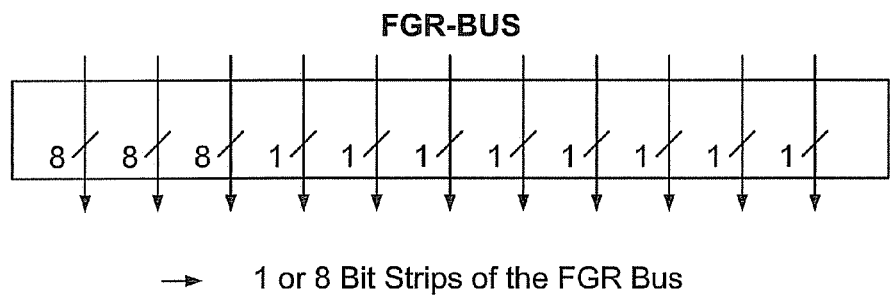
Figure 38:
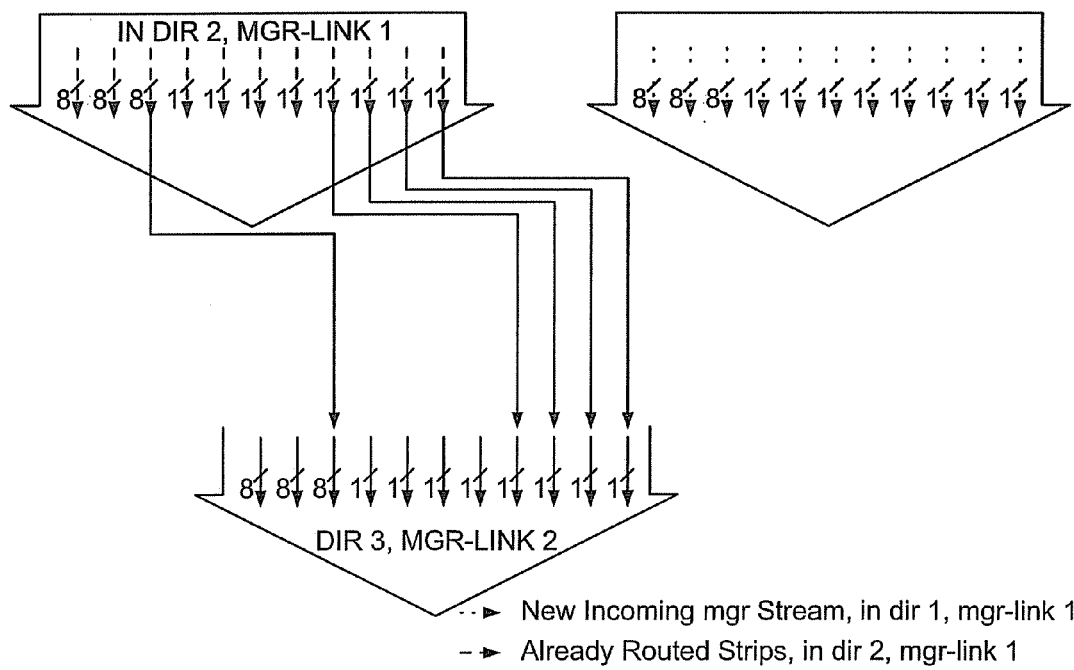
Figure 39:
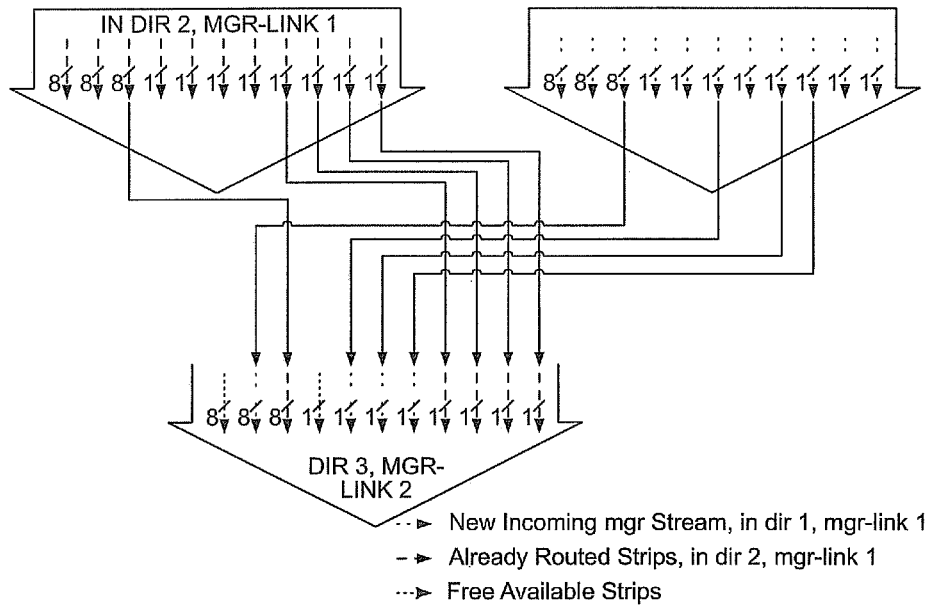
Figure 40:
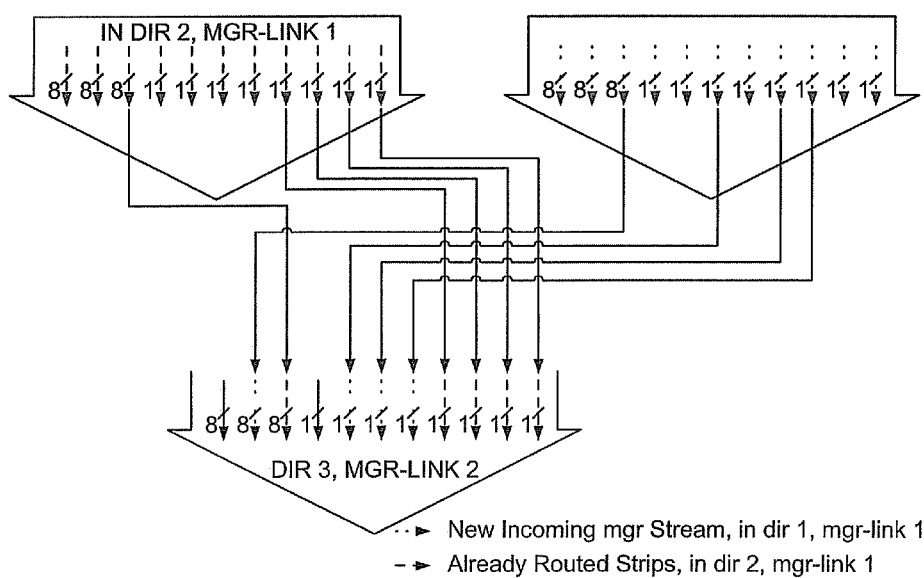
Figure 41:
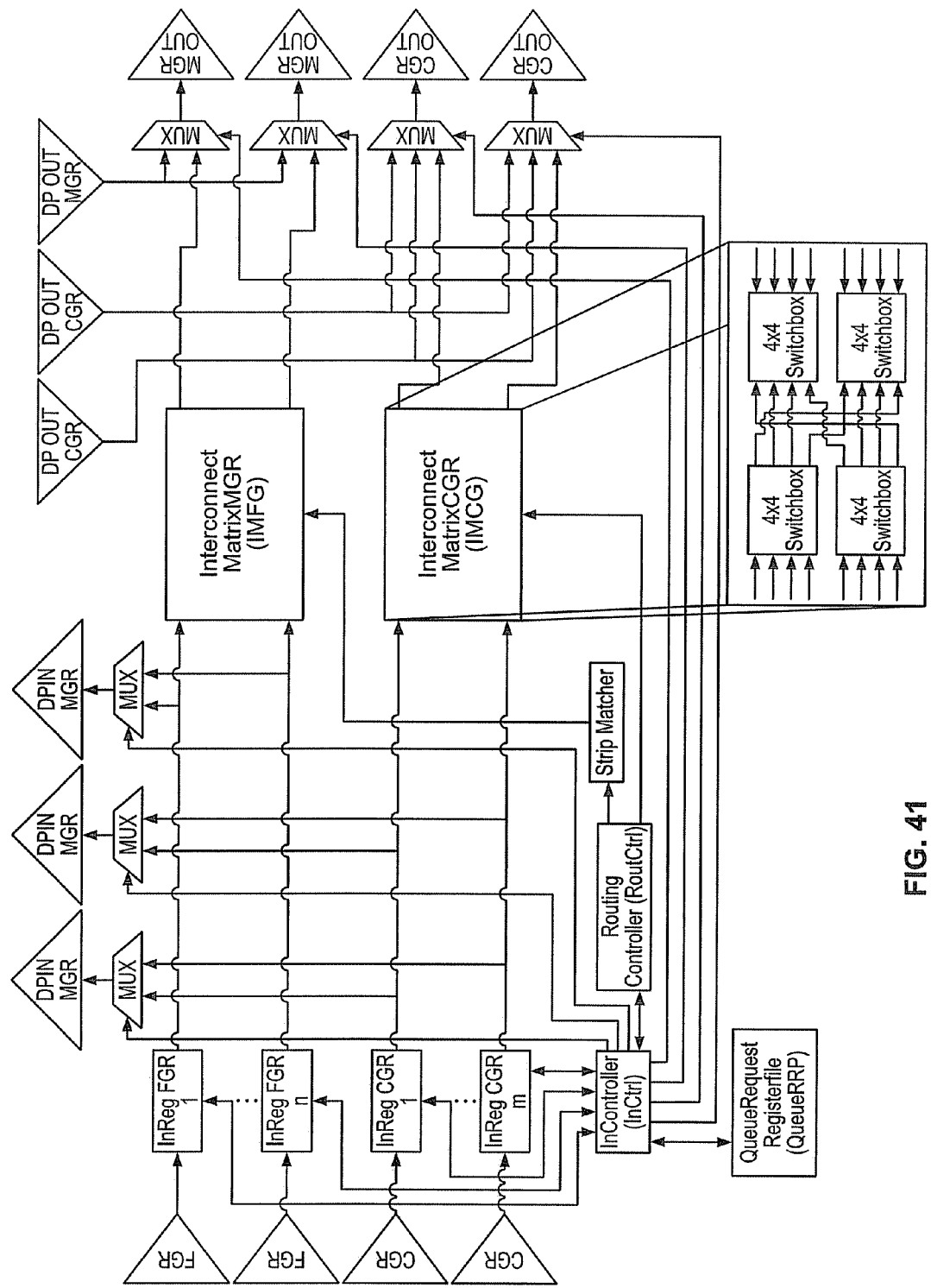
Figure 42:
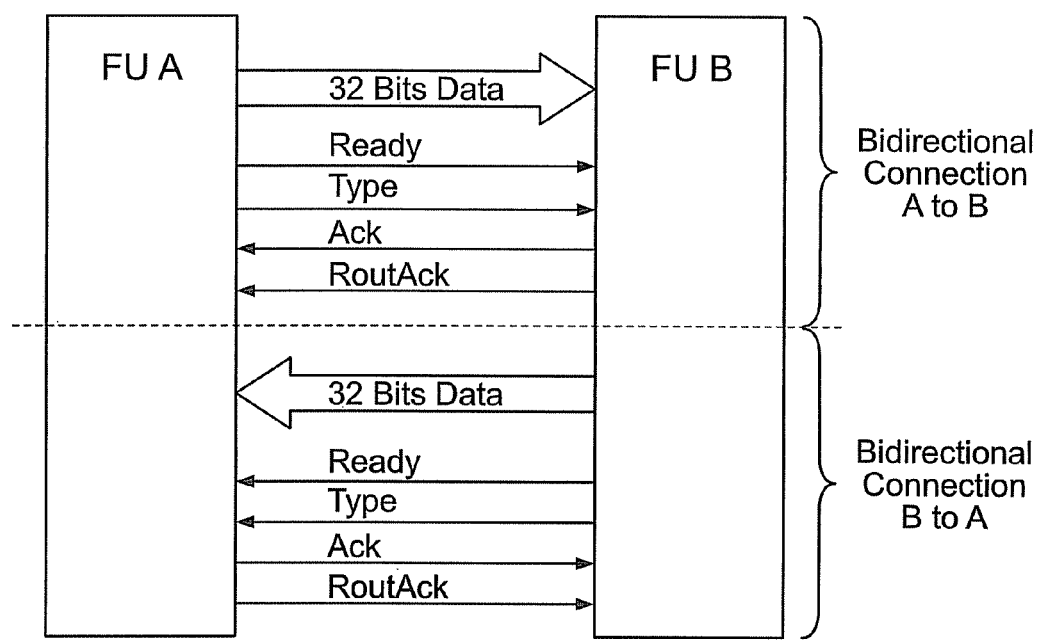
Figure 43:
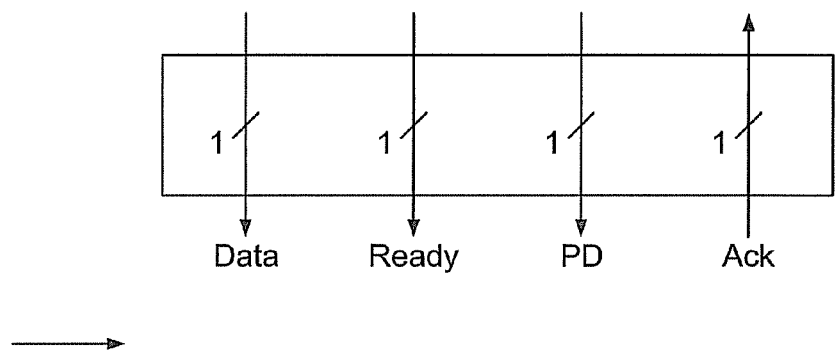
Figure 44:
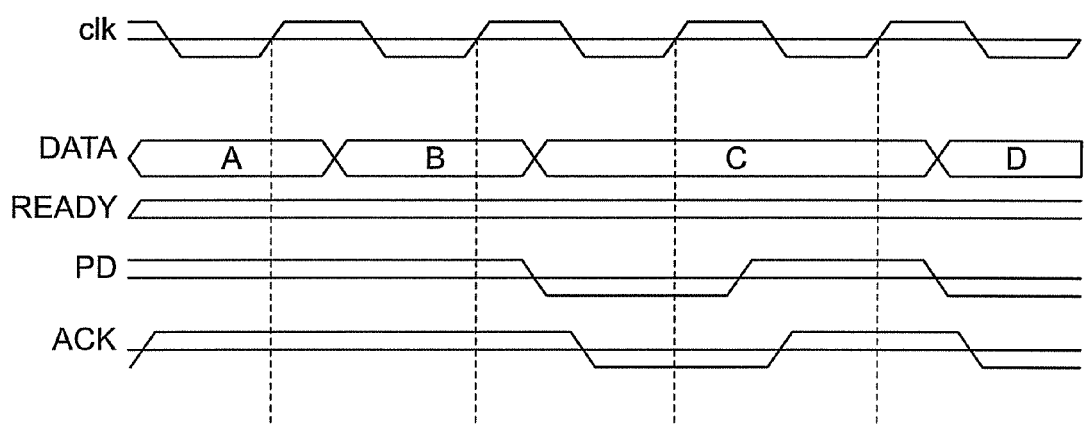

Alternatively a more advanced valid checking scheme can be implemented as shown in FIG. 35 now.

In difference to PAEs which require 24-bit instructions sequencers use 16-bit instructions only. To use the same instruction set and to keep the decoders simple, just the last 8 bits are discarded in sequencer mode.

4.1 IOAGs

IOAGs may comprise a 4-8 stage data output buffer to balance external latency and allow reading the same data address directly after the data has been written, regardless of external bus or memory latencies (up to the number of buffer stages).

In the following, a number of OpCodes and their meanings is suggested:

ADD

ADD

Description:

Add rs1 and rs2.

Action:

| Input I1 = | |
|---|---|
| rs1 | |
| 0nn | Rd[nn] |
| 1nn | Ri[nn] |
| Input I2 = | |
| rs2 | |
| 0nn | Rd[nn] |
| 1nn | Ri[nn] |
| Output O = | |
| rt | |
| 0nn | Rd[nn] |
| 1nn | Ro[nn] |
| Event output Eo = | |
| et4 | |
| 0nnn | F[nnn], F[nnn] |

-continued

| | |
|---|---|
| 1nnn | Eo[nnn], Eo[nnn] |

I1, I2 -> O
Rpp++
rs: source register
rt: target register
et4: target event

Input Registers:
Ri/Rd
Output Registers:
Rd/Ro
Input Flags:
F, Ei
Output Flags:

| Mode | |
|---|---|
| SEQ | carry, sign, null, parity |
| FF | carry -> Fu/Euo |

ADDC
ADD with Carry
Description:
Add rs1 and rs2 with Carry.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Event Input E = | |
|---|---|
| es4 | |
| 0nnn | F[nnn] |
| 1nnn | Ei[nnn] |

| Output O = | |
|---|---|
| rt | |
| 0nn | Rd[nn] |
| 1nn | Ro[nn] |

| Event output Eo = | |
|---|---|
| etp | |
| 0nn | Fu[nn], Fv[nn] |
| 1nn | Euo[nn], Evo[nn] |

I1, I2 -> O
Rpp++
rs: source register
rt: target register
es4: source event
etp: target event pair Input Registers:
Ri/Rd
Output Registers:
Rd/Ro
Input Flags:
F, Ei
Output Flags:

| Mode | |
|---|---|
| SEQ | carry, sign, null, parity, overflow |
| FF | carry -> Fu/Euo, overflow -> Fv/Evo |

AND
Logical AND
Description:
Logical AND operation
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rt | |
| 0nn | Rd[nn] |
| 1nn | Ro[nn] |

| Event output Eo = | |
|---|---|
| et4 | |
| 0nnn | F[nnn], F[nnn] |
| 1nnn | Eo[nnn], Eo[nnn] |

I1, I2 -> O
Rpp++
rs: source register
rt: target register

Input Registers:
Ri/Rd
Output Registers:
Rd/Ro
Input Flags:
-
Output Flags:

| Mode | |
|---|---|
| SEQ | zero, sign, parity |
| FF | zero, sign -> F/Eo |

BSHL
Barrel SHift Left

Description:
   Shift rs1 left by rs2 positions and fill with zeros.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rtp | |
| 0n | Rd[(n * 2)], Rd[(n * 2) + 1] |
| 1n | Ro[(n * 2)], Ro[(n * 2) + 1] |

I1, I2 -> O
Rpp++
rs: source register
rtp: target register pair

Input Registers:
Ri/Rd
Output Registers:
Rd/Ro
Input Flags:
-
Output Flags:
-

BSHR
Barrel SHift Right
Description:
   Shift rs1 right by rs2 positions, sign bit is duplicated.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rtp | |
| 0n | Rd[(n * 2)], Rd[(n * 2) + 1] |
| 1n | Ro[(n * 2)], Ro[(n * 2) + 1] |

I1, I2 -> O
Rpp++
rs: source register
rtp: target register pair

Input Registers:
Ri/Rd
Output Registers:
Rd/Ro
Input Flags:
-
Output Flags:
-

BSHRU
Barrel SHift Right Unsigned
Description:
   Shift rs1 right by rs2 positions and fill with zeros.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rtp | |
| 0n | Rd[(n * 2)], Rd[(n * 2) + 1] |
| 1n | Ro[(n * 2)], Ro[(n * 2) + 1] |

I1, I2 -> O
Rpp++
rs: source register
rtp: target register pair

Input Registers:
Ri/Rd
Output Registers:
Rd/Ro
Input Flags:
-
Output Flags:
-

CLZ
Count Leading Zeros
Description:
   Count the amount of leading zeros if the number is positive, accordingly, count the amount of leading ones if the number is negative.
Action:

| Input I1 = | |
|---|---|
| rs1 | |
| 0nn | Rd[nn] |
| 1nn | Ri[nn] |

-continued

| Output O = | |
|---|---|
| rt | |
| 0nn | Rd[nn] |
| 1nn | Ro[nn] |

| Event output Eo = | |
|---|---|
| etp | |
| 0nn | Fu[nn], Fv[nn] |
| 1nn | Euo[nn], Evo[nn] |

I1 -> O
Rpp++
rs: source register
rt: target register
etp: target event pair

Input Registers:
Ri/Rd
Output Registers:
Rd/Ro
Input Flags:
-
Output Flags:
-

| Mode | |
|---|---|
| SEQ | sign, parity, zero |
| FF | sign, zero -> F/Eo |

CLZU
Count Leading Zeros Unsigned
Description:
    Count the amount of leading zeros of an unsigned number.
Action:

| Input I1 = | |
|---|---|
| rs1 | |
| 0nn | Rd[nn] |
| 1nn | Ri[nn] |

| Output O = | |
|---|---|
| rt | |
| 0nn | Rd[nn] |
| 1nn | Ro[nn] |

| Event output Eo = | |
|---|---|
| et4 | |
| 0nnn | F[nnn] |
| 1nnm | Eo[nnn] |

I1 -> O
Rpp++
rs: source register
rt: target register
et4: target event

Input Registers:
Ri/Rd
Output Registers:
Rd/Ro
Input Flags:
-
Output Flags:
-

| Mode | |
|---|---|
| SEQ | sign, parity, zero |
| FF | zero -> F/Eo |

CMP
CoMPare
Description:
Compare Two Values
Action:

| Input I1 = | |
|---|---|
| rs1 | |
| 0nn | Rd[nn] |
| 1nn | Ri[nn] |

| Input I2 = | |
|---|---|
| rrs2 | |
| 0nn | Rd[nn] |
| 1nn | Ri[nn] |

| Event output Eo = | |
|---|---|
| retp | |
| 0nn | Fu[nn], Fv[nn] |
| 1nn | Euo[nn], Evo[nn] |

Rpp++
rs: source register
etp: target event pair

Input Registers:
Ri/Rd
Output Registers:
-
Input Flags:
-
Output Flags:
-

| Mode | |
|---|---|
| SEQ | sign, zero |
| FF | sign, zero -> F/Eo |

CMPU
CoMPare Unsigned
Description:
    Compare two unsigned values.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Event output Eo = | |
|---|---|
| etp | |
| 0nn | Fu[nn], Fv[nn] |
| 1nn | Euo[nn], Evo[nn] |

Rpp++
rs: source register
etp: target event pair

Input Registers:
Ri/Rd
Output Registers:
-
Input Flags:
-
Output Flags:

| Mode | |
|---|---|
| SEQ | sign, zero |
| FF | sign, zero -> F/Eo |

DEMUX FF
DEMUltipleX data stream
Description:
　Moves input to one of two outputs, depending on flag.
Action:

| Input I = | |
|---|---|
| rs | |
| 0nn | Rd[nn] |
| 1nn | Ri[nn] |

| Output O1 = | |
|---|---|
| rt1 | |
| 0nn | Rd[nn] |
| 1nn | Ro[nn] |

| Output O2 = | |
|---|---|
| rt2 | |
| 0nn | Rd[nn] |
| 1nn | Ro[nn] |

| Event E = | |
|---|---|
| es4 | |
| 0nnn | F[nnn] |
| 1nnn | Ei[nnn] |

| E | |
|---|---|
| 0 | O1 = I |
| 1 | O2 = I |

Rpp++
rt: target register
rs: source register
es4: source event

Input Registers:
Ri/Rd
Output Registers:
Rd/Ro, Rd/Ro
Input Flags:
Ei/F
Output Flags:
-

DIV SEO
DIVide
Description:
　Divide rs1 by rs2. Result in rtp, reminder in rtp+1.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rtp | |
| 0n | Rd[(n * 2)], Rd[(n * 2) + 1] |
| 1n | Ro[(n * 2)], Ro[(n * 2) + 1] |

I1, I2 -> O
Rpp++
rs: source register
rtp: target register pair

Input Registers:
Ri/Rd
Output Registers:
Rd/Ro
Input Flags:
-
Output Flags:
-

DIVU SEO
DIVide Unsigned
Description:
　Divide unsigned rs1 by rs2. Result in rtp, reminder in rtp+1.
Action:

| Input I1 = | |
|---|---|
| rs1 | |
| 0nn | Rd[nn] |
| 1nn | Ri[nn] |

-continued

| Input I2 = | |
|---|---|
| rs2 | |
| 0nn | Rd[nn] |
| 1nn | Ri[nn] |

| Output O = | |
|---|---|
| rtp | |
| 0n | Rd[(n * 2)], Rd[(n * 2) + 1] |
| 1n | Ro[(n * 2)], Ro[(n * 2) + 1] |

I1, I2 -> O
Rpp++
rs: source register
rtp: target register pair

Input Registers:
Ri/Rd
Output Registers:
Rd/Ro
Input Flags:
-
Output Flags:
-

DSHL
Double SHift Left
Description:
  Shift rs1 and rs2 left. LSB is filled with event.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Event Input E = | |
|---|---|
| es4 | |
| 0nnn | F[nnn] |
| 1nnn | Ei[nnn] |

| Output O = | |
|---|---|
| rtp | |
| 0n | Rd[(n * 2)], Rd[(n * 2) + 1] |
| 1n | Ro[(n * 2)], Ro[(n * 2) + 1] |

| Event output Eo = | |
|---|---|
| etp | |
| 0nn | Fu[nn], Fv[nn] |
| 1nn | Euo[nn], Evo[nn] |

I1, I2 -> O
Rpp++
rs: source register
rtp: target register pair
etp: target event pair Input Registers:
Ri/Rd
Output Registers:
Rd/Ro
Input Flags:
F, Ei
Output Flags:

| Mode | |
|---|---|
| SEQ | MSB(rs1) -> carry, MSB(rs2) -> sign |
| FF | MSB(rs1) -> Fu/Euo, MSB(rs2) -> Fv/Evo |

DSHR
Double SHift Right
Description:
  Shift rs1 and rs2 right, sign bit is duplicated.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rtp | |
| 0n | Rd[(n * 2)], Rd[(n * 2) + 1] |
| 1n | Ro[(n * 2)], Ro[(n * 2) + 1] |

| Event output Eo = | |
|---|---|
| etp | |
| 0nn | Fu[nn], Fv[nn] |
| 1nn | Euo[nn], Evo[nn] |

I1, I2 -> O
Rpp++
rs: source register
rtp: target register pair
etp: target event pair Input Registers:
Ri/Rd
Output Registers:
Rd/Ro
Input Flags:
Ei, F Output Flags:

| Mode | |
|---|---|
| SEQ | LSB(rs1) -> carry, LSB(rs2) -> sign |
| FF | LSB(rs1) -> Fu/Euo, LSB(rs2) -> Fv/Evo |

DSHRU
Double SHift Right Unsigned
Description:
 Shift rs1 and rs2 right and fill with event.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Event Input E = | |
|---|---|
| es4 | |
| 0nnn | F[nnn] |
| 1nnn | Ei[nnn] |

| Output O = | |
|---|---|
| rtp | |
| 0n | Rd[(n * 2)], Rd[(n * 2) + 1] |
| 1n | Ro[(n * 2)], Ro[(n * 2) + 1] |

| Event output Eo = | |
|---|---|
| etp | |
| 0nn | Fu[nn], Fv[nn] |
| 1nn | Euo[nn], Evo[nn] |

I1, I2 -> O
Rpp++
rs: source register
rtp: target register pair
etp: target event pair Input Registers:
Ri/Rd
Output Registers:
Rd/Ro
Input Flags:
Ei, F
Output Flags:

| Mode | |
|---|---|
| SEQ | LSB(rs1) -> carry, LSB(rs2) -> sign |
| FF | LSB(rs1) -> Fu/Euo, LSB(rs2) -> Fv/Evo |

EQ
EQual
Description:
 Check whether two values are equal.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Event output Eo = | |
|---|---|
| et4 | |
| 0nnn | F[nnn] |
| 1nnn | Eo[nnn] |

Rpp++
rs: source register
et4: target event

Input Registers:
Ri/Rd
Output Registers:
-
Input Flags:
-
Output Flags:

| Mode | |
|---|---|
| SEQ | zero |
| FF | zero -> F/Eo |

JMP SEO
JuMP immediate
Description:
 Jump to address defined by immediate constant. CodeBank is changed according to constant.
Action:
const[0 . . . 3]->CodeBank
const[4 . . . 15]->Rpp
Input Registers:
-
Output Registers:
-
Input Flags:
-
Output Flags:
-

JRI SEO
Jump Relative Immediate
Description:
 Jump relative to Rpp according to immediate signed constant. CodeBank is not influenced.
Action:
Rpp+const->Rpp Input Registers:
-
Output Registers:
-
Input Flags:
-
Output Flags:
-
JRR SEO
Jump Relative Register
Description:
Jump relative to Rpp according to signed content of register. CodeBank is not influenced.
Action:
Rpp+Rd[rbs]–>Rpp
Input Registers:
-
Output Registers:
-
Input Flags:
-
Output Flags:
-
LOAD
LOAD Data Register with Constant
Description:
Loads internal data register or output register with an immediate constant
Action:

| rt | |
|---|---|
| 0nn | const -> Rd[nn] |
| 1nn | const -> Ro[nn] |

Rpp++
rt: target register

Input Registers:
-
Output Registers:
Rd/Ro
Input Flags:
-
Output Flags:
-
MERGE FF
MERGE Data Streams
Description:
Moves one of two inputs to output, depending on flag.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rt | |
| 0nn | Rd[nn] |
| 1nn | Ro[nn] |

| Event E= | |
|---|---|
| es4 | |
| 0nnn | F[nnn] |
| 1nnn | Ei[nnn] |
| E | |
| 0 | O = I1 |
| 1 | O = I2 |

Rpp++
rt: target register
rs: source register
es: source event

Input Registers:
Ri/Rd, Ri/Rd
Output Registers:
Rd/Ro
Input Flags:
Ei/F
Output Flags:
-
MOVE
MOVE Internal Data Register
Description:
Moves content of a register bank register to another internal register.
Action:
Rd[rbs]->rd[rbt]
Rpp++
  rbs: register bank source
  rbt: register bank target
Input Registers:
Rd
Output Registers:
Rd
Input Flags:
-
Output Flags:
-
MOVEE
MOVE Flag Register
Description:
Moves content of a flag register to another flag register.
Action:
F[fs]->F[ft]
Rpp++
  fs: flag source
  ft: flag target
Input Registers:
-
Output Registers:
-
Input Flags:
F
Output Flags:
F
MUL
MULtiply Description:
Multiply rs1 and rs2.
Action:

| Input I1 = | |
|---|---|
| rs1 | |
| 0nn | Rd[nn] |
| 1nn | Ri[nn] |
| Input I2 = | |
| rs2 | |
| 0nn | Rd[nn] |
| 1nn | Ri[nn] |
| Output O = | |
| rtp | |
| 0n | Rd[(n * 2)], Rd[(n * 2) + 1] |
| 1n | Ro[(n * 2)], Ro[(n * 2) + 1] |

I1, I2 -> O
Rpp++
rs: source register
rtp: target register pair

Input Registers:
Ri/Rd
Output Registers:
Rd/Ro
Input Flags:
-
Output Flags:
-

MULU
MULtiply Unsigned
Description:
  Multiply unsigned rs1 and rs2.
Action:

| Input I1 = | |
|---|---|
| rs1 | |
| 0nn | Rd[nn] |
| 1nn | Ri[nn] |
| Input I2 = | |
| rs2 | |
| 0nn | Rd[nn] |
| 1nn | Ri[nn] |
| Output O = | |
| rtp | |
| 0n | Rd[(n * 2)], Rd[(n * 2) + 1] |
| 1n | Ro[(n * 2)], Ro[(n * 2) + 1] |

I1, I2 -> O
Rpp++
rs: source register
rtp: target register pair

Input Registers:
Ri/Rd
Output Registers:
Rd/Ro
Input Flags:
-
Output Flags:
-

NOP
No Operation
Description:
    No Operation, Rpp is incremented
Action:
Rpp++
Input Registers:
-
Output Registers:
-
Input Flags:
-
Output Flags:
-

NOT
Logical Inverse
Description:
    Inverts Register Logically
Action:

| Input I = | |
|---|---|
| rs | |
| 0nn | Rd[nn] |
| 1nn | Ri[nn] |
| Output O = | |
| rt | |
| 0nn | Rd[nn] |
| 1nn | Ro[nn] |

I -> O
Rpp++
rs: source register
rt: target register

Input Registers:
Ri/Rd
Output Registers:
Rd/Ro
Input Flags:
-
Output Flags:

| Mode | |
|---|---|
| SEQ | zero |
| FF | F/Eo |

OR
Logical OR
Description:
Logical OR operation

Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rt | |
| 0nn | Rd[nn] |
| 1nn | Ro[nn] |

I1, I2 -> O
Rpp++
rs: source register
rt: target register

Input Registers:
Ri/Rd
Output Registers:
Rd/Ro
Input Flags:
-
Output Flags:

| Mode | |
|---|---|
| SEQ | zero, sign, parity |
| FF | zero -> F/Eo |

READ
READ Data Input Register
Description:
Read specified data input register and write to internal register bank or output register. READ waits until data is available at the input register.
Action:

| rt | |
|---|---|
| 0nn | Ri[ri] -> Rd[nn] |
| 1nn | Ri[ri] -> Ro[nn] |

Rpp++
rt: target register
ri: input register

Input Registers:
Ri
Output Registers:
Rd/Ro
Input Flags:
-
Output Flags:
-

READE
READ Event Input Register
Description:
Read specified event input register and write to internal flag bank or event output register. READE waits until event is available at the input register.
Action:

| et4 | |
|---|---|
| 0nnn | Ei[ei] -> F[nnn] |
| 1nnn | Ei[ei] -> Eo[nnn] |

Rpp++
et4: target event
ei: input event

Input Registers:
-
Output Registers:
-
Input Flags:
Ei
Output Flags:
F/Eo

SAT
SATurate
Description:
Saturates register depending on carry (Fu0) flag and saturation mode.
Action:

| Input I = | |
|---|---|
| rs | |
| 0nn | Rd[nn] |
| 1nn | Ri[nn] |

| Output O = | |
|---|---|
| rt | |
| 0nn | Rd[nn] |
| 1nn | Ro[nn] |

| Event E = | | |
|---|---|---|
| Mode | es4 | |
| SQ | don't care | carry |
| FF | 0nnn | F[nnn] |
| FF | 1nnn | Ei[nnn] |
| E | as | |
| 0 | don't care | I -> O |
| 1 | 0 | 0h -> O |
| 1 | 1 | ffffh -> O |

Rpp++
rs: source register
rt: target register
as: add/substract mode
es4: event source Input Registers:
Rd
Output Registers:
Rd/Ro
es4Input Flags:
SEQ-Mode: carry
FF-Mode: Ei/F Output Flags:
-

SETF
SET Flag with Constant
Description:
Loads flag register or output event with an immediate constant
Action:

| et4 | |
|---|---|
| 0nnn | const -> F[nnn] |
| 1nnn | const -> Eo[nnn] |

Rpp++
et4: event target

Input Registers:
-
Output Registers:
-
Input Flags:
-
Output Flags:
F/Eo

SHL
SHift Left
Description:
Shift rs1 left. LSB is filled with event.
Action:

| Input I1 = | |
|---|---|
| rs1 | |
| 0nn | Rd[nn] |
| 1nn | Ri[nn] |

| Event Input E = | |
|---|---|
| es4 | |
| 0nnn | F[nnn] |
| 1nnn | Ei[nnn] |

| Output O = | |
|---|---|
| rt | |
| 0nn | Rd[nn] |
| 1nn | Ro[nn] |

| Event output Eo = | |
|---|---|
| et4 | |
| 0nnn | F[nnn] |
| 1nnn | Eo[nnn] |

I1 -> O
Rpp++
rs: source register
rt: target register pair
et4: target event pair
es4: source event register Input Registers:
Ri/Rd
Output Registers:
Rd/Ro
Input Flags:
F, Ei
Output Flags:

| Mode | |
|---|---|
| SEQ | MSB(rs1) -> carry |
| FF | MSB(rs1) -> Fu/Euo |

SHR
SHift Right
Description:
Shift rs1 right. MSB is filled with event.
Action:

| Input I1 = | |
|---|---|
| rs1 | |
| 0nn | Rd[nn] |
| 1nn | Ri[nn] |

| Event Input E = | |
|---|---|
| es4 | |
| 0nnn | F[nnn] |
| 1nnn | Ei[nnn] |

| Output O = | |
|---|---|
| rt | |
| 0nn | Rd[nn] |
| 1nn | Ro[nn] |

| Event output Eo = | |
|---|---|
| et4 | |
| 0nnn | F[nnn] |
| 1nnn | Eo[nnn] |

I1 -> O
Rpp++
rs: source register
rt: target register pair
et4: target event pair
es4: source event register Input Registers:
Ri/Rd
Output Registers:
Rd/Ro
Input Flags:
F, Ei
Output Flags:

| Mode | |
|---|---|
| SEQ | LSB(rs1) -> carry |
| FF | LSB(rs1) -> Fu/Euo |

SKIPE
SKIP Next Two Commands Depending on Event
Description:
Next two commands are skipped based on event or flag. If an event is selected as source the execution stops until the event is available.

Action:

| val | value |
|---|---|
| 0 | 0 |
| 1 | 1 |

| Event E = | |
|---|---|
| es4 | |
| 0nnn | F[nnn] |
| 1nnn | Ei[nnn] |

Skip next two addresses if event or flag is equal to val:

| event/flag | |
|---|---|
| not equal val | Rpp++ |
| equal val | Rpp + 3 -> Rpp | val: value
es4: event source

Input Registers:
-
Output Registers:
-
Input Flags:
Ei/F
Output Flags:
SORT FF
SORT Data Stream
Description:
 Sort two inputs, depending on value.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O1 = | |
|---|---|
| rt1 | |
| 0nn | Rd[nn] |
| 1nn | Ro[nn] |

| Output O2 = | |
|---|---|
| rt2 | |
| 0nn | Rd[nn] |
| 1nn | Ro[nn] |

| Event E1 = | |
|---|---|
| et41 | |
| 0nnn | F[nnn] |
| 1nnn | Eo[nnn] |

-continued

| Event E2= | |
|---|---|
| et42 | |
| 0nnn | F[nnn] |
| 1nnn | Eo[nnn] |

O1 = smaller value of I1 and I2
O2 = larger value of I1 and I2
E1 = 1 if I1 < I2 else 0
E2 = 1 if I1 <= I2 else 0
Rpp++
rt: target register
rs: source register
et4: target event Input Registers:
Ri/Rd, Ri/Rd
Output Registers:
Rd/Ro, Rd/Ro
Input Flags:
-
Output Flags:
Ei/F
SORTU FF
SORT data stream Unsigned
Description:
 Sort two unsigned inputs, depending on value.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O1 = | |
|---|---|
| rt1 | |
| 0nn | Rd[nn] |
| 1nn | Ro[nn] |

| Output O2 = | |
|---|---|
| rt2 | |
| 0nn | Rd[nn] |
| 1nn | Ro[nn] |

| Event E1 = | |
|---|---|
| et41 | |
| 0nnn | F[nnn] |
| 1nnn | Eo[nnn] |

-continued

| Event E2 = | |
|---|---|
| et42 | |
| 0nnn | F[nnn] |
| 1nnn | Eo[nnn] |

O1 = smaller value of I1 and I2
O2 = larger value of I1 and I2
E1 = 1 if I1 < I2 else 0
E2 = 1 if I1 <= I2 else 0
Rpp++
rt: target register
rs: source register
et4: target event Input Registers:
Ri/Rd, Ri/Rd
Output Registers:
Rd/Ro, Rd/Ro
Input Flags:
-
Output Flags:
Ei/F SUB
SUBtract
Description:
Subtract rs2 from rs1.
Action:

| Input I1 = | |
|---|---|
| rs1 | |
| 0 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rt | |
| 0nn | Rd[nn] |
| 1nn | Ro[nn] |

| Event output Eo = | |
|---|---|
| et4 | |
| 0nnn | F[nnn],<br>F[nnn] |
| 1nnn | Eo[nnn],<br>Eo[nnn] |

I1, I2 -> O
Rpp++
rs: source register
rt: target register
et4: target event

Input Registers:
Ri/Rd
Output Registers:
Rd/Ro
Input Flags:
F, Ei
Output Flags:

| Mode | |
|---|---|
| SEQ | carry, sign, null, parity |
| FF | carry -> Fu/Euo |

ADDC
ADD with Carry
Description:
Subtract rs2 from rs1 with Carry.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Event Input E = | |
|---|---|
| es4 | |
| 0nnn | F[nnn] |
| 1nnn | Ei[nnn] |

| Output O = | |
|---|---|
| rt | |
| 0nn | Rd[nn] |
| 1nn | Ro[nn] |

| Event output Eo = | |
|---|---|
| etp | |
| 0nn | Fu[nn],<br>Fv[nn] |
| 1nn | Euo[nn],<br>Evo[nn] |

I1, I2 -> O
Rpp++
rs: source register
rt: target register
es4: source event
etp: target event pair Input Registers:
Ri/Rd
Output Registers:
Rd/Ro
Input Flags:
F, Ei
Output Flags:

| Mode | |
|---|---|
| SEQ | carry, sign, null, parity, overflow |
| FF | carry -> Fu/Euo, overflow -> Fv/Evo |

SWAP
FF SWAP Data Stream
Description:
    Swap two inputs, depending on flag.
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O1 = | |
|---|---|
| rt1 | |
| 0nn | Rd[nn] |
| 1nn | Ro[nn] |

| Output O2 = | |
|---|---|
| rt2 | |
| 0nn | Rd[nn] |
| 1nn | Ro[nn] |

| Event E = | |
|---|---|
| es4 | |
| 0nnn | F[nnn] |
| 1nnn | Ei[nnn] |

| E | |
|---|---|
| 0 | O1 = I1, O2 = I2 |
| 1 | O1 = I2, O2 = I1 |

Rpp++
rt: target register
rs: source register
es4: source event

Input Registers:
Ri/Rd, Ri/Rd
Output Registers:
Rd/Ro, Rd/Ro
Input Flags:
Ei/F
Output Flags:
-
UPDATE FF
UPDATE Parameters
Description:
    Updates registers Rd3, Rd2, Rd1 with value from Ri3 if Ei7 is set. Moves subsequent data packet on Ri3 to Ro3 and sets Eo7.
Action:

| Mode | | | | |
|---|---|---|---|---|
| 1 | Ri3 -> Rd3 | | set Eo7 | |
| | Ri3 -> Ro3 | | | |
| 2 | Ri3 -> Rd3 | Ri2 -> Rd2 | set Eo7 | |
| | Ri3 -> Ro3 | | | |
| 3 | Ri3 -> Rd3 | Ri2 -> Rd2 | Ri1 -> Rd1 | set Eo7 |
| | | | | Ri3 -> Ro3 |

Rpp++
mode: update mode

Input Registers:
Ri3
Output Registers:
Rd3, Rd2, Rd1
Input Flags:
Ei7
Output Flags:
Eo7
WAITE
WAIT for Incoming Event
Description:
    Stop execution and wait for incoming event of defined value. Acknowledge incoming events.
Action:

| valx | value |
|---|---|
| 00 | 0 |
| 01 | 1 |
| 1x | don't care |

| Event E = | |
|---|---|
| es3 | |
| nnn | Ei[nnn] |

Wait for incoming event of defined value. Acknowledge all incoming events.
    valx: value
    es3: event source
Rpp++
Input Registers:
-
Output Registers:
-
Input Flags:
Ei
Output Flags:
-
WRITE
WRITE Output Register
Description:
    Write data from input register or internal register bank to output register. Wait for incoming ACK either before or after writing.
Action:

| rs | |
|---|---|
| <sync0> | |
| 0nn | Ri[nn] -> Ro[ro] |
| 1nn | Rd[nn] -> Ro[ro] |
| <sync1> | |

Rpp++
ro: output register
rs: register source

Synchronisation is handled according to sy:

| | | |
|---|---|---|
| sy = 0 <sync0> | | Wait only if previously sent event has not been granted by ACK yet |
| sy = 1 <sync1> | | Wait until actual event is granted by ACK |

Input Registers:
Ri/Rd
Output Registers:
Ro
Input Flags:
-
Output Flags:
-
WRITEE
WRITE Event Output Register
Description:
   Write event from input register or flag to event output register. Wait for incoming ACK either before or after writing.
Action:

| es4 | |
|---|---|
| <sync0> | |
| 0nnn | Ei[nnn] -> Eo[eo] |
| 1nnn | F[nnn] -> Eo[eo] |
| <sync1> | |

Rpp++
eo: output event
es4: event source

Synchronisation is handled according to sy:

| | | |
|---|---|---|
| sy = 0 <sync0> | | Wait only if previously sent event has not been granted by ACK yet |
| sy = 1 <sync1> | | Wait until actual event is granted by ACK |

Input Registers:
-
Output Registers:
-
Input Flags:
Ei/F
Output Flags:
Eo
XOR
Logical XOR
Description:
   Logical XOR operation
Action:

| Input I1 = | |
|---|---|
| rs1 | |
| 0nn | Rd[nn] |
| 1nn | Ri[nn] |

| Input I2 = | |
|---|---|
| rs2 | |
| 0nn | Rd[nn] |
| 1nn | Ri[nn] |

| Output O = | |
|---|---|
| rt | |
| 0nn | Rd[nn] |
| 1nn | Ro[nn] |

I1, I2 -> O
Rpp++
rs: source register
rt: target register

Input Registers:
Ri/Rd
Output Registers:
Rd/Ro
Input Flags:
-
Output Flags:

| Mode | |
|---|---|
| SEQ | zero, sign, parity |
| FF | zero -> F/Eo |

In the following, an example for the use of function folding is given:
Function Folding and Fast Parameter Update Example FIR
Ri0=x
Ri1=y
3-folded FIR using acc
Fast parameter update for registers Rd1, Rd2, Rd3

Example 1

UPM3, Updates Parameters with Each Access to Rd3, 2, 1 (if Ei7 is Set)

upmcfg=1100
stage 1
   mul acc, Ri0, Rd3;
   add Rd0, acc, Ri1;
stage 2
   mul acc, Ri0, Rd2;
   add Rd0, acc, Rd0;
stage 3
   mul acc, Ri0, Rd1;
   add Ro1, acc, Rd3;
   write Ro0, Ri0;
Alternative using MAC opcode, parameter pop and looping
   read Rd0, Ri1;
   lh, lt[3]: mac Rd0, Ri0, pop;
   write Ro1, Rd0;
   write Ro0, Ri0;

Example 2

UPM3, Uses Command UPDATE for Parameter Update upmcfg=1110
stage 1
  mul acc, Ri0, Rd3;
  add Rd0, acc, Ri1;
stage 2
  mul acc, Ri0, Rd2;
  add Rd0, acc, Rd0;
stage 3
  mul acc, Ri0, Rd1;
  add Ro1, acc, Rd3;
  write Ro0, Ri0;
  update 3

Example 3

UPM3, Updates Parameters at Rpp==0 upmcfg=1101
stage 1
  mul acc, Ri0, Rd3;
  add Rd0, acc, Ri1;
stage 2
  mul acc, Ri0, Rd2;
  add Rd0, acc, Rd0;
stage 3
  mul acc, Ri0, Rd1;
  add Ro1, acc, Rd3;
  write Ro0, Ri0;

In the above, an improved data processor array has been described. Although only in some instances, it has been pointed out that reference to a certain number of registers, bit width etc. is for explanation only, it is to be understood that this also holds where such reference is not found.

If the array is to be very large or in case a real time process is run where two different fragments of an array unknown at compile time have to communicate with each other so as to enable data processing, it is advantageous to improve the performance by ensuring that a communication path can be set up. Several suggestions have been made already, e.g. Lee-Routing and/or the method described in PACT 7. It is to be understood that the following part of an improved array design might result in an improved circuitry for certain applications but that it is not deemed absolutely and inevitably necessary to implement it with e.g. a function fold PAE. Rather, the other suggestions for improvement will result in significant improvements on their own as will be understood by the average skilled person.

Routing Improvement

The suggested improvement described hereinafter concerns the static routing network for reconfigurable array architectures. Hereby this static network is enhanced by implementing additional logic to adaptive runtime routing.

FIG. 1 depicts a cut-out of a reconfigurable array with a set of functional units (FU). Each functional unit encloses one routing unit (RU) and additional functional modules (FMs). The enclosed functional modules are used to manipulate data and characterize the type of the FU. The RU contains an interconnect matrix which is able to route each input port to any desirable output ports. All FUs are connected through point-to-point links whereas each is composed of two half-duplex links and able to transport the data in both directions at the same time.

The routing technique described in this document is instruction based which means that each routing process must be started by an instruction. If the user wants to establish a routing between two cells, he has to bring a specific instruction into the source cell. The hardware within the array calculates based on the instruction fields values the desired routing direction and establishes the logic stream. The routing process happens stepwise from one functional unit to another whereby each cell decides which direction should be taken next. On the way to an established route we defined three valuable states of the routing resources. The first state is the physical route or link. This means that the resources of this route are not used and available to routing processes. The second state is named temporal route or link. This state describes the temporarily not available link, which means that this link is in use for routing purposes but the mentioned routing is not confirmed yet. The problem here is that this route can be confirmed in the future or released if the successor cells are able to realise the desired routing. The last state is the logical route or link. This state represents an established route on the array which is able to transport calculation data.

This routing technique uses coordinates on the array to calculation routings. Each FU possesses unique coordinate's und on the basis of this information it is able to determine the routing direction to each desired cell Within the array. This concept is the basis for the adaptive runtime routing described in this document. The needed control logic for adaptive routing is implemented within the routing unit, especially within the routing controller which controls the interconnect matrix at runtime. Therefore the routing controller is able to analyze the incoming data of all input ports of the concerned FU and come to a decision what to do next.

Routing Establishment

For the purpose of incoming data analyzing and data buffering each input port owns so called in-registers (InReg). Additional to those standard registers there are InReg-controllers implemented (InRegCtrl). Those finite state machines (FSMs) have the job to store the actual state of the input links and in dependency of the actual state to trigger routing requests or release not required routings. To fulfill its job each InRegCtrl is connected to an in-controller (InCtrl) which is implemented exactly once per FU. Important requirement for requesting of new routings is that the mentioned input resource (InReg, InRegCtrl) are not used and so in the state of physical link.

InCtrl gets requests of all InRegCtrls all over the time and forwards one request after another to the routing controller (RoutCtrl). The selection which InRegCtrl should be served first is dependant on the routing priority of the input link and/or which input link was served last. Based on the coordinate information of the target cell and the coordinates of the actual FU the RoutCtrl calculates the forward direction for the requested input link. Thereby the RoutCtrl takes into account additional parameters like optimum bit (will be described later), the network utilisation towards the desired direction, etc.

If the direction calculation within the RoutCtrl was successful the RoutCtrl forwards the request with additional information about the output port to the interconnect matrix, which connects the input port with calculated output port. If this is done the RoutCtrl signals the successful routing operation to InCtrl. Because the actual reached routing state is not final it is necessary to store the actual state. This happens within the queue-request-registerfile (QueueRRF). Therefore the InCtrl is directly connected to the QueueRRF and is able to store the desired information. At this point the related input and output links reach the temporal link state and are temporarily not available for other routing processes.

Due to the fact that the QueueRRF is able to store more than one routing entry, the InCtrl is able to hold multiple routing processes at the same time. But for the purpose of high hardware area consumption the direction calculation is realized once within the RoutCtrl.

The established temporal routing stays stored within the QueueRRF till the point the successor cell acknowledges the routing. In this case the InCtrl clear the according entry in the QueueRRF and signals the successful routing to the InCtrl. The InRegCtrl changes into the state logical route and signal the predecessor cell the successfully finished routing process.

The other case can happen if the successor cell is not able to establish the desired route. In this case the InCtrl forwards a new request to the RoutCtrl based on the QueueRRF-entry. This request leads to new routing suggestion which will be stored within the QueueRRF.

If all available and expedient directions are checked and routing trials failed the InCtrl signals to InRegCtrl the failed routing. The InCtrl signals the same routing miss to the predecessor cell and finishes the routing process in the current cell.

Within the routing process there are two exceptions how the routing unit establishes a desired routing. Those exceptions affect the source and the target cell. The exception in both cases is that as well the source cell as the target cell do not need to route the started/ending routing through the interconnect matrix. To connect the FMs to the output links of cells simple multiplexers are used. Those multiplexers are implemented after the interconnect matrix and have to be switched explicitly. This happens after the routing process is finished. The exception lies in the finishing state. Here the InRegCtrl doesn't have to acknowledge the successful routing the predecessor it just has to consume the actual routing instruction in the InReg instead. This happens after the InCtrl signals the successful routing. Additionally the InReg switches the output multiplexer associated to the output port of the FM and finishes the routing establishment. The information needed the switch the right output multiplexer gets the InCtrl from the RoutCtrl.

Otherwise if the routing fails the InCtrl asserts cell specific interrupt line and signals the failure to the system.

The second exception concerns the target routing cell. Here it is important to connect the new route with the input ports of the local FM. Therefore simple multiplexers are used which are implemented before the interconnect matrix. If an ongoing routing process reaches the target cell the InCtrl identifies the target achievement and switches the associated input multiplexer to forward the incoming data to the input port of the FM. This is the point where, the successful route establishment signal is generated by the InRegCtrl after InCtrl signals the success. Here the InRegctrl has the last job to finish the routing process by deleting the routing instruction and going to logical state.

Releasing Established Routing

For releasing of the logically established routings we introduced special instructions, so called end packets. The only purpose of those instructions is the route-dissolving by inject the necessary end packet into the logic established routing. There are two ways how the routings can be released. The first possibility is the global releasing. This means that all routes which are following the route where the end packet is injected will be released. This function is useful to delete whole configurations with one single instruction. For this purpose it is important that the FMs are able to forward the end packet unaltered through the internal datapaths.

The second way for route releasing is the local route releasing. Here it is possible to release single established routes between output and input ports of FMs. The end packets are not propagated through the FMs. In this case the end packet will be consumed by the last InRegCtrl.

The internal RU communication is similar to the routing process. If the InRegCtrl determines incoming end packet and the InRegctrl is in the logic route state, the InRegCtrl forwards the route release request to the InCtrl. The InCtrl clears the entries either within the interconnect matrix or within the input multiplexers registers or within the output multiplexer registers. Meanwhile the InRegCtrl consumes (in case of the local end packet and last cell in the chain) the instruction and goes to the idle state. If the end packet was a global instruction the InRegCtrl forwards always the end packet to the successor.

Additional Features

For the purpose of priority control, we introduced a priority system to influence the order in which the RU serves the incoming routing requests. Therefore the instructions contain priority fields which describe the priority level. Higher values in this field result in higher priority und will be preferred by the RU during the runtime-routing. The priority field has direct influence on the selection of the incoming routing requests from the InRegCtrls to InCtrl.

Some inner configuration communication streams require strictly defined latency to reach the desired performance. Therefore it is very important to keep the maximum register chain length. To decrease the latency of the routed streams its is necessary to ensure that the array chose always the best routing between source and target, but this requirement may lead to not routable streams if this feature will be always required. To ease this problem we introduced a special bit within the routing instruction, so called optimum bit (OptBit). This bit has to be activated if the optimum routing is definitely required. In this case the array tries to reach this requirement und delivers an interrupt if fails.

The alternative to reach the required latency is the speed path counter. This counter gives the possibility to bypass a specific number of registers before buffering again. Therefore we defined a reference value and the counter value. Both numbers are stored within the instruction field. Each passed cell respective the RU compares the counter value and the reference value. If both values are equal then the actual cell buffers the stream and resets the counter. If the counter is smaller than the reference value the current buffer will be bypassed and the counter incremented by one. In this way it is possible to bypass a number of buffers which equals exactly to reference value.

Multi-Grained Communication Links

In addition to the coarse-grained point-to-point links we introduced more flexible multi-grained point-to-point links. Hereby one single point-to-point link connects two neighbor cells respective the RUs within those cells. One coarse-grained link consists of a set of wires, e.g. 32 wires for one 32 link, and additionally protocol signals. The whole vector is handled by a single set of control signals which makes this communication resource not usable for multi-grained communication.

To reach this requirement we divided the whole 32 bit vector into single strips, e.g. with groups of 8 times 1 bit strips and 3 times 8 bit strips. Each strip obtained separate control signals and is able to operate independently from other strips.

The idea behind this division is to combine those strips to logical multi-grained sub-links. If you have one multi-grained link you can use the whole vector as one interrelated 32 bit vector or split the whole vector into sub-channels. In this configuration each strip can be one single sub-channel or a group of strips can be gathered to a single sub-channel of desired bit-width. You just have—in respect of hardware costs—to consider that one sub-channel has to fit into one multi-grained link.

Multi-Grained Routing

In order to route multi-grained channels it's necessary to use the coarse grained links to support the routing process. The idea is to route two links in parallel, one coarse-grained link to support multi-grained routing and one multi-grained link, which will contain the final multi-grained stream. Therefore we defined a two packet routing instruction with needed data fields. The first instruction packet contains—compared to coarse-grained routing instruction—additional bit mask to specify used multi-grained sub-links and multi-grained link ID to identify the associated multi-grained link. The other features like described above—optimum bit, speed path, priority routing—are support in this routing mode as well. The routing process within the RU is performed similar to the coarse-grained routing.

The first packet which arrives in a cell is analyzed by the InRegCtrl and a request is generated and forwarded to the InCtrl. InCtrl forwards the request to the RoutCtrl and wait for the acknowledgement. If RoutCtrl finds one possible routing direction, the InCtrl gets the successful acknowledgement and the temporal routing will be established by the RoutCtrl. Next, the actual job will be stored within the QueueRRP and the InCtrl waits for the acknowledgement from the successor cell. If RoutCtrl is not able to find a possible routing, the InCtrl gets negative acknowledgement and which will be forwarded to the associated InRegCtrl, which generates the route unable signal to the predecessor cell and quits the routing process within this cell.

If the successor cell signals successful routing, the InRegCtrl clears the related entry in the QueueRRP and finishes the routing. If the successor cell is not able to establish a rout to the destination cell, it generates negative acknowledgement signal. Hereupon, the InCtlr starts new request to the RoutCtrl and handle the responses as described above.

The difference between the coarse-grained routing and multi-grained routing lies in the handling of the multi-grained interconnect matrix. Each strip of a multi-grained link is handled separately. The RoutCtrl forwards the switch request to the strip matcher. Strip matcher has the job to analyze the input strips and to match them to the output link according to already used strips. What strip matcher is doing is to map the problem of strip matching into the time domain and switches the needed switchboxes for each strip separately one after another.

Routing packet for coarse-grained streams:

| 32 31 30 29 28 27 26 25 24 23 22 21 20 19 18 17 16 15 14 13 12 11 10 09 08 07 06 05 04 03 02 01 00 | | | |
|---|---|---|---|
| | | Value | Comments |
| 32 | | 1 | instruction-packet |
| 31 | 30 | 00 | ID: Routing-packet for coarse-grained streams |
| 29 | 28 | XX | Priority-level: higher value results in higher priority |
| 27 | 26 | XX | Speed path: Reference value |
| 25 | 24 | XX | Speed path: Counter |
| 23 | | X | Optimum bit (OptBit): 1 enabled; 0 disabled |
| 22 | ... 19 | XXXX | FM output address within the source cell |
| 18 | ... 15 | XXXX | FM input address within the destination cell |
| 14 | | X | Use fine-grained links: 1 = yes, 0 = no |
| 13 | ... 8 | | Reserved |
| 7 | ... 4 | X...X | Destination cell coordinates: x-coordinate |
| 3 | ... 0 | X...X | Destination cell coordinates: y-coordinate |

Routing Instruction for multi-grained streams (first packet):

| 32 31 30 29 28 27 26 25 24 23 22 21 20 19 18 17 16 15 14 13 12 11 10 09 08 07 06 05 04 03 02 01 00 | | | |
|---|---|---|---|
| | | Value | Comments |
| 32 | | 1 | Instructions-packet |
| 31 | 30 | 01 | ID: Routing-instruction multi-grained streams (first packet) |
| 29 | 28 | XX | Priority-level: higher value results in higher priority |
| 27 | 26 | XX | Speed path: Reference value |
| 25 | 24 | XX | Speed path: Counter |
| 23 | | X | Optimum bit (OptBit): 1 enabled; 0 disabled |
| 22 | | — | Reserved |
| 21 | ... 19 | XXX | ID of the input stream of the multi-grained link |
| 18 | ... 16 | XXX | 8 bit strips mask: 1 = selected; 0 = not selected |
| 15 | ... 8 | X...X | 1 bit strips mask: 1 = selected; 0 = not selected |
| 7 | ... 4 | XXXX | Destination cell coordinates: x-coordinate |
| 3 | ... 0 | XXXX | Destination cell coordinates: y-coordinate |

Second packet of the routing instruction for multi-grained streams:

| 32 31 30 29 28 27 26 25 24 23 22 21 20 19 18 17 16 15 14 13 12 11 10 09 08 07 06 05 04 03 02 01 00 | | | |
|---|---|---|---|
| | | Value | Comments |
| 32 | | 1 | Instructions-packet |
| 31 | ... 30 | 10 | ID: Routing-instruction multi-grained streams (first packet) |
| 29 | 28 | X | Reserved |
| 27 | ... 25 | XXX | Destination cell 8 bit strips mask: 1 = selected; 0 = not selected |
| 24 | ... 17 | X...X | Destination cell 1 bit strips mask: 1 = selected; 0 = not selected |
| 16 | ... 14 | XXX | Multi-grained FM input port address of the destination cell |
| 13 | ... 11 | XXX | Source cell 8 bit strips mask: 1 = selected; 0 = not selected |
| 10 | ... 3 | X...X | Source cell 1 bit strips mask: 1 = selected; 0 = not selected |
| 2 | ... 0 | XXX | Multi-grained FM output port address of the source cell |

End packet instruction:

| | | Value | Comments |
|---|---|---|---|
| 32 | | 1 | Instruktions-Paket |
| 31 | ... 30 | 11 | ID: End packet for logical stream releasing |
| 29 | | X | Coarse-/fine-grained releasing: 1 coarse-grained, 0 fine-grained |
| 28 | | X | Local/global route release process: 1 = local, 0 = global |
| 27 | ... 23 | -...- | Reserved |
| 22 | ... 19 | XXXX | FM output address within the source cell |
| 18 | ... 14 | -...- | Reserved |
| 13 | ... 11 | XXX | Source cell 8 bit strips mask: 1 = selected; 0 = not selected |
| 10 | ... 3 | X...X | Source cell 1 bit strips mask: 1 = selected; 0 = not selected |
| 2 | ... 0 | XXX | Multi-grained FM output port address of the source cell |

Column header: 32 31 30 29 28 27 26 25 24 23 22 21 20 19 18 17 16 15 14 13 12 11 10 09 08 07 06 05 04 03 02 01 00

Data packet:

| | | Value | Comments |
|---|---|---|---|
| 32 | | 0 | Data packet |
| 31 | ... 0 | X...X | Application data |

Column header: 32 31 30 29 28 27 26 25 24 23 22 21 20 19 18 17 16 15 14 13 12 11 10 09 08 07 06 05 04 03 02 01 00

FIGS. 36 to 44 relate to an improved way of routing.
Using Function Folding to Improve Silicon Efficiency of Reconfigurable Arithmetic Arrays This section presents Function Folding, a design principle to improve the silicon efficiency of reconfigurable arithmetic (coarse-grain) arrays. Though highly parallel implementations of DSP algorithms have been demonstrated on these arrays, the overall silicon efficiency of current devices is limited by both the large numbers of ALUs required in the array and by the only moderate speeds which are achieved. The operating frequencies are mainly limited by the requirements of non-local routing connections. We present a novel approach to overcome these limitations; In Function Folding, a small number of distinct operators belonging to the same configuration are folded onto the same ALU, i.e. executed sequentially on one processing element. The ALU is controlled by a program repetitively executing the same instruction sequence. Data only required locally is stored in a local register file. This sequential approach uses the individual ALU resources more efficiently, while all processing elements of the array work in parallel as in current devices. Additionally, the ALUs and local registers can be clocked with a higher frequency than the (non-local) routing connections. Overall, a higher computational density than in current devices results.

1 Introduction

Field-Programmable Gate Arrays (FPGAs) are used as a flexible, programmable alternative to Application Specific Integrated Circuits (ASICs) for bit-oriented applications. They combine low NRE costs with fast time-to-market. See R. Hartenstein, "A Decade of Reconfigurable Computing: A Visionary Retrospective," In Proc. Design, Automation and Test in Europe, 2001 ("Hartenstein"). Similarly, reconfigurable arithmetic arrays—based on coarse-grain ALUs rather than bit-level lookup tables—are such an alternative for word-level, arithmetic applications. There are several research projects (e.g., Rapid (see D. C. Cronquist et al., "Architecture design of reconfigurable pipelined datapaths," In Pros. 20th Anniversary Conference on Advanced Research in VLSI, Atlanta, Ga., March 1999), KressArray (see Hartenstein and see R. Hartenstein et al., "A New FPGA architecture for word-oriented datapaths, In Proc. Feld-Programmable Logic, $4^{th}$ International Workshop, Springer-Verlag, September 1994 ("Hartenstein et al."))) as well as commercial developments (e.g., PACT XPP Technologies (see V. Baumgarte et al., "PACT XPP-A Self-Reconfigurable Data Processing Architecture," The Journal of Supercomputing, 26(2), Septemebr 2003 ("Baumgarte et al."), Morphotech (see M. H. Lee et al., "Design and Implementation of the MorphoSys Reconfigurable Computing Processor," Journal of VLSI and Signal Processing Systems for Signal, Image and Video Technology, March 2000 ("Lee et al.")), Elixent (see T. Stansfield, "Using Muliplexers for Control and Data in D-Fabrix, In Field Programmable Logic and Applications, LNCS 2778, pp. 416-425, Springer, 2003)) in this area. However, these architectures have not seen widespread use yet though highly parallel implementations of DSP algorithms have been demonstrated on them. One apparent reason for this is the limited silicon efficiency of current devices, resulting in both a large number of ALUs required in the array and in only moderate speeds being achieved. The operating frequencies are mainly limited by the requirements of non-local routing connections.

We present an extension of PACT XPP Technologies' extreme Processing Platform (XPP) (see Baumgarte et al.) which overcomes these limitations: Rather than executing a fixed operation on an ALU for the entire duration of a configuration, a small number of distinct operators belonging to the same configuration are folded onto the same ALU, i.e. executed sequentially on the same processing element (PE). The ALU is controlled by a program repetitively executing the same instruction sequence. Data only required locally is stored in a local register file. This sequential approach uses the individual ALU resources more efficiently, while all processing elements of the array work in parallel as in current devices. Since external data transfers are not required in every PE clock cycle, the ALUs and local registers can be clocked with a higher frequency than the (non-local) routing connections. This ALU overclocking technique is also justified by the continuous trend to higher integration densities: New technology generations provide smaller and smaller transistors, but the wires have higher relative capacities which make the busses slower and more power-consuming.

Despite these significant architectural changes, existing XPP programs can be automatically mapped to this extended architecture. Overall, a higher computational density than in current devices results.

The remainder of this section is organized as follows:

First, we describe the current PACT XPP architecture. Next, Section 3 describes the functionality and hardware design of the new Function Folding PE, Section 4 elaborates the application mapping methods, and Section 5 presents preliminary results. Finally, our approach is compared to related work, conclusions are drawn, and future work is outlined.

2 XPP Architecture Overview

The current XPP architecture (see Baumgarte et al.) is based on a 2-D array of coarse-grain, adaptive processing elements (PEs), internal memories, and interconnection resources. A 24-bit prototype chip with 64 ALUs and 16 internal memories was built by PACT XPP Technologies. A development board for this XPP64A chip is available.

PACT also provides a complete development tool suite consisting of a placer and router, a simulator, and a visualizer. The tools use the proprietary Native Mapping Language (NML), a structural language with reconfiguration primitives. A C frontend is provided as well.

2.1 Array Structure

Figure 45:
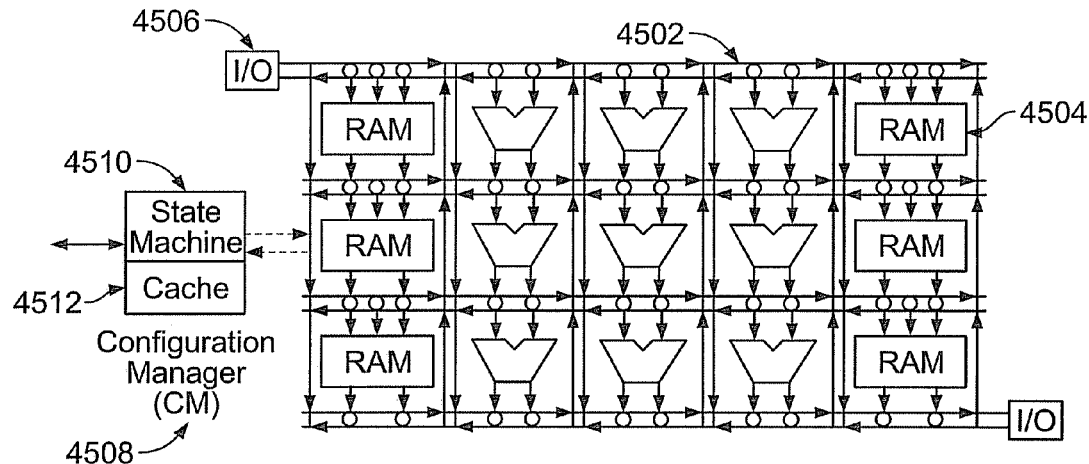
FIG. 45 shows a simplified structure of an XPP array.

FIG. 45 shows the basic structure of a simple XPP core. For demonstration purposes, it contains only 9 PEs 4502 and 6 internal RAMs 4504. The core comprises a 3×3 square of PEs in the center and one column of independent internal memories on each side. There are two I/O units 4506 which can either be configured as ports for streaming data or as interfaces for external RAM access. The core of a PE is an ALU which performs common arithmetic and logical operations, comparisons, and special operations such as counters. In each configuration, each PE performs one dedicated operation. Each line in the figure represents a set of segmented busses which can be configured to connect the output of a PE with other PEs' inputs. The array is attached to a Configuration Manager (CM) 4508 responsible for the runtime management of configurations, i.e. for downloading configuration data from external memory into the configurable resources of the array. Besides a finite state machine 4510, the CM has cache memory 4512 for storing or pre-fetching configuration data.

2.2 Data and Event Synchronization

The interconnection resources consist of two independent sets of busses: data busses (with a device specific bit-width) and one-bit wide event busses. The XPP busses are not just wires to connect logic: a ready/acknowledge protocol implemented in hardware synchronizes the data and events processed by the PEs. Hence a PE operation is performed as soon as all necessary input values are available and the previous result has been consumed. Thus it is possible to map a dataflow graph directly to the array, and to pipeline input data streams through it. No data is lost even during pipeline stalls. Special dataflow operations for stream merging, multiplexing etc. are provided as well.

2.3 Configuration

Compared to FPGAs, XPP cores can be configured rapidly due to their coarse-grain nature: Only opcodes and connections have to be set. Furthermore, only those array objects actually used need to be configured.

The configuration time can be reduced by prefetching mechanisms: during the loading of a configuration onto the array another configuration can be loaded to the CM cache. Thus it must not be loaded from external memory when it is requested. The same is true if a configuration has been used before and its configuration data is still in the CM cache.

3 Function Folding PE

We now describe the functionality and hardware design of an extended XPP PE, the Function Folding Processing Element.

3.1 Function Folding Example

Figure 47A:
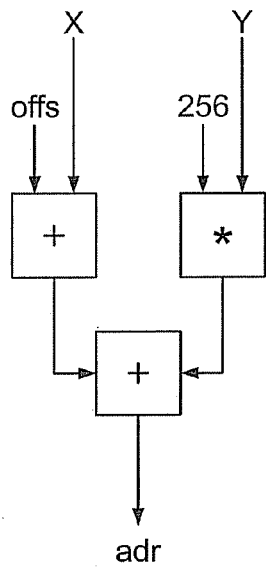
FIG. 47 shows an address generation data flow graph.

Let us first consider a simple example: An address adr is computed from a constant offset offs and coordinates x and y as follows: adr=offs+x+256*y. In an XPP implementation based on simple PEs as shown in FIG. 45, this computation is normally directly mapped to the dataflow graph in FIG. 47a. Each adder and multiplier is mapped to its own ALU. Therefore a new address can be computed every cycle. However, as mentioned in Section 1, the operating frequency is limited by the bus connections, not by the ALU itself.

For a higher silicon efficiency, i.e. for more operations per square millimeter and second, the ALUs have to be clocked faster. This could be achieved by more pipeline registers in the busses. But they unfortunately increase the chip area and power consumption and reduce the throughput if the dataflow graph contains cycles. In our approach, we rather operate the busses at a moderate frequency (as in the current XPP cores) and increase the ALU's clock rate locally inside a PE. This n-fold overclocking allows to schedule n ALU operations in one bus cycle (for a small number n). We call these groups of operations clusters. The significant reduction in the number of PEs required justifies the hardware overhead incurred. While sticking to the successful paradigm of reconfigurable "computing in space", this locally sequential approach optimizes the usage of the ALU resources.

By allowing different overclocking factors in the same device (e.g. n=2 and n=4), different local time-space tradeoffs are possible. For n=4, in our example, all operations in the dataflow graph can be clustered, i.e. executed on the same ALU, even if the multiplication requires two cycles. For n=2, only the two adders can be clustered. This results in twice the area, but also doubles the throughput compared to n=4.

Apart from a program controller executing the n instructions repetitively, a small internal register file to feed intermediate results back to the ALU inputs is required in the PE. This local feedback loop allows implementing dataflow graphs with cycles containing up to n operators without reducing the overall throughput.

3.2 Hardware Design

Figure 46:
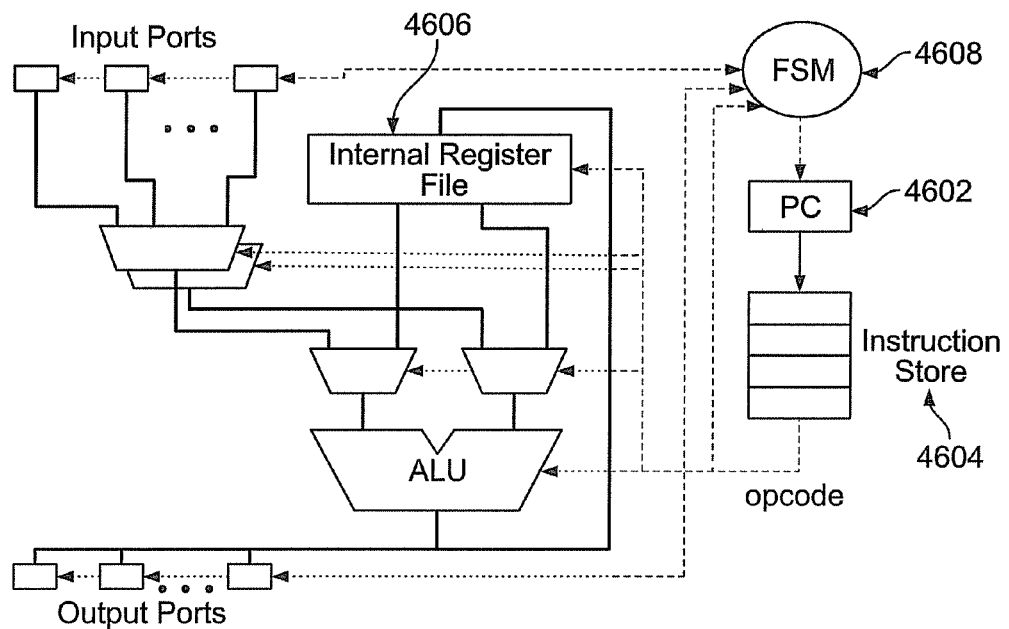
FIG. 46 shows a function folding processing element.
Figure 47B:
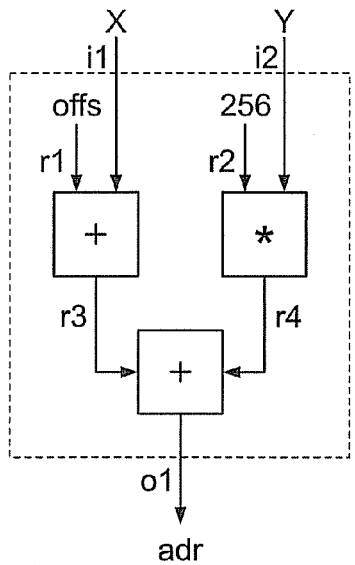

The hardware design sketched in FIG. 46 performs Function Folding as described above. As the simple PEs in FIG. 45, the new PE communicates with the interconnect network via data and event input and output ports which follow the ready/acknowledge protocol. The ports also synchronize the fast internal PE clock with the n-times slower bus clock. Input data is stable during the entire bus clock cycle, i.e. can be sampled in any of the internal PE clock cycles. And output data is copied to the bus registers at the beginning of a bus cycle. A Function Folding PE requires more ports than a simple PE since it executes an entire cluster of operations. But it does not require n-times more ports than the simple PE since the number of external connections is often quite limited due to constant inputs (which can be loaded to internal registers at configuration time) and local connections within a cluster. A good clustering algorithm minimizes the number of external connections. As illustrated by the dotted box around the operators in FIG. 47b, only two input ports and one output port are required for the example cluster for n=4.

In detail, the PE in FIG. 46 works as follows: A small program counter (PC) 4602 repeatedly iterates through the configured instructions in the instruction store 4604. In each PE cycle it selects the ALU opcode and controls the multiplexors selecting the ALU inputs. Either an input port or an entry of the internal register file 4606 can be used. The ALU outputs can be written back to the internal register file or to an output port or to both. The entire design is kept as simple and small as possible to just support function folding. No other control structures are possible. Both the number of input and output ports and the number of internal registers will be about n. Therefore we can choose a very fast implementation of the register file just using registers and multiplexors. Given the small number of ports and registers, the entire fetch/execute/store process can be performed in one cycle. The only exception is the multiplier operation which takes two cycles. The controller (FSM) 4608 stalls the program execution if an external input is not available or if an external output port is full due to a downstream pipeline stall. Note that event ports and registers are omitted in FIG. 46 for clarity. Events can be used and stored internally and externally like data.

Returning to FIG. 47b, we can now present the simple PE program for the address generation cluster. The mapping of connections to ports and registers is indicated in the figure. We assume that registers r1 and r2 have been initialized with the constant values offs and 256, respectively, at configuration time. The following assembler code, executed repetitively, describes the cluster:

add r3<-r1, i1
mul r4<-r2, i2
add o1<-r3, r4

4 Application Mapping

Figure 48:
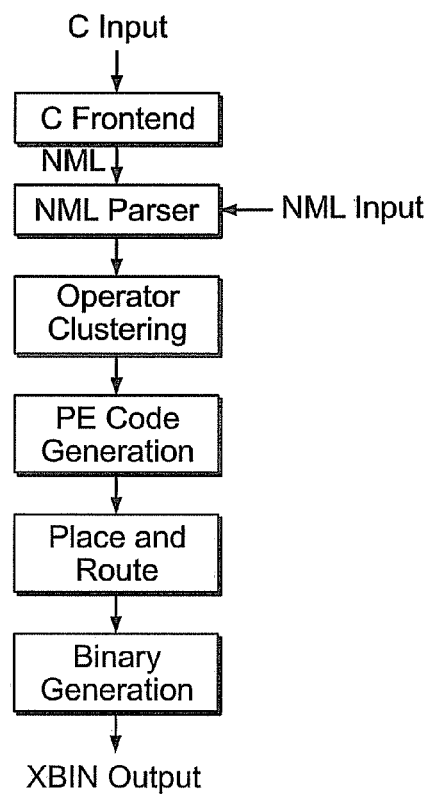
FIG. 48 shows an extended XPP tool flow.

FIG. 48 shows the tool flow of the extended XPP architecture. It is very similar to the current tool flow implemented in the xmap program (see Baumgarte et al.). Only the phases represented by the shaded boxes are added. The following phases already exist in the current XPP tool flow:

Cfrontend (optional): Generates structural NML code (cf Section 2) from a subset of standard C.

NML parser: Parses the input NML file and maps it to XPP operators.

Place and Route: Places the PEs (i.e. operators in the current architecture) on the XPP array and routes the connections.

Binary Generation: Generates an XBIN binary file.

For Function Folding, an additional Operator Clustering phase is required which defines the operators mapped to one PE. Though the clusters could be defined manually by annotations in the NML file, an automatic clustering algorithm is required to simplify programming, to use the C frontend, and to map existing NML code. It is described in the next section. Furthermore, PE program code needs to be generated for each cluster as described in Section 4.2. Obviously the Place and Route and Binary Generation phases have to be adapted, too.

4.1 Operator Clustering

The operator clustering problem for Function Folding PEs is similar to the graph covering problems encountered in code generators for conventional processors and module mapping for FPGAs, e.g. T. J. Callahan et al., "Fast Module Mapping and Placement for Datapaths in FPGAs," In Proc. FPGA '98, Monterrey, Calif., 1998 ("Callahan et al."). Therefore we investigated these algorithms first. The efficient dynamic-programming algorithm used in Callahan et al. and similar approaches is actually a tree-covering algorithm. It generates optimal coverings for operator trees. But it cannot handle arbitrary dataflow graphs. Hence a preprocessing phase which removes feedback cycles and fanout edges from the original graph is required. The result is a forest of trees which can be covered efficiently. However, the optimal tree covering results are not optimal for the original dataflow graph.

Now consider the operator clustering problem at hand: We need to find a solution with the minimal number of clusters which conforms to the restrictions of the Function Folding PEs, i.e. the over-clocking factor n, and the number of ports and internal registers. Additionally, cycles should be processed within a cluster whenever possible (to avoid reduced throughput caused by external routing delays), and the number of external connections should be minimized. Unfortunately these quality criteria are not visible in the output of the tree covering preprocessing phase, i.e. after the removal of cycles and fanout edges. Hence we do not apply tree covering for operator clustering.

Instead, we developed an algorithm operating on the original graph. To reduce the complexity, we only consider clustering operators which are connected since only these clusters use internal registers and reduce the number of external ports. In an additional postprocessing phase, unconnected clusters can be merged later if they are placed next to each other.

In the first algorithm phase, all connected clusters are explicitly generated. Note that the number of possible unconnected clusters would be exponential in the number of operators.

In the second phase, the optimal combination of clusters covering the entire input graph has to be determined. Unfortunately the number of all possible combinations of clusters is exponential. Hence it cannot be searched exhaustively. Instead, the main loop of the algorithm operates on an increasing subset of the operators, generating and storing an optimal clustering of the subset, until the optimal clustering of the entire operator graph has been computed. The algorithm exploits the fact that partial optimal solutions are contained in the complete optimal solution. In this way we do not need to compute optimal clusterings for all subsets. Because the optimal clustering of a new subset depends on other subsets which might not have been computed before, some recursive calls which may lead to an exponential runtime are required. However, we found that the runtime is in the range of a few minutes for an overclocking factor n<=4 and for an operator number k<50. For larger problem sizes we tested the following heuristics:

Remove large feedback cycles (with more than n operators) from the graph. Then small cycles are still executed within a cluster and only a few possible clusters are excluded, but the number of recursive calls is largely reduced.

Do not compute the best solution in recursive calls, but only the first clustering of the subset which is computed. By applying larger clusters before smaller ones, the algorithm computes a nearly optimal solution anyway.

With these extensions we could quickly cluster realistic dataflow graphs with up to 150 operators. For the cases we tested, the heuristics produced clusterings which were very near or equal to the optimum (i.e. they had only a few more clusters).

Note that we restricted the number of operations in a PE program to n in the previous discussions. This is reasonable since we normally do not want to extend the PE program execution over more than one bus cycle. However, if a PE can be programmed to execute more than n operations, those operations which are not throughput-critical can be combined in larger clusters. This further reduces the required number of PEs without impacting the overall throughput.

4.2 PE Code Generation

After operator clustering, the PE program code for every cluster is generated; cf. the assembler code in the example in Section 3. A simplified version of conventional register allocation is used to map internal connections to internal registers. The instructions can be directly extracted from the dataflow graph of the cluster.

5 Results

5.1 PE Speed and Area

The area of a Function Folding PE is estimated to be about 15% to 25% larger than the area of the corresponding simple PE, depending on the number of ports and registers. For 16-bit datapaths, preliminary synthesis results achieve a PE frequency of 400-500 MHz for a 130 run silicon process.

5.2 Complex FIR Application Analysis

Figure 49A:
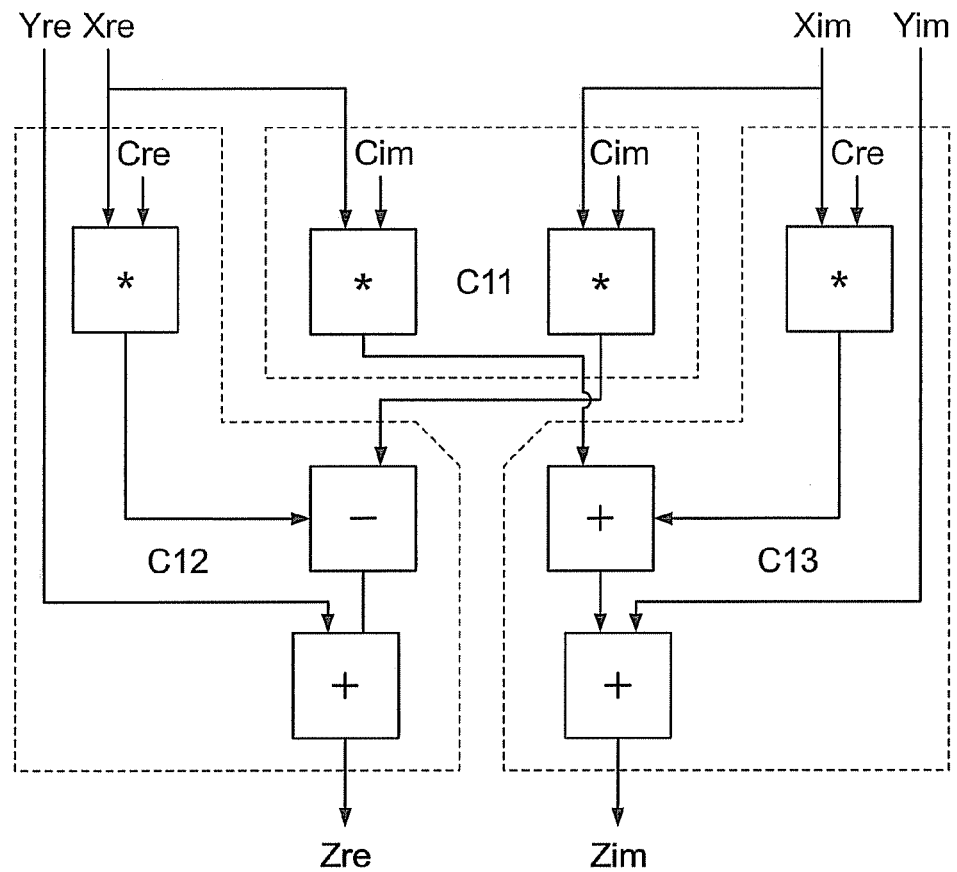
FIGS. 49a and 49b show a complex FIR filter cell.
Figure 49B:
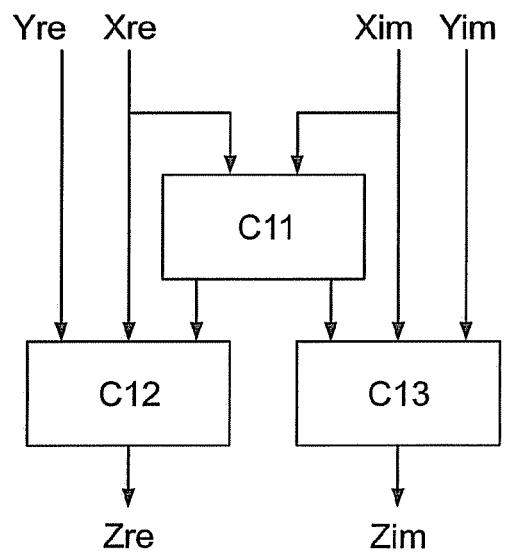

This section demonstrates the implementation of a typical DSP algorithm, a FIR filter operating on complex numbers, on Function Folding PEs. Consider one FIR filter cell which computes the output Z=X*C+Y from a constant C and inputs X and Y. All values are complex, i.e. (Zre,Zim)=(Xre*Cre−Xim*Cim+Yre, Xre*Cim+Xim*Cre+Yim). FIG. 49a shows the corresponding dataflow graph. It contains eight operators which can be folded to three clusters for an overclocking factor of n=4, as indicated by the dotted boxes C11, C12, C13. FIG. 49b shows the resulting cluster dataflow graph. All clusters fully utilize the PEs, i.e. use all four PE clock cycle.

Let us now compare the silicon efficiency of an implementation on a current XPP device (FIRcurr) with one based on Function Folding PEs (FIRnew), As outlined above, we estimate $F_{PE}$=400 MHz and $F_{bus}$=100 MHz for n=4. $F_{bus}$ is also the operating frequency of the current architecture. Filters built from the given FIR cells can easily be fully pipelined for both implementations, as can be seen from FIGS. 49a and b. Hence both implementations have the same performance: They generate outputs at a rate of 100 MHz.

The area of a Function Folding PE is estimated as AFFPE=1.2×$A_{currPE}$, i.e. 20% larger than current PEs. The area ratio for the two filter implementations is as follows:

$$\frac{A_{FIRnew}}{A_{FIRcurr}} = \frac{3 \times A_{FFPE}}{8 \times A_{currPE}} = \frac{3 \times 1.2 \times A_{currPE}}{8 \times A_{currPE}} = 0.45$$

This rough estimation shows that the new implementation is more than twice as area-efficient as the old one without requiring more pipelining registers in the external busses. The overall silicon efficiency is more than doubled.

5.3 Benchmark Mapping Results

In order to determine the general applicability of Function Folding, the algorithm described in Section, 4.1 was applied to a benchmark of 43 legacy XPP configurations from a wide range of application areas. We determined the average cluster utilization, i.e. the number of PE cycles being used by the repetitive PE program. This value is a good indication of the effectiveness of Function Folding. Note that a high cluster utilization does not guarantee that the PE program can be executed every bus cycle. The overall PE utilization in an application also depends on the availability of input data and on the overall throughput of all PEs.

Table 1 shows the results for n=2 and n=4 with varying port numbers. The number of internal registers was not yet restricted for this evaluation. The results for four input and output data and event ports (1.78 for n=2 and 3.05 for n=4) show that the Function Folding PE resources can be exploited efficiently for average XPP configurations. The table shows that using six data ports increases the cluster utilization only insignificantly. On the other hand, using fewer data ports distinctly decreases the utilization. We will combine hardware implementation results detailing the area requirements of the ports with the cluster utilization numbers to determine the PE parameters which yield the best overall silicon efficiency.

TABLE 1

Average cluster utilization (CU) in XPP benchmark, n: overclocking factor; DI/DO: number of data input/output ports; EI/EO: number of event input/output ports.

| n | DI | DO | EI | EO | CU |
|---|----|----|----|----|------|
| 2 | 6  | 6  | 4  | 4  | 1.79 |
| 2 | 4  | 4  | 4  | 4  | 1.78 |
| 2 | 2  | 2  | 4  | 4  | 1.57 |
| 2 | 4  | 4  | 2  | 2  | 1.75 |
| 2 | 2  | 2  | 2  | 2  | 1.53 |
| 4 | 6  | 6  | 4  | 4  | 3.06 |
| 4 | 4  | 4  | 4  | 4  | 3.05 |
| 4 | 2  | 2  | 4  | 4  | 2.25 |
| 4 | 4  | 4  | 2  | 2  | 2.80 |
| 4 | 2  | 2  | 2  | 2  | 2.12 |

6 Related Work

Though there are several projects on reconfigurable arithmetic arrays as mentioned in Section 1, to our knowledge there are no solutions similar to Function Folding in the literature. The following architectures differ considerably from our approach, but also allow to quickly change the operations performed by a PE.

The RAW microprocessor (see M. B. Taylor et al., "The Raw Microprocessor: A Computational Fabric for Software Circuits and General-Purpose Programs," IEEE Micro, March/April 2002) also contains a cluster of processing elements, but they are rather complex processors. Therefore their programs cannot be generated automatically as easily as the Function Folding PE programs. The RAW architecture resembles more a multiprocessor on a chip.

On the other hand, the MorphoSys architecture (see Lee et al.) follows a SIMD approach. All PEs in a row or column are controlled by a (global) program and execute the same instruction. This makes the PEs simpler, but the SIMD principle considerably restricts the available computations which can be executed. The array is also much harder to program. Finally, multi-context devices provide two or more complete configuration contexts (see B. Salefski et al., "Re-configurable Computing in Wireless, In Proc. 38th Design Automation Conference, Las Vegas, Nev., June 2001). This technique is adapted from multi-context FPGAs. However, it does not allow frequent reconfigurations since the shadow configurations first have to be loaded completely. The configurations are completely independent. Multicontext devices hide the configuration latency to a certain extent, but do not overcome the general efficiency problems of coarse-grain reconfigurable architectures.

7 Conclusions and Future Work

We have presented the architecture and functionality of the Function Folding Processing Element for an enhanced PACT XPP architecture. Preliminary analyses of both a hardware implementation and applications mapped to this architecture indicate that Function Folding significantly increases the silicon efficiency compared to current reconfigurable arithmetic arrays and has the potential to reduce the power consumption.

After the implementation of a Function Folding PE and the analysis of its parameters, future work will include the evaluation of paths which are not throughput-critical as mentioned at the end of Section 4.1. Integrated clustering and place-and-route algorithms will be explored. We also consider developing a direct compiler from C to Function Folding PEs which might exploit their capabilities better then the current design flow via NML.

The invention claimed is:

1. A data processing device comprising:
a multidimensional array of data processing coarse grained logic elements (PAEs) that are operated at a first clock rate and that communicate with at least one of (a) one another and (b) other elements via at least one of (i) busses and (ii) communication lines operated at a second clock rate;
wherein:
the first clock rate is higher than the second;
the coarse grained logic elements comprise storage means for storing data needed to be processed;
the array is controlled to perform data-flow data processing;
the data-flow data processing has a main data flow direction;
said coarse grained logic elements include at least one coarse grained hardware logic element adapted to effect data processing while allowing data to flow in said main data flow direction;
the at least one coarse grained logic element includes a coarse grained logic element that includes a first ALU having an upstream input side and a data downstream output side and a second ALU that provides for data flow in a direction reverse from that of the first ALU; and
an instruction set for the first ALU is a subset of an instruction set for the second ALU.

* * * * *